US009316536B2

(12) United States Patent
Takesue et al.

(10) Patent No.: US 9,316,536 B2
(45) Date of Patent: Apr. 19, 2016

(54) SPATIAL FREQUENCY REPRODUCING APPARATUS AND OPTICAL DISTANCE MEASURING APPARATUS

(71) Applicant: ASTRODESIGN, Inc., Tokyo (JP)

(72) Inventors: Toshiharu Takesue, Tokyo (JP); Shigeto Takeda, Tokyo (JP); Nobuyuki Nishizawa, Tokyo (JP); Tatsuho Arima, Tokyo (JP); Shigeaki Suzuki, Tokyo (JP)

(73) Assignee: ASTRODESIGN, INC., Tokyo (JP)

( * ) Notice: Subject to any disclaimer, the term of this patent is extended or adjusted under 35 U.S.C. 154(b) by 183 days.

(21) Appl. No.: 14/203,947

(22) Filed: Mar. 11, 2014

(65) Prior Publication Data

US 2014/0374575 A1    Dec. 25, 2014

(30) Foreign Application Priority Data

Jun. 24, 2013  (JP) ................................ 2013-131491
Oct. 7, 2013   (JP) ................................ 2013-209773

(51) Int. Cl.
*G01J 1/44* (2006.01)
*G01B 9/02* (2006.01)
(Continued)

(52) U.S. Cl.
CPC .............. *G01J 1/44* (2013.01); *G01B 9/02002* (2013.01); *G01B 9/02003* (2013.01);
(Continued)

(58) Field of Classification Search
CPC ........... G01B 2290/45; G01B 9/02002; G01B 9/02003; G01B 9/02019; G01B 9/02097; G01B 9/04; G01J 1/44; G02B 21/0056; G02B 21/0084; G02B 21/14
See application file for complete search history.

(56) References Cited

U.S. PATENT DOCUMENTS

| 4,650,330 A | 3/1987 | Fujita |
| 4,912,530 A * | 3/1990 | Bessho ..................... G01J 9/04 356/487 |

(Continued)

FOREIGN PATENT DOCUMENTS

| EP | 0 539 757 A1 | 5/1993 |
| EP | 2 653 830 A2 | 10/2013 |

(Continued)

OTHER PUBLICATIONS

Haeberle O et al: "Improving the lateral resolution in confocal fluorescene microscopy using laterally interfering excitation beams.", Optics Communications, North-Holland Publishing Co. Amsterdam, NL, vol. 259, No. 2, Mar. 15, 2006, pp. 400-408, XP028080755, ISSN: 0030-4018, DOI: 10.1016/J.OPTCOM.2005.09.004 [retrieved on Mar. 15, 2006].

(Continued)

*Primary Examiner* — Francis M LeGasse, Jr.
(74) *Attorney, Agent, or Firm* — Kratz, Quintos & Hanson, LLP

(57) ABSTRACT

A spatial frequency reproducing apparatus includes a light source, a first means for modulating a light emitted from the light source into two lights having different frequencies and separately irradiated adjacently, a second means for two-dimensionally scanning the two lights, a third means for irradiating an object under measurement with the two lights, a fourth means for receiving and converting into an electrical signal at least two or more divided lights from the object under measurement with a boundary line being interposed therebetween in a direction substantially perpendicular to the direction separating the two lights, a fifth means for amplifying respective photoelectrically converted electrical signals while varying a degree of amplification according to frequencies thereof and generating a difference signal or a summation signal of the amplified signals, and a sixth means for obtaining a phase difference or an intensity difference of these signals to obtain a measurement value.

15 Claims, 27 Drawing Sheets

(51) Int. Cl.
    *G01B 9/04* (2006.01)
    *G02B 21/00* (2006.01)
    *G02B 21/14* (2006.01)

(52) U.S. Cl.
    CPC ....... *G01B 9/02019* (2013.01); *G01B 9/02097* (2013.01); *G01B 9/04* (2013.01); *G02B 21/0056* (2013.01); *G02B 21/0084* (2013.01); *G02B 21/14* (2013.01); *G01B 2290/45* (2013.01)

(56) References Cited

U.S. PATENT DOCUMENTS

| 5,481,360 A | 1/1996 | Fujita |
| 5,751,243 A | 5/1998 | Turpin |
| 5,784,161 A * | 7/1998 | Bechstein ................. G01J 9/04 356/487 |
| 2007/0087445 A1 | 4/2007 | Tearney |

FOREIGN PATENT DOCUMENTS

| GB | 2 142 427 A | 1/1985 |
| JP | S59-214706 | 12/1984 |
| JP | 2007-524075 A1 | 8/2007 |
| WO | WO 02/103287 A1 | 12/2002 |

OTHER PUBLICATIONS

EPO Communication dated Oct. 21, 2014.
EPO Communication including Extended European Search Report (EESR) dated Feb. 6, 2015.
D.K. Hamilton, et al.; "Differential phase contrast in scanning optical microscopy;" Journal of Microscopy; vol. 133; Pt. 1; Jan. 1984; pp. 27-39 (13 Sheets).
G. Popescu, et al.; "Fourier phase microscopy for investigation of biological structures and dynamics;" Optics Letters; vol. 29; No. 21; Nov. 1, 2004; pp. 2503-2505 (3 Sheets).
Z. Wang, et al.; "Spatial light interference microscopy (SLIM);" Optics Express; vol. 19; No. 2; Jan. 17, 2011; pp. 1016-1026 (11 Sheets).

* cited by examiner

SPATIAL FREQUENCY REPRODUCING APPARATUS AND OPTICAL DISTANCE MEASURING APPARATUS

BACKGROUND OF THE INVENTION

1. Field of the Invention

The present invention relates to a spatial frequency reproducing apparatus and an optical distance measuring apparatus realizing, with a quite high resolution, measurement or observation of the profile of a surface condition or the surface condition of a cell or the like by irradiation of laser lights, and is preferable for an apparatus quantitatively and accurately performing observation or measurement of path difference information by improving the resolution of an optical apparatus such as a microscope and by accurately reproducing dropped spatial frequency information which is obtained with a lens.

2. Description of the Related Art

With a conventional optical microscope, it has not been possible to observe or measure an object under measurement at or below a diffraction limit. As a substitute for this, a probe microscope (STM, AFM, NFOS, or the like), a scanning electron microscope, and so on have been developed and used in many fields. The scanning electron microscope uses a very narrow beam as a scanning electron probe, and thus has a high resolution and a significantly large focal depth as compared to the optical microscope. However, for measuring an object under measurement with low electric conductivity such as a cell, it is necessary to coat platinum palladium or gold with good electric conductivity on a sample as the object under measurement. Accordingly, this often accompanies damage to a cell itself, and of course it has not been possible to observe and measure a live cell.

Further, the probe microscope is to measure the distance to the object under measurement by making a probe, which is disposed close to the object under measurement, further close to the object under measurement, and utilizing atomic force, tunnel current, light near field or the like. However, it is difficult to move the probe at high speed, handling is difficult because the distance to the object under measurement is quite close, and moreover a long time is needed for obtaining two-dimensional information.

On the other hand, a confocal microscope, a digital hologram microscope, and the like are known as a conventional means for detecting an optical path difference.

The former confocal microscope irradiates a spot light to an object under measurement, and moves the objective lens or the object under measurement so that the amount of light received on a photo detector disposed at a confocal position becomes the maximum for this spot light via a pin hole, to thereby obtain height information or path difference information of the object under measurement.

Further, the latter digital hologram microscope irradiates laser lights substantially in parallel to an object under measurement, gathers lights diffracted by the object under measurement through the objective lens, makes them interfere with a plane wave as a reference on an area sensor such as a CCD to generate a hologram, and analyzes interference fringes thereof by calculation to restore original wavefronts from the object under measurement, thereby obtaining path difference information.

However, in the former confocal microscope, basically, when there is a phase distribution within a spot, the beam is deformed, which results in erroneous information. In particular, for an object under measurement on which a wavefront changes in phase, like a refractive index change in a cell or the like, it is substantially equivalent to having an aberration in the optical system, and thus it must be said that reliability of the value thereof is poor. Further, it is necessary to move the objective lens and the object under measurement so that the received amount of light becomes maximum, and hence it is not real time.

In the latter digital hologram microscope, the diffracted lights are gathered through the objective lens, and their wavefronts are reproduced and taken as information. However, spatial frequencies which can be gathered with the objective lens are limited in cut-off frequency by NA of the objective lens, and at the same time, frequencies which can be obtained substantially linearly from DC to the cut-off frequency decreases gradually. What is called an MTF curve corresponds to this.

Therefore, the obtained wavefront information does not completely accurately reflect the spatial frequency information which the object under measurement has, and gives erroneous path difference information.

On the other hand, there is known a method which prepares a Fourier transform plane in part of an imaging optical system, disposing a spatial modulator of a phase type on this Fourier transform plane, and adds a phase modulation to a zero order diffracted light. This method images, by a CCD camera disposed on an imaging surface of a lens, four types of images in total in which phase differences of 90 degrees, 180 degrees, and 270 degrees differing by 90 degrees are generated between the zero order diffracted light and a first order diffracted light as described in Patent Document 2 and Non-Patent Documents 1, 2 below, and measures an optical distance from mutual calculations of these four types of images.

However, since any method based on this method images with a lens, it has MTF characteristics of the lens as described above, and thus a deficit in the amount of information occurs as a spatial frequency increase. Accordingly, it must be said that reliability of quantified information is poor by these methods.

Further, it has been practically impossible to generate a phase difference only in the zero order diffracted light. This is because the zero order diffracted light, which is a transmitted light without being modulated from a sample as an object under measurement, includes a first order diffracted light having a low frequency overlapped on a region of the zero order diffracted light, and the like, and the zero order diffracted light and the first order diffracted light cannot be substantially distinguished.

Moreover, upon obtaining four images with varied phases, it is necessary to switch modulation of the spatial light modulator, and thus the images obtained by the CCD camera provide information having time lags. Therefore, it is difficult to say that changes in processes which vary at a relatively high speed are reflected correctly.

On the other hand, in order to reduce the influence of the images becoming information having time lags as much as possible, it is conceivable to apply this method in a relatively narrow region in the vicinity of a peripheral portion of divergence of the zero order diffracted light. In this manner, there is a possibility of reducing frequency dependence of the spatial frequency and the influence of the first order diffracted light included in the zero order diffracted light. However, in this case, only lights in a quite narrow range can be obtained effectively, and thus the amount of light decreases largely, making it difficult to provide information having a good SN ratio.

Further, there is also known a demand to accurately analyze chemical changes of cells or the like by allowing cells or the like to emit a fluorescent light with a particular wavelength. However, in an imaging optical system, conventionally, there is an aperture limit by the objective lens. Thus, there is a limit in spatial frequency to be taken in, and at the same time, the contrast of the spatial frequency linearly decreases gradually as the frequency increases.

Accordingly, when emission of fluorescent light is performed in a structure part at a high frequency, the contrast thereof decreases, and it has been difficult to accurately perform concentration measurement or the like.

On the other hand, for measuring a distance accurately or for measuring or observing a micro object accurately, heterodyne interference methods are well known. Here, an optical heterodyne method using lights will be described, but it is also performed with the similar idea for other electromagnetic waves. This optical heterodyne method makes two laser lights with different frequencies interfere with each other to create a beat signal of the frequency difference, and detects a phase change of this beat signal with a resolution of about $\frac{1}{500}$ of a wavelength. That is, with this optical heterodyne method, it is possible to measure the distance to an object under measurement while measuring a change in height direction of a surface, or to measure or observe an object under measurement itself.

Then, Japanese Patent Application Laid-open No. S59-214706 of Patent Document 1 below discloses a method to adjacently generate two beams composed of different frequencies by using an acoustic optical device, detect a phase change between these two beams, and obtain a surface profile by increasing the phase change cumulatively. However, this Patent Document 1 is to make two beams be close and slightly larger than a beam profile, detect an average phase difference in two beam profiles by heterodyne wave detection, and sequentially integrate the phase difference, so as to obtain concave and convex information.

Therefore, according to this Patent Document 1, it is possible to measure concave and convex information of an object under measurement which is assumed to be flat such as a semiconductor wafer, but it is not possible to extract information inside the beam profile. Accordingly, it is not possible to increase the resolution inside the beam profile, which is in a plane.

On the other hand, a method called DPC (Differential Phase Contrast) method has been conventionally known. This is a technique applied first to an electron microscope by Dekkers and de Lang, and is thereafter expanded to an optical microscope by Sheppard and Wilson and others. This DPC method obtains a differential signal of results of interference between a zero order diffracted light and a first order diffracted light detected by detectors, which are in a far field with respect to electromagnetic waves irradiated to a sample and disposed symmetrically with respect to an irradiation axis of the electromagnetic waves, to thereby obtain profile information of the sample. However, when a spatial frequency increases, this DPC method is not able to make these zero order diffracted light and first order diffracted light interfere, and as a result of that the spatial frequency cannot be reproduced, the measurement can no longer be performed in some cases.

That is, including general apparatuses and the like using electromagnetic waves, conventional imaging-type microscopes using electromagnetic waves cannot exceed a resolution which is the limit of the Abbe's theory. This limit is a result of a diffraction phenomenon which a wave has, and has been assumed as a theological limit that cannot be exceeded. Therefore, it has been difficult to overcome the substantial limit by wavelengths used in not only the optical microscopes but also the electron microscopes.

Further, in various conventional microscopes based on the imaging optical system, the obtainable spatial frequency is limited due to the aperture limit of lens, and at the same time, the contrast of a sample decreases gradually as the spatial frequency becomes high. Accordingly, it has been difficult to accurately obtain concentration information by path difference information such as phase information or fluorescent light emission.

Patent Document 1: Japanese Patent Application Laid-open No. S59-214706 (JP59214706(A))

Patent Document 2: Translated National Publication of Patent Application No. 2007-524075

Non-Patent Document 1: Opt. Lett. 29(21), 2503-2505 (2004)

Non-Patent Document 2: Opt. Exp. 19(2), 1016-1026 (2011)

As described above, in a conventional distance measurement apparatus using the heterodyne detection, it has not been possible to measure a distance with a resolution equal to or smaller than the wavelength of an electromagnetic wave to be given. Therefore, even when the irradiation area of the electromagnetic wave is decreased to be equal to or smaller than a wavelength, it has only been possible to calculate an average distance of an area to the extent equal to or larger than the wavelength.

Similarly, in a conventional optical detector using the heterodyne detection, a near-flat object such as a semiconductor wafer is a main target of measurement. Accordingly, to increase the resolution in a plane, it has been inevitable to use the near field of the electronic microscope, AFM (atomic force microscope), or the like.

However, regarding the electronic microscope, processing of a living organism, cell, or the like in particular is necessary, and thus live observation or measurement of a refractive-index distribution is not possible. On the other hand, the AFM has insufficient processing speed and hence is unable to see a change of state in real time. Thus, it is not suitable for observation of a living organism or cell, and meanwhile the probe needs to be close to the object under measurement, which causes poor usability.

Here, the OTF characteristics of an objective lens in a conventional microscope using an imaging optical system will be described below.

In the conventional microscope using an imaging optical system, the component of a first order diffracted light and the component of a zero order diffracted light of the spatial frequency of a target object, which is captured with the objective lens, interfere with each other to form an image. Accordingly, when the first order diffracted light is not incident on the aperture of the lens, the spatial frequency thereof would not be reproduced. On the other hand, the angle of diffraction of the first order diffracted light increases gradually as it varies from a low frequency to a high frequency, and hence the amount of the first order diffracted light inputted to the lens decreases gradually. As a result, the frequency whose first order diffracted light is not inputted is cut off, and the degree of modulation thereof gradually decreases in the course of variation from the low frequency to the high frequency.

The OTF characteristics of the objective lens are as described above. Therefore, in the imaging system, the first order diffracted light to be inputted to the objective lens is limited itself, and thus the resolution itself has a limit in relation with the spatial frequency of the object under measurement to be reproduced.

On the other hand, in an optical system which images using an objective lens like the aforementioned digital hologram microscope, at the time when being incident on the objective lens limited in size of aperture, the laser lights diffracted by the object under measurement are in a state that information of part of the spatial frequency which this laser light has is dropped. That is, as the spatial frequency increases, the spatial frequency inputted to the objective lens decreases gradually. Accordingly, the hologram created by making interference with the wavefront of reference does not reflect the original information which the object under measurement has. As a result, the path difference information reproduced by this calculation is utterly erroneous information particularly in an area where the spatial frequency is high.

The above qualitative explanation is quantified and described in detail below.

As in FIG. 29, it is assumed that a parallel luminous flux is incident on an objective lens 31 having an aperture radius a and a focal length f. Note that in FIG. 29, an irradiation optical axis is represented by an optical axis L0, and a tilted optical axis tilted by an angle Θ with respect to this optical axis L0 is represented by an optical axis L1. A microscope using normal imaging is a transmission type in which the luminous flux transmits a sample S as in FIG. 29, but it may be considered as a reflection type in which the luminous flux is returned by the sample S. Further, to make the equations simple, it is handled as a one-dimensional aperture.

Further, for simplicity, the sample S is assumed to be in the form of a sine wave with a height h and a pitch d. Specifically, an optical phase θ is represented by the following equation.

$$\theta = 2\pi(h/\lambda)\sin(2\pi x/d) \quad \text{Equation (1)}$$

The amplitude E of a light deflected from the sample S is given as a convolution of Fourier transform of Equation (1) and the aperture of the lens on a plane separated by the focal length f, and hence is represented as follows. However, the Bessel function which is Fourier transform of the phase of Equation (1) takes up to the positive and negative first order.

$$E = \int \left( J_0\left(2\pi\frac{h}{\lambda}\right)\delta(X) + J_1\left(2\pi\frac{h}{\lambda}\right)\left(\delta\left(X - \frac{\lambda f}{d}\right) - \delta\left(X + \frac{\lambda f}{d}\right)\right)\right) rect\left(\frac{x - X}{2a}\right) dX$$

$$= J_0\left(2\pi\frac{h}{\lambda}\right) rect\left(\frac{x}{2a}\right) +$$

$$J_1\left(2\pi\frac{h}{\lambda}\right)\left( rect\left(\frac{x - \frac{\lambda f}{d}}{2a}\right) - rect\left(\frac{x - \frac{\lambda f}{d}}{2a}\right)\right)$$

Equation (2)

Here, the Fourier transform of Equation (2) contributes to imaging.

Therefore, intensity I is as following Equation (3)

$$I = \left(J_0\left(2\pi\frac{h}{\lambda}\right) * a * \operatorname{sinc}(ka)\right)^2 +$$

$$2 * \left(J_1\left(2\pi\frac{h}{\lambda}\right) * \left(a - \frac{\lambda f}{2d}\right) * \operatorname{sinc}\left(k\left(a - \frac{\lambda f}{2d}\right)\right)\right)^2 *$$

$$\left(4\sin^2\left(2\pi\frac{x}{d}\right)\right)$$

Equation (3)

What this equation means is that information of a pitch smaller than $d=\lambda f/2a=0.5\lambda/NA$ is dropped. This matches the beam diameter of a rectangular opening (the first dark ring radius w of sinc(ka)=0 satisfies ka=π, and thus w=0.5/NA). Further, this means that even when d>0.5/NA, the degree of modulation decreases as d becomes smaller. When the relation of this with the spatial frequency of 1/d and the degree of modulation is indicated, it is MTF. However, by just imaging phase information, image formation having contrast is not performed, and hence a means for making contrast by using an optical element or the like which causes a phase delay in a zero order diffracted light like a phase contrast microscope is necessary.

As described above, in the ordinary imaging optical system, the limit of the spatial frequency reproduced by NA of the objective lens 31 is inevitably $d=\lambda f/2a=0.5\lambda/NA$, and any value smaller than this would not be reproduced in any way. Accompanying this, conventional optical microscopes including the digital hologram microscope which obtains information with an objective lens, it has not been possible to obtain accurate intensity information or path difference information.

SUMMARY OF THE INVENTION

The present invention is made in view of the above-described background, and an object thereof is to provide a spatial frequency reproducing apparatus and an optical distance measuring apparatus having a high resolution in a plane as well as a high resolution with respect to a height or a refractive index distribution outside the plane, and having an effectively high resolution by accurately reproducing spatial frequency information which an object under measurement has by obtaining a spatial frequency which cannot be obtained with an ordinary imaging optical system.

A spatial frequency reproducing apparatus according to a first aspect of the present invention includes:

a light source emitting a coherent light;

a first means for modulating the light emitted from the light source into two lights which have frequencies different from each other and are irradiated separately adjacent to each other;

a second means for one-dimensionally or two-dimensionally scanning the two lights;

a third means for irradiating an object under measurement with the two lights which are scanned;

a fourth means for receiving and converting into an electrical signal at least two or more divided reflected lights or transmitted lights from the object under measurement with a boundary line being interposed therebetween in a direction substantially perpendicular to the direction in which the two lights are separated;

a fifth means for amplifying respective electrical signals photoelectrically converted by the fourth means with respect to respective areas with the boundary line being interposed therebetween while varying a degree of amplification according to frequencies of the electrical signals and generating a difference signal or a summation signal of the amplified signals; and a sixth means for obtaining a phase difference or an intensity difference of the difference signal or the summation signal to obtain a measurement value.

The operation of the spatial frequency reproducing apparatus according to the first aspect will be described below.

According to the present invention, a light from a light source is DSB modulated by the first means, which is an acoustic optical device, a spatial light modulator, or the like, so as to generate beams which are two lights slightly different in frequency and emission direction. By scanning these two beams by the second means, which is one-dimensional or two-dimensional scanning optical element irrelevant to a modulation frequency toward an objective lens, which is the third means, the two close beams scan the object under measurement via the objective lens.

When the object under measurement is a reflective object, a slight frequency difference (beat signal) of the beams can be detected by a photo detector, which is the fourth means disposed at a position substantially conjugate to the acoustic optical device, so as to obtain two beat signals. Further, when the object under measurement is a transmissive object, these two beat signals can be detected likewise by a photo detector disposed at a position which is in far field but not so distant from the object under measurement.

Further, since these two close beams are scanned sequentially by the second means, when a path difference change occurs due to a change in concaves and convexes, a change in refractive index, or the like of a sample, a frequency of beam is demodulated based on the structure of this sample. This frequency corresponds one to one to the spatial frequency obtained by the photo detector.

On the other hand, the interference between a zero order diffracted light and a positive and negative first order diffracted light which are diffracted by the sample derives the intensity information or the path difference information. Therefore, the higher the spatial frequency included in the sample, the larger the angle of diffraction of the positive and negative first order diffracted light, and the more the interference degree decreases.

At this time, the light received by the photo detector as the fourth means is photoelectrically converted, and the spatial frequency which is obtained effectively can be flattened by the fifth means which electrically amplifies the electrical signal corresponding to the spatial frequency according to the frequency of the electrical signal. Therefore, this means that the spatial frequency which the sample originally has can be accurately restored by this flattening by the fifth means. Note that as a method for the electrical amplification, the circuit gain which amplifies the output of each photo detector may be varied, or the output from each photo detector may be A/D converted to perform calculation of digital multiplication by an amplification coefficient. Further, the electrical amplification can be used as image processing like high-frequency enhancement or smoothing.

Here, when divided photo detectors divided in two or more with a boundary line being interposed therebetween to extend in the direction substantially perpendicular to the separation direction of the two lights are used as the photo detector, the fifth means creates a summation signal of all the divided photo detectors or a difference signal of the photo detectors from each other with the boundary line being interposed therebetween. Then, the sixth means heterodyne detects a slight frequency difference (beat signal) based on these signals and measures a phase displacement from the inputted signal. That is, in this sixth means, based on the summation signal of outputs of all the photo detectors for example, there is effectively given an integral value of the area corresponding to the beam diameter of the phase difference according to the degree of separation of the two beams condensed by the objective lens. Accordingly, accompanying that a resolution substantially equivalent to that of the differential interference microscope is obtained, the distance between the photo detectors and the sample can be obtained in this resolution.

To increase the resolution further, a difference signal of photo detectors from each other at adjacent positions in the photo detectors divided in two or more may be utilized. In this manner, there is effectively given an integral value of the area corresponding to the beam diameter of a differential of the phase difference according to the degree of separation of the two beams condensed by the objective lens. In this case, as compared to the summation signal, only the portion in which the phase difference has occurred contributes to the phase difference, and thus the sensitivity increases significantly.

Therefore, a lateral resolution can be improved, which is comparable to the resolution according to the degree of separation of the beams. This is an outstanding characteristic which cannot be found in ordinary differential interference microscopes. As a result, a lateral resolution much higher than a lateral resolution dominated by a wavelength can be obtained.

Further, when two beams are disposed quite closely, the summation signal of all photo detectors represents intensity information of the sample. From this point, in order to accurately evaluate permeability or the like in a dyed state, flattening by electrical amplification of the received spatial frequency as described above is a very effective means.

This is because at least up to the spatial frequency received by an objective lens, it can be apparently seen that the dyed state does not depend on the structure of the sample, and hence accurate analysis can be performed. In many conventional microscopes utilizing imaging characteristics, the spatial frequency incident on the objective lens is lost at that point, and no matter how well it is corrected by image processing, any other method, or the like, it is merely an analogical inference and is not accurate.

To summarize, in a microscope to which the present invention is applied, since it has a quite high in-plane resolution and moreover a height or a refractive index distribution can be measured by performing two-dimensional scanning once, three-dimensional measurement of a state change or the like of live cells, a micro-machine, or the like can be performed in real time. Accordingly, the present invention has large characteristics incomparable to conventional laser scanning type confocal microscopes which obtain two-dimensional information, move an objective lens or the like in a height direction, and take the position of the objective lens at a point where maximum intensity is detected as a height.

Moreover, when the present invention is applied to a transmission type microscope, living organisms and cells can be observed and measured alive in high resolution. Accordingly, the present invention has large characteristics which are not present in electron microscopes with which cells or the like are inactivated and then measured.

Further, by correcting the amplification coefficient of the frequency of the electrical signal detected in the photo detector, it is possible to correct the corresponding spatial frequency, and it is possible to restore spatial frequency information dropped by the lens. Therefore, obtained intensity information and path difference information of an observation target become quite accurate information, which is a large characteristic not present in conventional measuring instruments using a lens.

On the other hand, a spatial frequency reproducing apparatus according to a second aspect of the present invention includes:

a light source irradiating a light, which is irradiated convergently or irradiated in parallel, to an object under measurement;

a first light processing member located on an irradiation optical axis of the convergent irradiation or the parallel irradiation and receiving and processing a luminous flux emitted from the object under measurement;

a first photo detector having at least two divided photo detectors which receive lights of respective side portions with the irradiation optical axis being interposed therebetween within a transmitted light from the first light processing member;

a pair of second light processing members each located on a tilted optical axis having a tilt with respect to the irradiation optical axis on one of light receiving sides of the divided photo detectors of the first photo detector, and receiving and processing a luminous flux emitted from the object under measurement and making the luminous flux and a luminous flux emitted from the first light processing member interfere with each other;

a pair of second photo detectors receiving the luminous fluxes made to interfere by the pair of second light processing members; and an output summation/difference detection unit amplifying respective electrical signals photoelectrically converted by the two divided photo detectors while varying a degree of amplification according to frequencies of the electrical signals and amplifying respective electrical signals photoelectrically converted by the pair of second photo detectors while varying a degree of amplification according to frequencies of the electrical signals, and detecting an output summation or an output difference between outputs of the amplified electrical signals of the two divided photo detectors and an output summation or an output difference between outputs of the amplified electrical signals of the pair of second photo detectors.

Further, a spatial frequency reproducing apparatus according to a third aspect of the present invention includes:

a light source irradiating a light, which is irradiated convergently or irradiated in parallel, to an object under measurement;

a first optical element located on a tilted optical axis having a tilt with respect to an irradiation optical axis of the convergent irradiation or the parallel irradiation and making two luminous fluxes interfere with each other;

a plurality of first photo detectors each detecting the luminous fluxes made to interfere by the first optical element;

a second optical element located on a tilted optical axis having a tilt reverse to that of the first optical element with respect to an irradiation optical axis of the convergent irradiation or the parallel irradiation and making two luminous fluxes interfere with each other;

a plurality of second photo detectors each detecting the luminous fluxes made to interfere by the second optical element; and an output summation/difference detection unit amplifying respective electrical signals photoelectrically converted by the plurality of first photo detectors while varying a degree of amplification according to frequencies of the electrical signals and amplifying respective electrical signals photoelectrically converted by the plurality of second photo detectors while varying a degree of amplification according to frequencies of the electrical signals, and detecting an output value of a summation or a difference between an arbitrary light receiving output of the plurality of first photo detectors and an arbitrary light receiving output of the plurality of second photo detectors.

Next, the operations of the spatial frequency reproducing apparatuses according to the second aspect and the third aspect of the present invention will be described below.

As described above, the DPC method is to obtain profile information of a sample by detecting a differential signal of the detectors from each other, which are disposed in a far field with respect to electromagnetic waves irradiated to a sample, which is an object under measurement, and disposed symmetrically with respect to an irradiation axis of electromagnetic waves.

On the other hand, the present inventors have devised a method to scan two beams having frequencies slightly different from each other and are slightly displaced in position from each other by using an acoustic optical device or the like, and heterodyne detect a differential output of a plurality of photo detectors disposed in a far field.

Then, the present invention can be said as one using a method combining the DPC method and the heterodyne method.

Incidentally, formation of an image using lights can be considered to be due to interference of a zero order diffracted wave and a positive and negative first order diffracted waves of a spatial frequency which the image itself has. An MTF curve of an optical system is directly related to the amount of the first order diffracted light received by an objective lens of the optical system. Therefore, a spatial frequency which has a first order diffracted light not incident on the objective lens does not contribute to imaging, and thus is cut inevitably. This maximum spatial frequency is the cut-off frequency of the optical system.

On the other hand, in the optical DPC method, a coherent light like a laser is used. Specifically, a result of interference of the first order diffracted light and the zero order diffracted light of the coherent light irradiated to a sample is reflected on photo detectors disposed in a far field symmetrically with respect to the optical axis of the coherent light, and thereby the sample which is an object under measurement is measured or observed. At that time, determination of the spatial frequency of the sample is similar to an imaging optical system.

Here, the zero order diffracted light of a light reflected by the sample or transmitted through the sample is emitted from the sample having an aperture angle of a light when irradiated, that is, the angle of divergence depending on NA of the objective lens. Similarly, the first order diffracted light changes in angle in a direction depending on the spatial frequency and is further emitted with the same angle of divergence as that of the zero order diffracted light. Therefore, the profile information of the sample is obtained in a portion where the zero order diffracted light and the positive and negative first order diffracted lights overlap on the photo detectors.

From the above, when the spatial frequency is high, the zero order diffracted light and the first order diffracted light cannot interfere with each other, and this spatial frequency is not reproduced. Accordingly, by making the zero order diffracted light and the first order diffracted light interfere with each other before guiding them to the photo detectors, significant improvement in reproduced spatial frequency is realized. Therefore, an interferometer (Fabry-perot, Mach-Zehnder, or the like) is built in a space between the sample and the photo detectors, so as to make the zero order diffracted light and the first order diffracted light interfere with each other at this position.

Moreover, even in this manner, for a high spatial frequency, the degree of interference between the first order diffracted light and the zero order diffracted light decreases gradually. On the other hand, by appropriately amplifying the frequency modulated based on the structure of a sample as described above corresponding to the scanning of beams which are laser lights, it is possible to electrically amplify the signals up to the frequency corresponding to the spatial frequency up to the detection limit. Accompanying this, by appropriately reproducing the spatial frequency, it is possible to obtain path difference information which has a quite high lateral resolution and is quite accurate at the same time.

When an output between photo detectors below is obtained, correct reproduction of spatial frequency can be performed by amplifying the frequency according to the spatial frequency. Note that when it is desired to mainly obtain the intensity information of a sample, a summation signal of photo detectors may be obtained.

This is because when the sample is a phase object, the positive and negative first order diffracted lights are displaced 180 degrees in phase from each other, and thus the phase information appears as a difference signal between photo detectors as a result of being made to interfere with the zero order diffracted light. On the other hand, when the sample is an intensity object, the positive and negative first order diffracted lights are in the same phase, and thus the intensity information appears as a summation signal between the photo detectors as a result of being made to interfere with the zero order diffracted light.

On the other hand, there is disposed a lens having an optical axis between the respective chief ray axes of the zero order diffracted light and the first order diffracted light. By this lens, it is conceivable that the zero order diffracted light or the first order diffracted light diffracted from the sample is converted into a parallel luminous flux, an image is reversed toward one of lights thereof by an optical element like a dove prism and further shifted in parallel by an optical element like a rhomboid prism so that the zero order diffracted light and the first order diffracted light overlap, and the zero order diffracted light and the first order diffracted light are made to interfere with each other. By performing this through two systems, one between the first order diffracted light and the zero order diffracted light and one between the negative first order diffracted light and the zero order diffracted light, the summation signal or the differential signal of the two groups of photo detectors disposed in a far field has larger spatial frequency information, which substantially improves the resolution.

Further, there is disposed a lens having an optical axis between the respective chief ray axes of the zero order diffracted light and the first order diffracted light. By this lens, it is conceivable that part of the zero order diffracted light, the first order diffracted light, and part of the negative first order diffracted light are enlarged to adjust the pitch of the divided photo detectors and a formed interference pitch to be substantially the same, so as to use the photo detectors selectively.

Moreover, there is disposed a lens having an optical axis between the respective chief ray axes of the zero order diffracted light and the first order diffracted light. By converting the zero order diffracted light or the first order diffracted light diffracted from the sample into a parallel luminous flux by this lens, and guiding the zero order diffracted light and the first order diffracted light to the photo detectors by a magnifying lens system, magnified interference fringes are formed on the photo detectors. At that time, when information extracted from the object under measurement is phase information, the interference is performed through two systems, one between the first order diffracted light and the zero order diffracted light and one between the negative first order diffracted light and the zero order diffracted light, and the photo detectors are adjusted so that when one photo detector has the maximum amount of light, the other photo detector has substantially zero amount of light. When information extracted from the sample is intensity information, the interference is performed through two systems, one between the first order diffracted light and the zero order diffracted light and one between the negative first order diffracted light and the zero order diffracted light, and the photo detectors are adjusted so that when one photo detector has the maximum amount of light, the other photo detector has the maximum amount.

Further, there is disposed a lens having an optical axis between the respective chief ray axes of the zero order diffracted light and the first order diffracted light. By this lens, the zero order diffracted light or the first order diffracted light emitted from the sample is converted into a parallel luminous flux, and this parallel luminous flux is condensed by the lens. Then, by a grating having an appropriate grating pitch disposed substantially in the vicinity of the focal point of the lens, the zero order diffracted light and the first order diffracted light are substantially shifted and overlapped with each other, so as to make them interfere.

Thus, the summation signal and the differential signal of the two groups of photo detectors disposed in a far field has larger spatial frequency information, which substantially improves the resolution. Moreover, since the present invention uses interference information of the zero order diffracted light and the first order diffracted light emitted from a sample, the influence of an irradiation optical system is small. Therefore, it is possible to increase the detected spatial frequency even when an irradiation spot is large in some degree.

The spatial frequency reproducing apparatus according to the present invention physically obtains an essentially high spatial frequency and hence obtains the original information which the sample has, as compared to an estimation method performing it with image processing or the like or a method of forcibly increasing the degree of modulation at a Rayleigh limit by digital processing or the like. Moreover, spatial frequency information which is dropped by a lens or the like is accurately reproduced, and thus it is information having quite high reliability.

Further, depth information which the differential signal of the two groups of photo detectors disposed in a far field originally has is obtained simultaneously. Thus, it is possible to provide a spatial frequency reproducing apparatus excelling in lateral resolution and vertical resolution simultaneously, which is preferable for a laser scanning microscope.

Further, an optical distance measuring apparatus according to a fourth aspect of the present invention includes:

a light source irradiating a luminous flux to an object under measurement;

a separating element dividing into two luminous fluxes a luminous flux generated by diffraction by the object under measurement upon incidence of the luminous flux and including a zero order diffracted light and a first order diffracted light;

a first delay element delaying advancing of a luminous flux of a portion of the diffracted lights constituting one of the luminous fluxes divided by the separating element;

a first photo detector having a pair of divided photo detectors detecting two divided portions of the zero order diffracted light and the first order diffracted light, which are partially delayed by the first delay element, in a state of being made to interfere with each other;

a second delay element delaying, by a different phase from that of the first delay element, advancing of a luminous flux of a portion of the diffracted lights constituting another one of the luminous fluxes divided by the separating element;

a second photo detector having a pair of divided photo detectors detecting two divided portions of the zero order diffracted light and the first order diffracted light, which are partially delayed by the second delay element, in a state of being made to interfere with each other; and an output summation/difference detection unit detecting an output value of a sum or a difference of electrical signals of two types of light receiving outputs which are detected with phases being made different from each other by the pair of divided photo detectors of the first photo detector and electrical signals of two types of light receiving outputs which are detected with phases being made different from each other by the pair of divided photo detectors of the second photo detector.

The operation of the optical distance measuring apparatus according to the fourth aspect of the present invention will be described below.

According to the present invention, a luminous flux irradiated from the light source to an object under measurement is diffracted upon incidence on the object under measurement, and a luminous flux including a zero order diffracted light and a first order diffracted light is emitted. The separating element divides this luminous flux into two luminous fluxes, and the first delay element delays advancing of a luminous flux of a portion of the diffracted lights constituting one of the divided luminous fluxes. Then, in a state that the zero order diffracted light and the first order diffracted light are made to interfere with each other, the pair of divided photo detectors of the first photo detector separately detects the lights in this state.

On the other hand, the second delay element delays, by a different phase from that of the first delay element, advancing of a luminous flux of a portion of the diffracted lights constituting another one of the divided luminous fluxes. Then, in a state that the zero order diffracted light and the first order diffracted light are made to interfere with each other similarly to the above, the pair of divided photo detectors of the second photo detector separately detects the lights in this state.

Moreover, the output summation/difference detection unit detects an output value of a sum or a difference of electrical signals of two types of light receiving outputs which are detected with phases being made different from each other by the pair of divided photo detectors of the first photo detector and electrical signals of two types of light receiving outputs which are detected with phases being made different from each other by the pair of divided photo detectors of the second photo detector.

Therefore, according to the present invention, by detecting lights in a state of having different phases by the respective pairs of divided photo detectors of the two types of photo detectors, an optical distance can be quantified, and moreover, information of them can be amplified electrically appropriately. Thus, by performing a frequency filtering electrically appropriately in consideration of characteristics of MTF of the lens to prevent occurrence of deficit in the amount of information, reliability of the quantified information increases.

Further, information of this spatial frequency can be converted into an electrical frequency by heterodyne detection or by analyzing the modulation frequency itself, and thus it is possible to distinguish the first order diffracted light having a low frequency overlapped on a region of the zero order diffracted light from the zero order diffracted light from information of four different phases in total.

Moreover, images with phases different from each other can be taken in simultaneously by the four divided photo detectors in total, and thus images do not become information having time lags. Accordingly, information correctly reflecting changes in processes which vary at a relatively high speed can be obtained. Accompanying this, decrease in amount of light is suppressed, resulting in information having a good SN ratio.

Moreover, by the separating element of the fourth aspect constituted of a lens which is disposed on a tilted optical axis having a tilt and converts into a parallel luminous flux the luminous flux including the zero order diffracted light and the first order diffracted light, and a beam splitter dividing the luminous flux into these two luminous fluxes, the luminous flux including the zero order diffracted light and the first order diffracted light can be divided reliably.

Further, by the first delay element and the second delay element of the fourth aspect being a ¼ wavelength plate or a ½ wavelength plate or being a diffraction grating and delaying a phase of the luminous flux by 90 degrees or 180 degrees, information of four different phases in total can be created reliably. Moreover, by a prism such as a rhomboid prism being disposed between the first delay element and the first photo detector and between the second delay element and the second photo detector, these diffracted lights can be reliably made to interfere with each other before the photo detectors detect the zero order diffracted light and the first order diffracted light.

As described above, the spatial frequency reproducing apparatus and the optical distance measuring apparatus of the present invention have a structure to project two coherent lights having slightly different frequencies closely to a sample and use a reflected light or a transmitted light thereof, in which two or more detectors are disposed with a boundary line being interposed therebetween, which is located at a center of a portion where irradiation areas projected to the sample overlap. Then, a phase difference or an intensity difference is detected from a heterodyne signal obtained by the summation signal or the difference signal from these two or more detectors.

In this manner, it becomes possible to accurately observe and measure the surface profile of the sample and the thickness, the refractive index distribution, and the like of a transmissive object in an in-plane resolution less than or equal to the diffraction limit. In particular, when the difference signal is used, this effect becomes large. Accordingly, a change in the state of a cell or a microorganism, a transient change in surface state, or the like can be observed and measured.

Moreover, the spatial frequency obtained by the objective lens is converted into an electrical signal by scanning of beam spots and processing in photo detector circuits. By this, the amount of dropped spatial frequency by the MTF curve of the objective lens can be restored by electrical frequency amplification to reproduce the spatial frequency. Therefore, the intensity information and the path difference information which the sample has is reproduced accurately. Further, when the two beams are disposed quite closely, the summation signal of the photo detectors represents intensity information of the sample, and thus permeability or the like in a dyed state can be evaluated accurately.

On the other hand, when a commercialized auto-stereoscopic display, three-dimensional display using a pair of polarized glasses, or the like is used, it is also possible to display a three-dimensional image at a video rate, and thus it can be made as a useful apparatus in education, study, medical care, and the like. Further, since two beams passing through very close, substantially the same path are used, observation or measurement which is difficult to be affected by disturbance or the like can be performed.

Meanwhile, as described above, the spatial frequency reproducing apparatus and the optical distance measuring apparatus of the present invention are an apparatus detecting the signal of a light which is converged and irradiated to a sample as an output summation or an output difference of photo detectors with each other, which are symmetrical to a line including optical axes of a plurality of photo detectors disposed in a far field. Further, there is disposed an optical system effectively making all or part of the first order diffracted light and the zero order diffracted light as well as the negative first order diffracted light and the zero order diffracted light from the sample interfere with each other, so as to obtain a summation signal or a difference signal between the photo detectors which receive the interference intensity of each of them and are disposed symmetrically.

The optical system effectively making interference is an optical system making the zero order diffracted light and the positive and negative first order diffracted lights interfere with each other, which are converted into a parallel light, by using lenses to which the zero order diffracted light and the positive and negative first order diffracted lights are incident separately, or is an optical system, an imaging system, or a magnifying optical system shifting and overlapping the zero order diffracted light and part of the positive and negative first order diffracted lights to make them interfere with each other, by two groups of lenses having a tilted optical axis with respect to the optical axis of the zero order diffracted light. In this manner, it becomes possible to obtain a spatial frequency of 1.5 times or more as compared to an imaging optical system using a lens having the same NA. Therefore, a clear optical image can be obtained, which cannot be obtained with an ordinary imaging optical system.

Further, the frequency of a signal detected in each photo detector corresponds to the spatial frequency, and thus by varying the degree of amplification of frequency corresponding to the MTF curve of the lens, the path difference information which correctly reflects the spatial frequency which a sample has can be obtained. Moreover, when it is desired to observe path difference information and intensity information of a minute portion which the sample has, electrical high frequency enhancement can be performed to enhance a high-frequency area of the spatial frequency.

On the other hand, since the phase difference of both the zero order diffracted light and the first order diffracted light is given optically, and four types of interference intensity are calculated simultaneously so as to calculate an optical distance, information without time lags can be measured in real time. Then, by combining the above-described spatial frequency reproducing means, a very accurate optical distance can be measured.

Moreover, by combining with the heterodyne method, more accurate detection can be performed because of that a phase change and an intensity change can be detected quite accurately, that accurate detection is possible even when lights received by the photo detector are very weak by increasing the gain of the detection circuit system, and that the detection is not affected by disturbance lights since the signal to be detected is only a modulation signal. Therefore, it becomes possible to perform observation or measurement with a quite high resolution with respect to phase information which is very weak and low in contrast and a slight refractive index change.

BRIEF DESCRIPTION OF THE DRAWINGS

FIG. 8A is a schematic diagram of the spatial modulator and FIG. 8B is a diagram illustrating a pattern of voltage and current applied to the spatial modulator;

FIG. 21A illustrates a zero order diffracted light J0, FIG. 21B illustrates a first order diffracted light J1, and FIG. 21C illustrates a negative first order diffracted light −J1;

FIG. 22A illustrates a state that the zero order diffracted light J0 is shifted, FIG. 22B illustrates a state that part of the first order diffracted light J1 is shifted, FIG. 22C illustrates a state that another part of the first order diffracted light J1 is not shifted, and FIG. 22D illustrates a state that a negative first order diffracted light −J1 is shifted;

DETAILED DESCRIPTION OF THE PREFERRED EMBODIMENTS

Figure 1:
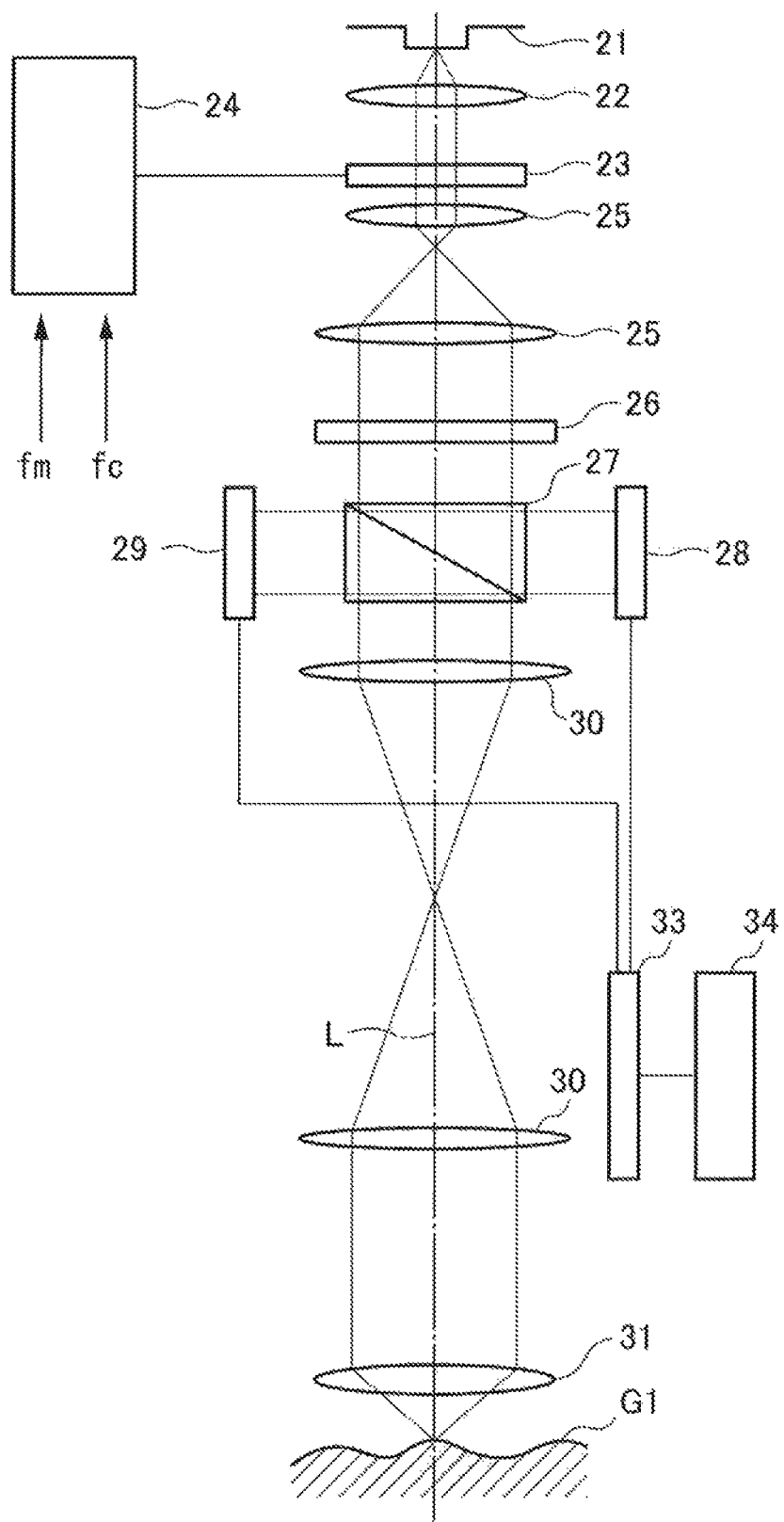
FIG. 1 is a block diagram of an optical system illustrating Embodiment 1 related to a spatial frequency reproducing apparatus of the present invention.

Hereinafter, Embodiment 1 to Embodiment 14 of a spatial frequency reproducing apparatus and an optical distance measuring apparatus according to the present invention will be described in detail based on the drawings.

Embodiment 1

The concept of Embodiment 1 of a spatial frequency reproducing apparatus according to the present invention will be described below.

A coherent light like a laser emitted from a light source is modulated into two lights with substantially different frequencies by an acoustic optical device or a spatial modulator as a first means. At that time, when the acoustic optical device is used for example, diffraction fringes are modulated by interaction of a surface acoustic wave of this acoustic optical device and the lights. A Doppler shifted light undergoes frequency modulation, and is emitted as a diffracted light of the positive or negative first order. On the other hand, when the spatial light modulator is used, a similar effect can be provided by modulating diffraction fringes written in this spatial light modulator.

Thus, the frequency modulated lights are separated into two lights close to each other and meanwhile emitted from the first means. These two lights are two-dimensionally scanned by a pupil-transmission optical system, a two-dimensional scanning device, or the like as a second means and are irradiated to a sample by an objective lens, or the like as a third means. Photo detectors disposed at positions distant from this sample in a manner of being divided in two or more along the separation direction of two lights are a fourth means. The photo detectors respectively receive lights reflected from the sample or transmitted through the sample as lights with the boundary line being interposed therebetween to extend in a direction substantially perpendicular to the separation direction of the two lights.

The lights which are received by the photo detectors in this manner are photoelectrically converted. A fifth means amplifies respective electrical signals photoelectrically converted by the photo detectors of the fourth means with respect to respective areas with the boundary line being interposed therebetween while varying a degree of amplification according to frequencies of the electrical signals.

Then, in a signal comparator as this fifth means, with a direction substantially perpendicular to the separation direction of the two lights being a boundary line, the difference signal or the summation signal of respective outputs is generated, which are located at symmetrical positions with the boundary line being interposed therebetween. This difference signal or summation signal is heterodyne detected in a data processing unit as a sixth means, to thereby detect a phase difference or detect an intensity difference.

This detected phase difference or intensity difference indicates height information of the profile of a surface of the sample in the case of reflection, or indicates information of a thickness, a refractive index distribution, or the like, that is, path difference information in the case of transmission. At this time, irradiation areas A, B of lights illustrated in FIG. 3 may be considered as a diffraction limit spot diameter, which is narrowed down by the objective lens.

The principle of operation of the spatial frequency reproducing apparatus according to this embodiment will be described in detail below.

Figure 3:
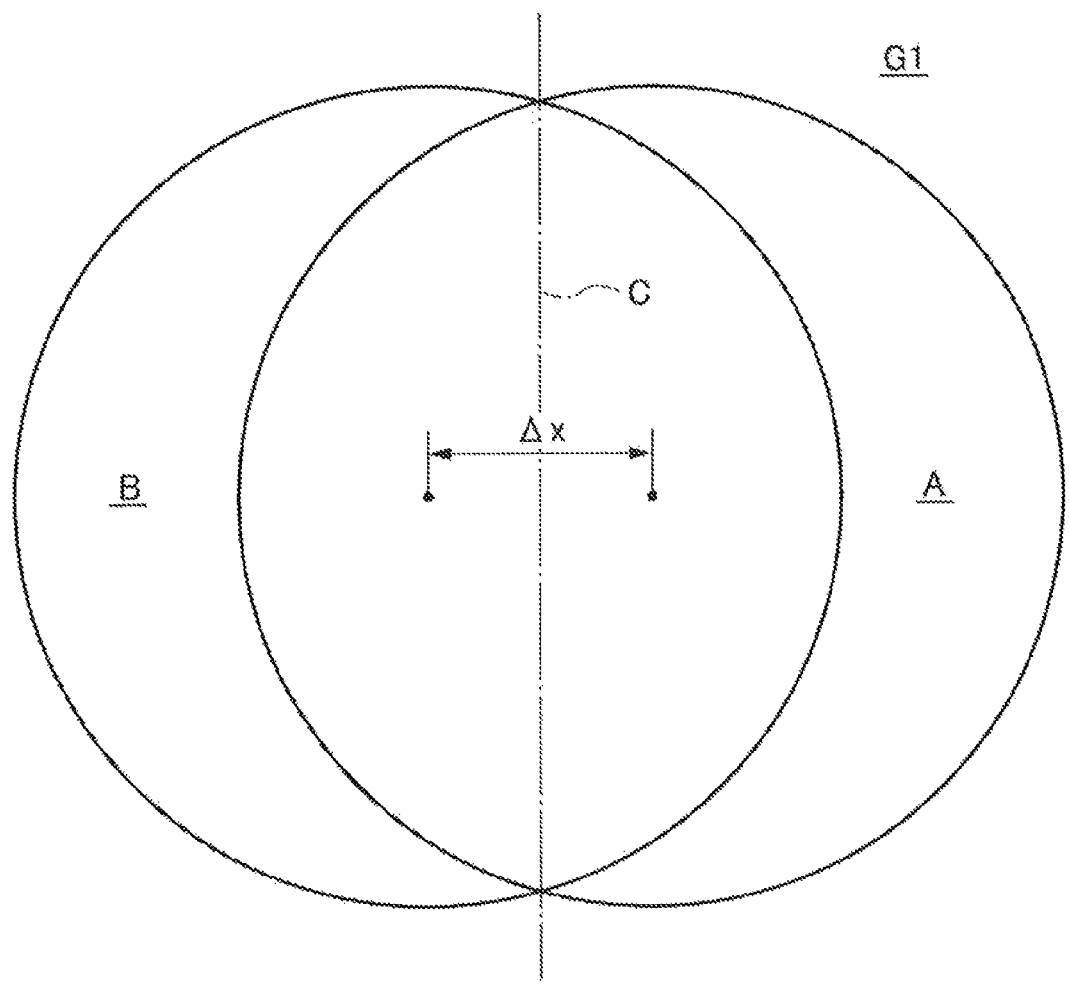
FIG. 3 is an explanatory diagram representing light irradiation areas on the object under measurement in Embodiment 1.

It is assumed that the center distance $\Delta x$ between the irradiation areas A, B of the two lights illustrated in FIG. 3 is set less than or equal to the diffraction limit which the lights have. In this case, the irradiation areas A, B of the respective lights would not be less than or equal to the diffraction limit of the Abbe's theory, but since they are lights of respective different frequencies which are displaced slightly, differential information can be obtained by heterodyne detecting these lights. At that time, when the summation signal of the photo detectors divided in two or more and disposed is used, it is substantially equivalent to a differential interference microscope, which is one kind of optical microscope, and when the difference signal thereof is used, a much higher lateral resolution can be obtained than the differential interference microscope.

For simplicity, it is considered in one dimension. First, a phase distribution of a profile d(x) of the object under measurement G1 as a sample of microorganism or the like is assumed as $Ae^{j\theta(x)}$. Here, $\theta(x)=2\pi d(x)/\lambda$. In the case of reflection as in this embodiment, the path difference becomes double, and thus a half of observed $\theta(x)$ may be assumed as the height information.

As described above, the center distance between the irradiation areas A, B of the two lights on the object under measurement G1 is $\Delta x$, and a complex amplitude distribution of lights is u(x). In this case, at a sufficiently distant location from the object under measurement G1, it is a Fourier transform of the product of the profile of the object under measurement G1 and a beam profile.

In this spatial frequency reproducing apparatus, the light received by one photo detector is modulated with $e^{j(\omega c-\omega m)t}$, and the light received by the other photo detector disposed separately at the center distance $\Delta x$ is modulated with $e^{j(\omega c+\omega m)t}$.

Therefore, the complex amplitude distribution E on the respective photo detectors becomes as follows.

$$E = \int (A e^{j\theta(x)} u(x) e^{jkx} dx \cdot e^{j(\omega c-\omega m)t} + A e^{j\theta(x+\Delta x)} u(x) e^{jkx} dx \cdot e^{j(\omega c-\omega m)t})$$

When detection of intensity I is performed with these photo detectors, the heterodyne detection of I=EE* and moreover 2ωm is performed, and thus it is as following Equation (4).

$$I(k) = A^2 \int e^{j(\theta(x)-\theta(x'+\Delta x'))} u(x)u(x') e^{jk(x-x')} dx dx' e^{-j2\omega mt} +$$
$$A^2 \int e^{-j(\theta(x)-\theta(x'+\Delta x'))} u(x)u(x') e^{jk(x-x')} dx dx' e^{-j2\omega mt}$$

Equation (4)

Figure 2:
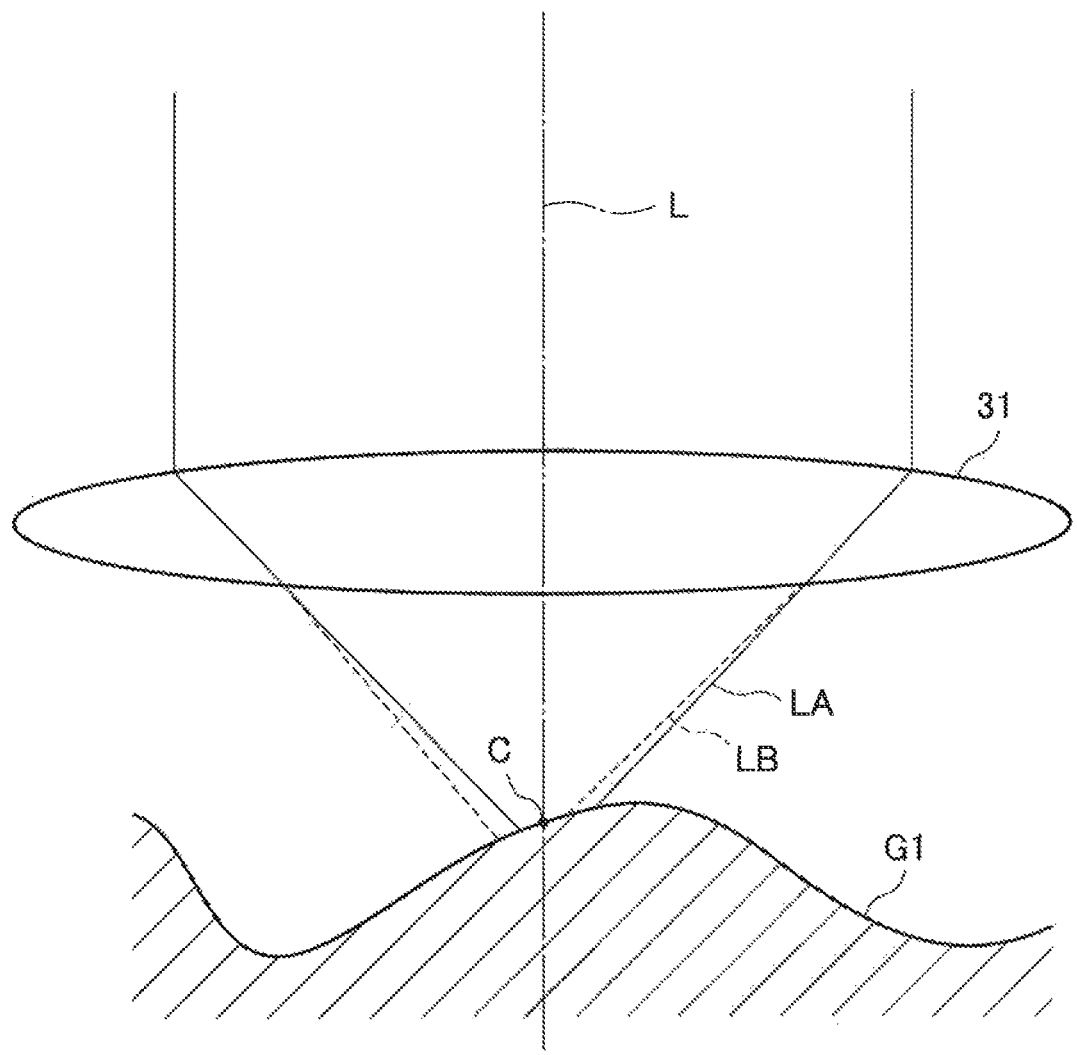
FIG. 2 is a diagram illustrating in magnification an objective lens of FIG. 1 and a portion in the vicinity of an object under measurement.

Then, substantially the center of the overlapped irradiation areas A, B of the two lights is assumed as the boundary line C of FIG. 2 and FIG. 3, and the two photo detectors are disposed separately from the object under measurement G1 and corresponding to positions with this boundary line C being interposed therebetween, the positions along the separation direction of the respective irradiation areas A, B. Here, first, what the summation signal of the signals received by the two photo detectors would be is considered. At the positions distant from the object under measurement G1, it can be considered as a Fourier transform plane. Thus, when the maximum spatial frequency which can be received by the photo detector is Kmax, the intensity I can be obtained with the summation signal from the following equation.

$$I = \int I(k) dk \text{ (the range of integral is } -K\max \text{ to } K\max)$$
$$= A^2 \int \cos(\theta(x) - \theta(x' + \Delta x') - 2\omega mt) u(x) u(x') \sin(K\max(x-x'))/dx dx'$$

When the photo detector is enlarged and disposed so as to receive up to a wide spatial frequency, $\sin(K\max(x-x'))/(x-x') = K\delta(x-x')$ holds, and thus the intensity is as following Equation (5).

$$I = A^2 \int \cos(\theta(x)-\theta(x+\Delta x)-2\omega mt) u(x)^2 dx \quad \text{Equation (5)}$$

That is, the phase difference of the separated positions of the two lights is integrated with the weight of the profiles of the lights.

By transforming Equation (5), the following equations are obtained.

$$Iq = A^2 \int \cos(\theta(x)-\theta(x+\Delta x)) u(x)^2 dx \cdot \cos(2\omega mt)$$

$$Ii = A^2 \int \sin(\theta(x)-\theta(x+\Delta x)) u(x)^2 dx \cdot \sin(2\omega mt)$$

Therefore, by an orthogonal transformation, the obtained phase difference Θ becomes as following Equation (6).

$$\Theta = \tan^{-1}(\int \sin(\theta(x)-\theta(x+\Delta x)) u(x)^2 dx / \int \cos(\theta(x)-\theta(x+\Delta x)) u(x)^2 dx) \quad \text{Equation (6)}$$

On the other hand, considering the difference signal of the two photo detectors, the following equation can be obtained similarly to the case of the summation signal.

$$I = \int I(k) dk \text{ (the range of integral is 0 to } K\max) - \int I(k) dk$$
$$\text{(the range of integral is } -K\max \text{ to 0)}$$

$$= A^2 \int \sin(\theta(x)-\theta(x'+\Delta x')-2\omega mt) u(x) u(x') (\cos(K\max(x-x')-1)/(x-x')) dx dx'$$

When the photo detector is enlarged and disposed so as to receive up to a wide spatial frequency, $(\cos(K\max(x-x'))-1)/(x-x') = \delta'(x-x') + 1/x(\delta(x)-1)$ holds, and thus the intensity is as following Equation (7).

$$I = A^2 \int d/dx(\sin(\theta(x)-\theta(x+\Delta x)-2\omega mt)) u(x)^2 dx \quad \text{Equation (7)}$$

Moreover, by transforming Equation (7), the following equations can be obtained.

$$Iq = A^2 \int d/dx(\sin(\theta(x)-\theta(x+\Delta x))) u(x)^2 dx \cdot \cos(2\omega mt)$$

$$Ii = -A^2 \int d/dx(\cos(\theta(x)-\theta(x+\Delta x))) u(x)^2 dx \cdot \sin(2\omega mt)$$

Therefore, by an orthogonal transformation, the obtained phase difference Θ becomes as following Equation (8).

$$\Theta = \tan^{-1}(-\int d/dx(\cos(\theta(x)-\theta(x+\Delta x))) u(x)^2 dx / \int d/dx(\sin(\theta(x)-\theta(x+\Delta x))) u(x)^2 dx) \quad \text{Equation (8)}$$

Here, Equation (6) and Equation (8) are compared. Qualitatively, the following points can be understood.

First, Equation (6) represents the phase difference which can be obtained as a result of smoothing with a weighting function of u(x) the phase difference of two points separated by the center distance Δx of the irradiation areas A, B, and thus represents an average phase difference in the irradiation areas A, B. This is processing equivalent to the differential interference microscope.

On the other hand, in Equation (8), a differential of the phase difference of the two points separated by the center distance Δx of the irradiation areas A, B is smoothed with the weighting function of u(x), and thus the original function is restored approximately.

Therefore, the phase difference information and the position information can be obtained with the lateral resolution equivalent to the degree of separation of the irradiation areas A, B.

Here, the case where the two photo detectors are disposed has been described. However, a similar result can be obtained when a plurality of photo detectors are disposed separately from the object under measurement G1 along the separation direction of the two lights in the vicinity of the centers of the overlapped areas of the irradiation areas A, B. In particular, when a difference output is to be obtained, a difference operation may be performed between the corresponding photo detectors among the plurality of photo detectors disposed corresponding to the vicinity of the centers of the overlapped portions of the irradiation areas A, B.

Further, when only the summation output of the plurality of photo detectors is used, a similar operation can be realized by substantially using one photo detector.

Note that for the simplicity of explanation, the equations are simplified on the assumption that the spatial frequency to be obtained is wide, but when the spatial frequency which can be obtained is not large, the portion of the δ function in the equations just becomes a convolution, and the fact remains that the resolution improves essentially. In this case, some blur occurs in the profile and the like of the object under measurement G1.

The above description is given in detail with respect to the phase, but a similar description can be given with respect to the intensity. In particular, with respect to the change in profile smaller than the irradiation areas A, B, the pattern in a far field of interference fringes formed by interference of a zero order diffraction wave and a first order diffraction wave of Fourier transform in an area being irradiated is different between the two photo detectors. Accordingly, the difference signal of the photo detectors appears as an intensity difference reflected on a tilt of the profile.

As described above, by using the heterodyne detection to process spatial frequency information on the Fourier transform plane, quite high improvement in lateral resolution can be provided particularly by the difference operation.

Specifically, in the heterodyne detection based on the summation signal of the respective photoelectrically converted signals, the phase difference between two points separated by the center distance of beams, which are the two lights, is smoothed with the weighting function of u(x), and the phase difference obtained as a result of this smoothing is indicated.

Accordingly, the heterodyne detection based on this summation signal indicates an average phase difference in the beams, and this is processing equivalent to the differential interference microscope.

On the other hand, in the heterodyne detection based on the difference signal of the respective photoelectrically converted signals, the differential of the phase difference of two points separated by the center distance of the beams is smoothed with the weighting function of u(x), and thus the original function is restored approximately.

Thus, when beams are scanned with the pupil-transmission optical system, it is possible to obtain the phase difference and the position information with the lateral resolution equivalent to the degree of separation of the beams.

In the foregoing, the case of applying the photo detectors divided in two with an optical axis being a boundary line has been described. However, the same applies in the case where a plurality of photo detectors are disposed separately from the sample along the separation direction of the beam. In particular, when the difference output is to be obtained, it may be obtained by photo detectors which are adjacent across a boundary line. Further, when only the summation output of the plurality of photo detectors is used, the same can be realized substantially by using one photo detector. In particular, in the case of the summation output, it is effective in the case where the sample is of an intensity pattern which differs in absorbance or reflectance. One example is the case where a target object is a cell which is dyed.

Then, when a tilt of the profile of the sample exists in the beams, the direction in which the lights are reflected or transmitted is different quantitatively, and thus a difference output as intensity is given to the two photo detectors. Describing more specifically, when a change in profile smaller than a beam diameter occurs, the pattern in a far field of interference fringes formed by interference of a zero order diffraction wave and a first order diffraction wave of Fourier transform in an area being irradiated with the lights is different between the two photo detectors. Accordingly, the difference signal of the two photo detectors appears as an intensity difference reflected on the tilt of the profile.

Further, although details will be described later, since the spatial frequency acquired by the objective lens is converted into an electrical frequency signal by scanning of beams and the photo detectors, the degree of gradual decrease of the spatial frequency which the objective lens originally has is modified with the degree of electrical amplification, so as to completely reproduce up to the spatial frequency which can be obtained with the objective lens.

Hereinafter, Embodiment 1 of the spatial frequency reproducing apparatus according to the present invention will be described specifically using the drawings.

FIG. 1 is a block diagram illustrating a structure of the spatial frequency reproducing apparatus according to this embodiment. As illustrated in FIG. 1, a collimator lens 22 is disposed between a laser light source 21 as a light source emitting a laser light and an acoustic optical device (AOD) 23 as the first means, which is controlled in operation by an AOD driver 24 connected thereto.

Further, a pupil transmission magnifying lens system 25 constituted of two groups of lenses, a two-dimensional scanning device 26 which two-dimensionally scans inputted laser lights, and a polarized beam splitter 27 which separates and emits inputted laser lights are disposed sequentially in line with the acoustic optical device 23. However, the pupil transmission magnifying lens system 25, the beam splitter 27, and the two-dimensional scanning device 26 may be disposed sequentially in line with the acoustic optical device 23.

Moreover, a pupil transmission lens system 30 constituted of two groups of lenses is located adjacent to this polarized beam splitter 27, and an objective lens 31 is disposed adjacent thereto opposing an object under measurement G1. That is, these members are lined up along an optical axis L. On the other hand, a photo detector 28 and a photo detector 29, each of which is a light sensor, are disposed at both adjacent positions of the polarized beam splitter 27 in a direction orthogonal to the direction in which the optical axis L passes.

These photo detectors 28, 29 are both connected to a signal comparator 33 which compares signals from these photo detectors 28, 29, and this signal comparator 33 is connected to a data processing unit 34 which finally processes data to obtain the profile and so on of the object under measurement G1.

Further, the laser light source 21 is a gas laser of He—Ne or the like, a semiconductor laser, or a solid state laser, and generates a coherent laser light. This laser light is converted into a parallel luminous flux by the collimator lens 22, which is made to be incident on the acoustic optical device 23. At this time, the incident beam diameter of the laser light is made appropriate in relation with the pupil transmission magnifying lens system 25 in a later stage by using an aperture mechanism (not illustrated) or the like. Moreover, a DSB modulation signal such as $\sin(2\pi fct)\sin(2\pi fmt)$ is applied as a modulation signal to this acoustic optical device 23 by the AOD driver 24.

When such a modulation is performed, the acoustic optical device 23, to which two frequency modulations of fc+fm and fc−fm are applied, generates a compression wave of acoustic wave equivalent to pitch d of a Bragg diffraction grating. That is, when the velocity of the acoustic wave is Va and the frequency to be applied is f, d=Va/f holds. Specifically, by this compression wave, a beam which is a laser light incident on the acoustic optical device 23 is separated into a positive and negative first order diffracted lights, and each of the diffracted lights is modulated with a frequency fc±fm. For example, $TeO_2$ is used as the material for the acoustic optical device 23, and the acoustic velocity of this material is 660 m/s.

When 40 MHz is chosen as the frequency fc of a carrier frequency, this results in d=16.5 μm, and when the laser light source 21 is used as the He—Ne laser, the angle of diffraction θ becomes an angle of approximately 2.19791 degrees. In FIG. 1, the structure is illustrated so that the optical axis L does not change, but in practice, the optical system beyond the acoustic optical device 23 is tilted in advance by the angle of diffraction θ, or a bias is applied to the two-dimensional scanning device 26 in advance so as to effectively give the tilt of the angle of diffraction θ.

When the frequency fm of about 10 KHz is added to this carrier frequency, the positive and negative first order diffracted lights are θ=2.19847 degrees and θ=2.19737 degrees and are modulated by 40.01 MHz and 39.99 MHz, respectively. When the laser lights are made to be incident on the objective lens 31 while keeping these angles, if the objective lens 31 has a focal length of 2 mm and NA of 0.9, the center distance of the beams is approximately 0.6 μm, and the diffraction limit at that time is w=0.857 μm. Specifically, the degree of separation of the beams is thus set smaller than the diffraction limit system.

Note that the resolution can be improved when the degree of separation of the beams, which is the center distance of the beams, is set smaller, but when the frequency of the heterodyne detection is decreased, the processing speed becomes slow. In this case, using an acoustic optical device with a faster acoustic velocity can increase the pitch d of the Bragg diffraction grating, and thus the processing speed can be improved. In practice, ones with an acoustic velocity Va of about 4.2E+3 m/s are known and commercially available.

Here, the pupil transmission magnifying lens system 25 disposed between the acoustic optical device 23 and the polarized beam splitter 27 is an optical system for transmitting an emission surface position of the acoustic optical device 23 in a conjugate manner to the next two-dimensional scanning device 26. The lights passing through this pupil transmission magnifying lens system 25 are transmitted to the two-dimensional scanning device 26, and through the pupil transmission lens system 30, which is conjugate to the pupil position of the objective lens 31, the lights from this two-dimensional scanning device 26 are incident on the objective lens 31 as the positive and negative first order diffracted lights having an angle difference.

Specifically, by inputting the two DSB-modulated signals of carrier frequency fc and modulation frequency fm to the acoustic optical device 23 from the outside via the AOD driver 24, these two quite close luminous fluxes can be generated.

Then, luminous fluxes emitted in two quite close directions are incident on the objective lens 31 through the pupil transmission lens system 25 transmitting the substantial pupil position of the acoustic optical device 23 to the pupil position of the two-dimensional scanning device 26 as described above, the two-dimensional scanning device 26 scanning the lights on a surface, and the pupil transmission lens system 30 for transmitting the pupil position of the two-dimensional scanning device 26 to the pupil of the objective lens 31.

Thus, two very close beams having the same diameter as each other can be obtained, like a beam LA denoted by a solid line and a beam LB denoted by a dotted line in FIG. 2.

As a result, the beams LA, LB which are luminous fluxes converged through the objective lens 31 scan the surface of the object under measurement G1 as two quite close spots. These two spots become the two signals of the frequency fc+fm and the frequency fc−fm, and thus by heterodyne detecting these signals, signals reflecting concave and convex information and a refractive index distribution of the object under measurement G1 can be obtained.

Further, the frequencies which these two beams LA, LB have are "vibration frequency of light+carrier frequency fc±modulation frequency fm." When the center distance of the two close beams is set equal to or less than the diffraction limit as described above, the respective beams would not be equal to or less than the diffraction limit of the Abbe's theory. However, since they are lights with different frequencies slightly displaced from each other, differential information can be obtained by performing the heterodyne detection. Moreover, the photo detector 29 illustrated in FIG. 1 is constituted of photo detectors divided in two or more elements. Then, with the optical axis L being a boundary line, these photo detectors are disposed so as to have a dark line in the direction perpendicular to the separation direction of the beams with this boundary line being interposed therebetween, and the beat signal is obtained from the summation signal or the difference signal thereof. At that time, when the summation signal is used, it is substantially equivalent to a differential interference microscope, and when the difference signal is used, a much higher lateral resolution can be obtained.

Here, the nature of lights to be irradiated to the object under measurement G1 will be described specifically. The lights narrowed down by the objective lens 31 become two close beams LA, LB as illustrated in FIG. 2, which are irradiated to the object under measurement G1. Note that the complex amplitude Ea of the beam LA and the complex amplitude Eb of the beam LB are as the following equations.

$$Ea = A\exp j(2\pi(fo+fc+fm)t)$$

$$Eb = B\exp j(2\pi(fo+fc-fm)t+\delta)$$

Here, δ in the equation of the complex amplitude Eb represents a phase difference in a height direction of the beam LB with reference to the beam LA, and fo represents the frequency of the light. Note that as described above, the interval between these two beams is determined by the modulation frequency fm applied to the acoustic optical device 23, and thus is irrelevant to the scanning speed.

These two beams LA, LB reflected by the object under measurement G1 illustrated in FIG. 1 and FIG. 2 are guided to the photo detector 29 via the objective lens 31, the pupil transmission lens system 30, and the polarized beam splitter 27. When the photo detector 29 is disposed at a position conjugate to the position of the two-dimensional scanning device 26, the two beams LA, LB return to the same position, and thus the phase difference δ of the two beams LA, LB is detected as the beat signal.

That is, this photo detector 29 has a structure having a not-illustrated photoelectric conversion unit, and the intensity I of the two beams LA, LB on the photo detector 29 is detected by the photoelectric conversion unit of the photo detector 29 with a value based on the following equation, and is sent to the signal comparator 33.

$$I = (Ea+Eb)(Ea+Eb)^* = A^2 + B^2 + 2AB\cos(2\pi^*2fmt+\delta)$$

Accompanying this, by performing a phase comparison of the heterodyne detection of the frequency 2fm using the signal comparator 33 illustrated in FIG. 1, the phase difference δ can be measured. Thus, the position information is obtained.

Now, the photo detector 28 disposed to oppose the photo detector 29 across the polarized beam splitter 27 also has a structure having a not-illustrated photoelectric conversion unit. Then, the beat signal of the incident beam of the diffracted light generated in the acoustic optical device 23 is made to be incident on this photo detector 28, and is detected by the photoelectric conversion unit of the photo detector 28. That is, the phase difference generated in the optical system or the like from the acoustic optical device 23 is detected by the photoelectric conversion unit of the photo detector 28, and hence the photo detector 28 serves a role of giving the reference for phases.

On the other hand, in the photo detector 29 as described above, the beat signal to which the phase difference information between the two beams, the beam LA and the beam LB, is added is detected by the photoelectric conversion unit in the photo detector 29, and is sent to the signal comparator 33. Therefore, by performing a comparison of these two phases in the signal comparator 33, the true phase difference δ is detected. This true phase difference δ is δh=λδ/4π, which is the average phase difference of the beam LA and the beam LB, that is, the difference information of the average height h. Here, λ represents the wavelength of the laser light emitted from the laser light source 21.

When the information is sent to the data processing unit 34 constituted of a CPU, a memory, and so on and connected to the signal comparator 33, this information is recorded together with scanning information of a flat surface in the data processing unit 34, and profile information of the surface of the object under measurement G1 can be derived easily. Further, when faster data are to be obtained, this can be realized by using the acoustic optical device 23 having the acoustic velocity Va that is as high as possible.

On the other hand, to perform the heterodyne detection in this embodiment, part of the irradiated modulation signal is taken out by the beam splitter 27, and a reference signal is obtained in the photo detector 28. Then, a differential output is obtained from this reference signal and the signal detected in the photo detector 29 divided in two, and the phase difference information and the intensity information are obtained by the signal comparator 33, which are then sent to the data processing unit 34.

In the data processing unit 34, the information obtained together with the scanning information is displayed in the form of an image or data on a display, or stored as data in the memory.

However, the photo detector 28 is not always necessary, and a comparison may be performed with a signal outputted to the acoustic optical device 23, that is, a signal itself applied to the acoustic optical device 23. In this case, a delay due to the circuit system, the acoustic optical device, or the like occurs, but performing correction of this delay in advance, or the like can prevent it from largely affecting the phase difference detection, and so on.

Further, the two quite close spot lights scanning the surface of the object under measurement G1 are lights having different frequencies from each other. However, substantially, quite close spots can be made even with high frequencies by using a magnifying optical system such as the pupil transmission lens system 25, 30, or the like. Thus, high-speed information obtainment by high-speed scanning can be performed.

From the foregoing, by using the optical system of the spatial frequency reproducing apparatus of this embodiment as described above, it is possible to obtain three-dimensional measurement data every time two-dimensional scanning is performed. Accordingly, by using the spatial frequency reproducing apparatus of this embodiment, a change in the state of a cell or a microorganism, a transient change in surface state, or the like can be observed and measured at high speed.

On the other hand, the two lights obtained in this manner can be given a very small degree of separation by the above-described method, and have substantially no difference from information scanned by one beam. In contrast, the method to scan with one beam and obtain the differential output of the photo detector, which is divided at least in two and disposed in a far field, is the above-described DPC method.

That is, as compared to the DPC method, in such a method further using this heterodyne method, more accurate detection can be performed because of that a phase change and an intensity change can be detected quite accurately by performing the heterodyne detection, that accurate detection is possible even when lights received by the photo detector 29 are very weak by increasing the gain of the detection circuit system, and that the detection is not affected by disturbance lights since the signal to be detected is only a modulation signal.

Further, it is also possible to display a three-dimensional image by using a commercialized auto-stereoscopic display, three-dimensional display using a pair of polarized glasses, or the like, and thus it can be made as a useful apparatus in education, study, medical care, and the like. Since the degree of overlap of the two beams at that time is smaller than the beam diameter, almost no path difference occurs in the two beams. From this point, the influence of disturbance and vibration occurs simultaneously in the two beams, and thus the influence of them is canceled out.

On the other hand, in this embodiment, an example is illustrated in which the degree of separation of the beams is made much smaller than the individual beam diameters. However, the optical system of the present invention is useful even in the case where, by increasing the modulation frequency, the degree of separation of the beams becomes large, and the degree of separation to the extent of the beam diameter is needed.

Note that although an example of using the two-dimensional scanning device is described in this embodiment, in an application which needs simple data of only one direction, similar effects can be obtained when this two-dimensional scanning device is replaced with a one-dimensional scanning device. As the one-dimensional scanning device, a galvano mirror, a resonant mirror, a rotating polygon mirror, or the like can be employed. Further, the two-dimensional scanning device can be realized by preparing two above-described one-dimensional scanning devices for X direction and Y direction, and interposing a pupil transmission lens system therein. Further, a micro-mirror device using the technology of micro-machine may be employed. As this micro-mirror device, ones for both one-dimensional use and two-dimensional use are known and commercialized.

As described above, by processing spatial frequency information on a Fourier transform plane, quite large improvement in lateral resolution can be achieved particularly in difference operation. Further, as described above, the point that the intensity difference signal is data reflecting the height of profile data is also the same.

Moreover, the principle of reproducing spatial frequency information dropped in an ordinary optical imaging system will be described below.

The diffracted lights reflected by the object under measurement G1 are incident on the objective lens 31 illustrated in FIG. 1, but information of high spatial frequencies in the diffracted lights are limited corresponding to the size of the aperture of this objective lens 31. That is, the higher the spatial frequency, the more the amount of high order diffracted light incident on the objective lens 31 decreases gradually. Accordingly, it becomes possible that an intensity pattern or phase pattern which the object under measurement G1 originally has is not reflected accurately on the photo detector 29.

Next, this phenomenon will be described quantitatively. First, the intensity pattern of the object under measurement G1 will be considered. The surface of the photo detector 29 is a far field surface of the object under measurement G1, and thus the surface of the photo detector 29 is the spatial frequency surface of the object under measurement G1. For example, assuming that the object under measurement G1 has an intensity pattern in a sine wave form having a pitch d, an amplitude E of light is obtained by the following equation.

$$E = A\{1 + \sin(2\pi x/d - \theta_0)\}$$

A first order diffracted light E(k) by this intensity pattern is Fourier transform of the above equation, and thus is as the following equation on a spatial frequency.

$$E(k) = A\left\{\delta(k) - \frac{1}{2}j\left(e^{-\theta_0}\delta\left(k + \frac{2\pi}{d}\right) - e^{\theta_0}\delta\left(k - \frac{2\pi}{d}\right)\right)\right\}$$

To consider in a simplified way, when a rectangular aperture radius of the objective lens 31 is a and a focal length is f, NA=a/f holds, and when the wavelength of a laser light to be irradiated is λ, a spot radius w in a focused state on the object under measurement G1 is obtained by the following equation.

$$w = 0.5\lambda/NA = 0.5f\lambda/a$$

When a distance from the optical axis L on the objective lens 31 is y, a spatial frequency k of the above-described first order diffracted light is obtained from the following equation.

$$k = 2\pi y / \lambda f$$

Accompanying this, the distance y from the optical axis L becomes a value which is obtained from the following equation, and a beam having a width 2a with this value being the center becomes a diffracted light.

$$y = \pm \lambda f / d$$

Here, when y=2a, the first order diffracted light will not be incident on the objective lens 31 at all, and this first order diffracted light will not interfere with the zero order diffracted light. Thus, the intensity information indicated by the intensity pattern will not be reproduced. This is the cut-off frequency and is as the following equation.

$$1/d = 2a/\lambda f$$

Figure 4:
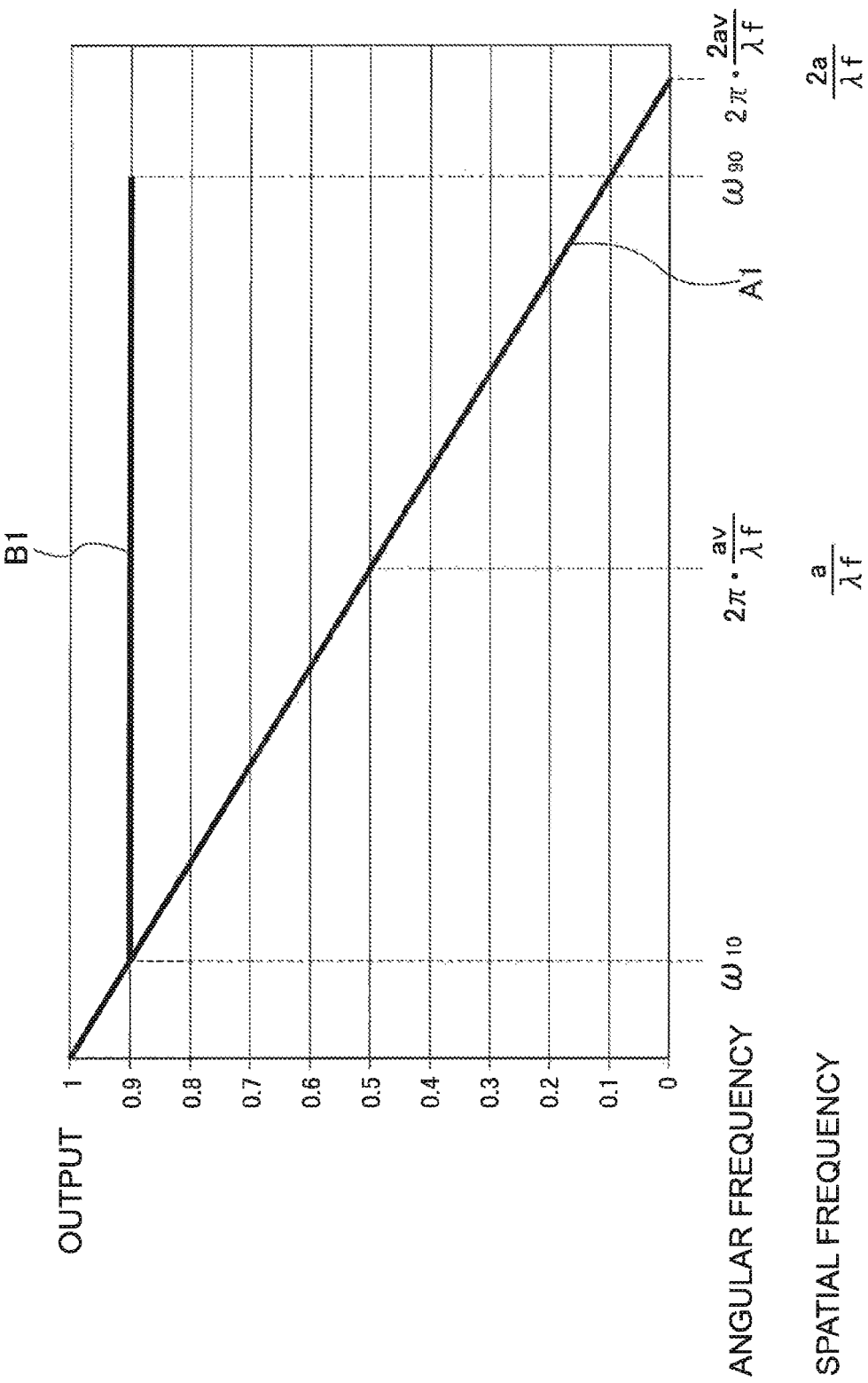
FIG. 4 is a diagram illustrating an MTF curve of an ordinary imaging optical system in which the object under measurement is an ordinary one in Embodiment 1 related to the spatial frequency reproducing apparatus of the present invention.

The relation between the spatial frequency and the degree of modulation is obtained from the above-described study, and an MTF curve illustrated in FIG. 4 represents this relation.

On the other hand, assuming that the laser light from the laser light source 21 moves at velocity v in a horizontal scanning direction by the two-dimensional scanning device 26 as a scanning system, the irradiation position x of the laser light is x=vt, where an electrical angular frequency $\omega=2\pi v/d$ and a spatial angular frequency $k=2\pi/d$ correspond unambiguously.

As is clear from the above study, the intensity information will not be reproduced at the spatial frequency 1/d in the light irradiation position on the photo detector 29. Then, information of electrical frequency v/d is conceivable as one corresponding to this spatial frequency 1/d.

Therefore, when the photo detector 29 is constituted of a photo detector which is large in some degree or constituted of a plurality of photo detectors, it is equivalent to that the electrical frequency information itself of the photo detector 29 represents a spatial frequency.

Specifically, by scanning the laser light, in the sense that the photo detector 29 obtains spatial frequency information, the photo detector 29 serves effectively as a lens. Therefore, varying the degree of amplification of electrical frequency using the photo detector 29 makes it possible to reproduce the spatial frequency information dropped through the lens.

Note that when a plurality of divided photo detectors are used, after signals of the plurality of photo detectors are amplified at different degrees of amplification, they may be outputted as a summation signal, or may be used as signals of different spatial frequency areas.

Next, the point that the band of the MTF curve which is desired to be reproduced is flattened will be described.

A high-pass filter may be added effectively to an amplification circuit of the photo detector 29, so as to flatten the band of the MTF curve illustrated in FIG. 4 which is desired to be reproduced. Alternatively, an AD converter and a digital filter may be disposed in the signal comparator 33, and after AD converting the output from the photo detector 29, an operation to flatten the band similarly with a digital filter may be performed.

For example, when the cut-off frequency in the MTF curve depicted by a solid line A1 illustrated in FIG. 4 is $2av/\lambda f$, the cut-off angular frequency $\omega$ corresponding to this cut-off frequency is $\omega = 2\pi \times 2av/\lambda f$, and the angular frequency $\omega_{10}$ of 10% of this cut-off angular frequency is as follows.

$$\omega_{10} = (2\pi/10) \times 2av/\lambda f$$

Further, the angular frequency $\omega_{90}$ of 90% of the cut-off frequency is as follows.

$$\omega_{90} = (9 \times 2\pi/10) \times 2av/\lambda f$$

Then, when the level from 10% to 90% is desired to be constant, the gain of the angular frequency $\omega_{10}$ of 10% is taken as 1, and the gain of the angular frequency $\omega_{90}$ of 90% is varied smoothly so that the gain becomes 9. Thus, as illustrated by a solid line B1 of FIG. 4, the MTF curve level from 10% to 90% becomes constant.

Consequently, by constituting the above-described high-pass filter or digital filter by such a high-pass filter, the spatial frequency can be flattened in this band. Therefore, the spatial frequency dropped through the lens can be reproduced completely by this embodiment. Of course, it becomes effective up to the vicinity of the cut-off frequency of the lens.

On the other hand, considering an intensity pattern which the object under measurement G1 originally has using a lens instead of the photo detector for example, when the spatial frequency becomes high in a strict sense, the degree of modulation decreases, and hence it is difficult to quantify the obtained intensity information. Specifically, when cells or the like are dyed to measure concentration, if the dyed target object has a structure, accurate concentration or the like cannot be measured with the lens. In particular, in a super-resolution microscope or the like intended to observe the internal structure of a cell or the like, a method which derive performance equal to or more than the resolution of the lens is used, and thus it is conceivable that a further consideration is necessary.

From the above, when measurement is attempted by an imaging optical system using a lens or a method corresponding to this system, it has not been possible to optically reproduce the spatial frequency which is dropped due to the aperture of the lens.

On the other hand, in this embodiment, the spatial frequency is converted into electrical frequency information, and thus the dropped spatial frequency can be reproduced easily.

Next, the phase pattern of the object under measurement G1 will be considered.

For example, with the optical axis L being a boundary line, a plurality of photo detectors are disposed so as to have a dark line in the direction perpendicular to the separation direction of the beams with this boundary line being interposed therebetween, so as to obtain a difference output of the respective corresponding photo detectors from each other. This is particularly effective when the object under measurement G1 is a phase object.

In this case, for simplicity, assuming that the object under measurement G1 is a phase pattern in a sine wave form at pitch d, an amplitude E of light is obtained by the following equation.

$$E \propto \exp j\left\{A \sin\left(2\pi \frac{x}{d} - \theta_0\right)\right\} = J_0(A) + J_1(A)\left(e^{j(2\pi \frac{x}{d} - \theta_0)} - e^{-j(2\pi \frac{x}{d} - \theta_0)}\right)$$

Note that $J_0(A)$ and $J_1(A)$ in the above equation are Bessel functions. A first-order light E(k) by this phase pattern is the Fourier transform of the above equation, and hence becomes as the following equation on the spatial frequency.

$$E(k) = A\left\{J_0(A)\delta(k) + J_1(A)\left(e^{-\theta_0}\delta\left(k + \frac{2\pi}{d}\right) - e^{\theta_0}\delta\left(k - \frac{2\pi}{d}\right)\right)\right\}$$

Similarly to the above description, since the aforementioned first order diffracted light will not be able to interfere with the zero order diffracted light, a frequency at which phase information indicated by the phase pattern is not reproduced is the cut-off frequency, which is the same as the intensity information. However, in the case of the phase information, unlike the intensity information, the phase of the first order diffracted light is displaced 180 degrees with the optical axis L being a boundary. Accordingly, by considering an area to be made to interfere with the zero order diffracted light so as to obtain a difference output between the corresponding photo detectors with the optical axis L being a boundary, a phase I is obtained by the following equations.

$$I \propto 8J_0(A)J_1(A)\frac{\lambda f}{d}\cos\theta_0$$

when the spatial frequency is in the range of $$0 \le \frac{1}{d} \le \frac{a}{\lambda f}.$$

$$I \propto 16J_0(A)J_1(A)\left(a - \frac{\lambda f}{2d}\right)\cos\theta_0$$

when the spatial frequency is in the range of $$\frac{a}{\lambda f} \le \frac{1}{d} \le \frac{2a}{\lambda f}.$$

In this manner, path difference information which is phase difference information can be visualized. The MTF curve in this case is derived by the above-described equation and is as illustrated in FIG. 5.

On the other hand, as described above, assuming that the laser light from the laser light source 21 moves at velocity v in a horizontal scanning direction by the two-dimensional scanning device 26 as a scanning system, the irradiation position x of the laser light is x=vt, and thus the electrical angular frequency $\omega=2\pi v/d$ and the spatial angular frequency $k=2\pi/d$ correspond unambiguously. However, a difference from the intensity information is that the MTF curve has characteristics as if it has passed through a band pass filter.

Figure 5:
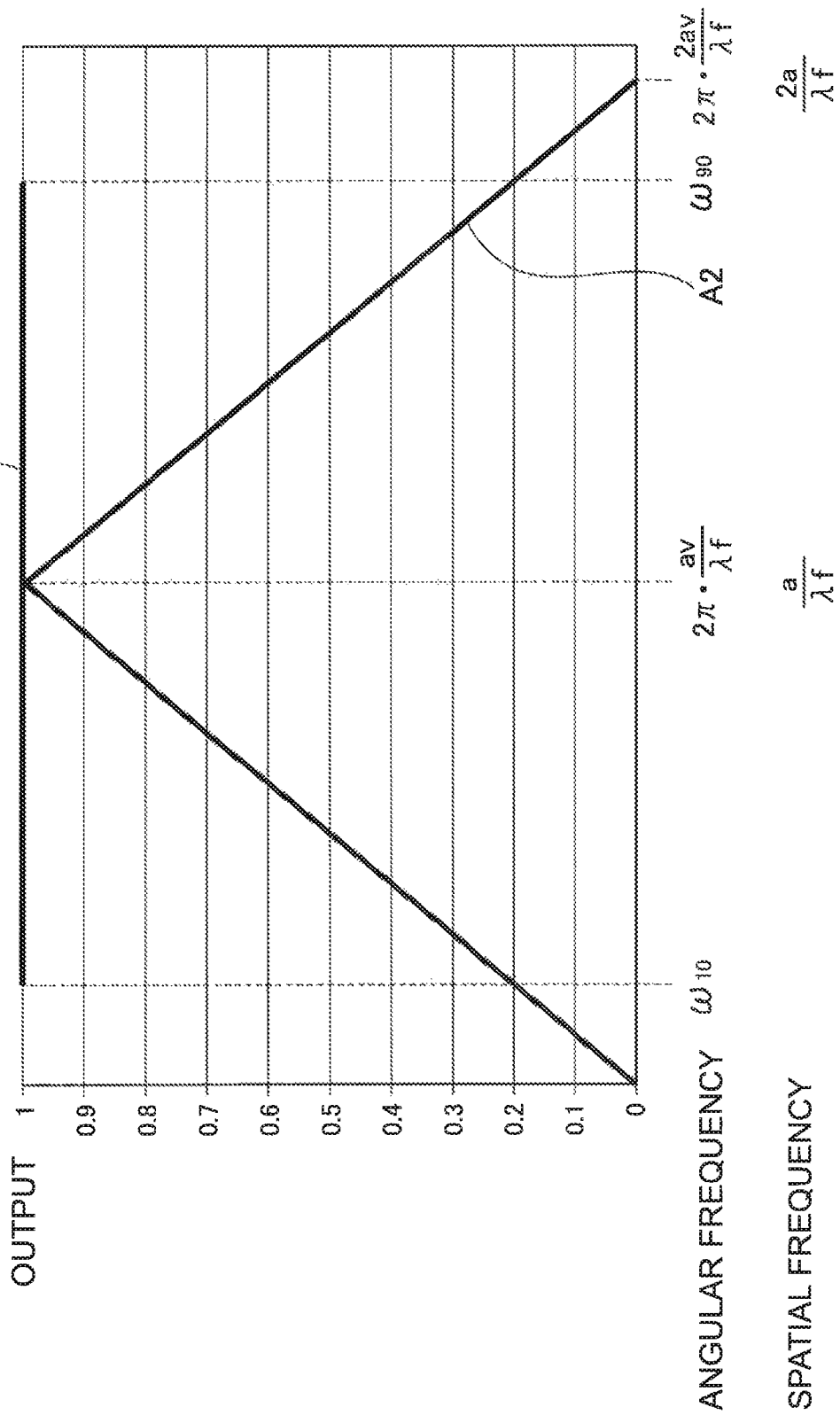
FIG. 5 is a diagram illustrating an MTF curve of an optical system based on a difference output when the object under measurement is a phase object in Embodiment 1 related to the spatial frequency reproducing apparatus of the present invention.

Therefore, a band elimination filter may be added effectively to an amplification circuit of the photo detector 29, so as to flatten the band of the MTF curve illustrated in FIG. 5 which is desired to be reproduced. Alternatively, an AD converter and a digital filter may be disposed in the signal comparator 33, and after AD converting the output from the photo detector 29, an operation to flatten the band similarly with a digital filter may be performed.

The MTF curve in this case is a curve having a shape with the frequency of ½ of the cut-off frequency being a peak. Thus, for example, when the cut-off frequency in the MTF curve depicted by a solid line A2 in FIG. 5 is 2av/λf, the cut-off angular frequency ω corresponding to this cut-off frequency is ω=2π×2av/λf, and the angular frequency $\omega_{50}$ of 50% of this cut-off angular frequency is as follows.

$$\omega_{50}=(5\times 2\pi/10)\times 2av/\lambda f$$

Further, the angular frequency $\omega_{10}$ of 10% and the angular frequency $\omega_{90}$ of 90% are as follows.

$$\omega_{10}=(2\pi/10)\times 2av/\lambda f$$

$$\omega_{90}=(9\times 2\pi/10)\times 2av/\lambda f$$

Then, when the level from 10% to 90% is desired to be constant, the gain of the angular frequency $\omega_{50}$ of 50% is taken as 1, and the gains of the angular frequency $\omega_{10}$ of 10% and the angular frequency $\omega_{90}$ of 90% are varied smoothly so that the gains become 5. Thus, as illustrated by a solid line B2 of FIG. 5, the MTF curve level from 10% to 90% becomes constant.

Consequently, by constituting by the above-described band elimination filter and digital filter so that the range of 10% to 50% is a low-pass filter having a gain from five times to one time and the range of 50% to 90% is a high-pass filter having a gain from one time to five times, the spatial frequency can be flattened in this band. Therefore, the spatial frequency dropped through the lens can be reproduced completely by this embodiment. Of course, it becomes effective up to the vicinity of the cut-off frequency of the lens.

By correcting the gain for the frequency of a signal detected by the photo detector 29 in this manner, the spatial frequency drop in an optical system based on the MTF curve can be corrected, and thus it is optimum for obtaining quantitative measurement data. Moreover, by making these frequencies variable, they can be changed to various desirable data. For example, when it is desired to observe in detail changes of intensity information or path difference information of an observation target, information having a high spatial frequency may be emphasized. Specifically, the gain may be changed so as to emphasize the high-frequency of the signal obtained by the photo detector.

Further, when it is desired to perform smoothing in image processing, emphasizing of low-frequency of the spatial frequency may be performed. Specifically, the gain may be changed so as to emphasize a low frequency of a signal obtained by the photo detector. In this manner, by including a kind of equalizer having a function to variably change a frequency for a signal of a photo detector, it becomes possible to change a spatial frequency. Again, regarding measurement, flattening the MTF curve is conceivably correct.

Figure 6:
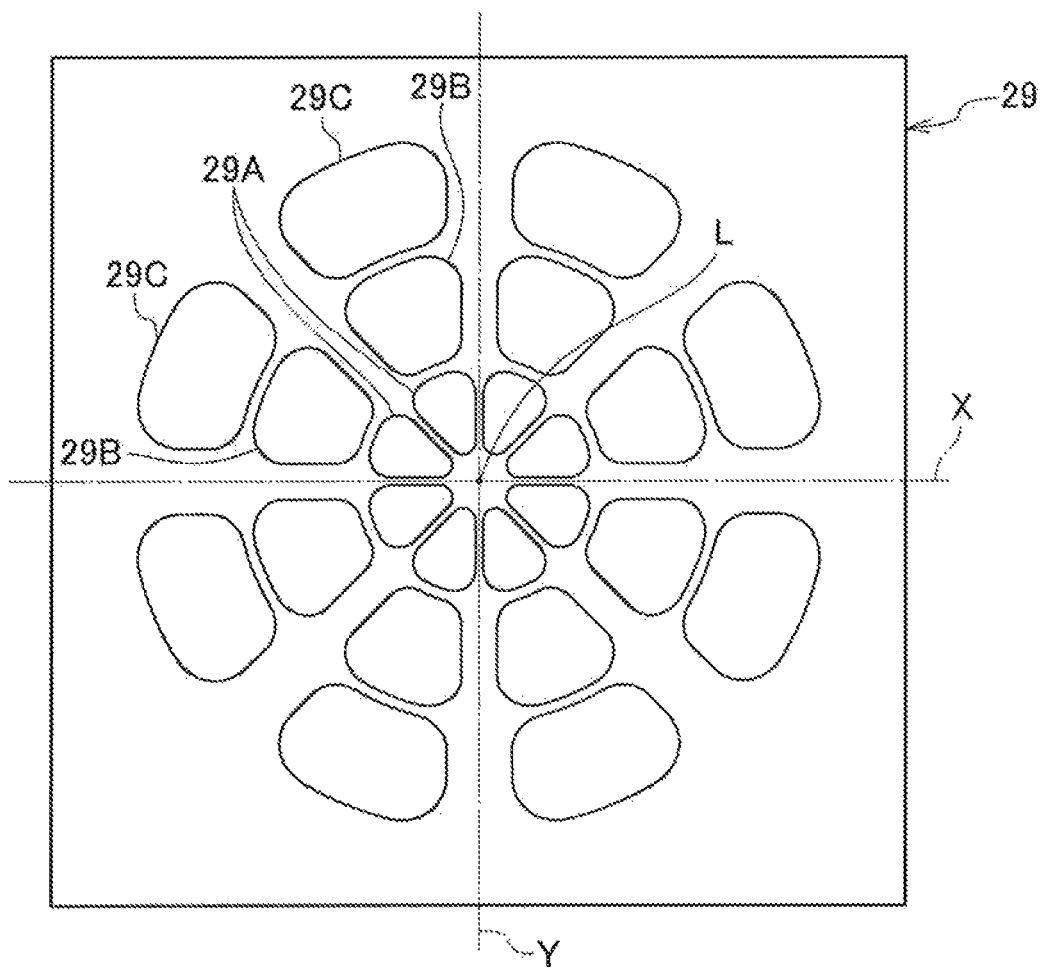
FIG. 6 is a diagram illustrating an example of disposition of divided photo detectors applied to Embodiment 1 related to the spatial frequency reproducing apparatus of the present invention.

Next, an example of a structure in which the photo detector 29 is formed of a plurality of small divided photo detectors is illustrated in FIG. 6, and the structure of such a photo detector 29 will be described below based on this diagram.

As illustrated in FIG. 6, with the optical axis L being a boundary line, the plurality of divided photo detectors are disposed two-dimensionally in a separation direction X of beams which are laser lights and in a crossing direction Y perpendicular thereto with the boundary line being interposed therebetween. In the case of this example, an example in which the spatial frequency area is divided into three concentric areas is illustrated.

Specifically, in the case of this photo detector 29, inside divided photo detectors 29A are disposed, which are formed in wedge-like shapes and are equally divided in eight around the optical axis L as the center of the detectors. In the form of surrounding the periphery of the inside divided photo detectors 29A, intermediate divided photo detectors 29B are disposed, which are formed in a trapezoidal shape and is likewise equally divided in eight. Moreover, in the form of surrounding the periphery of the intermediate divided photo detectors 29B, outside divided photo detectors 29C are disposed, which are formed in a trapezoidal shape and is likewise equally divided in eight.

Therefore, the above-described three concentric areas are roughly designated as a low frequency area, an intermediate frequency area, and a high frequency area of the spatial frequency, and accompanying this, the inside divided photo detectors 29A are designated as ones for the low frequency area of the spatial frequency, the intermediate divided photo detectors 29B as ones for the intermediate frequency area of the spatial frequency, and the outside divided photo detectors 29C as ones for the high frequency area of the spatial frequency. Moreover, amplification factors of divided photo detectors of these three divided areas are constant, or gains are varied in the three areas. Furthermore, amplification factors by electrical frequency are varied for respective signals of the areas.

In this case, the frequency areas are set independently as compared to the case where one photo detector represents three areas, which is equivalent to disposing an electrically very steep filter. Further, frequency characteristics of a photo detector deteriorate when it increases in size, but such a structure can also prevent this deterioration of frequency characteristics.

Therefore, by thus dividing each spatial frequency area by several divided photo detectors to receive lights, the apparatus has an advantage that the scanning speed and signal processing speed in its entirety can be improved.

Further, when a beam is scanned, generally the horizontal scanning direction is a high-speed scanning direction, and a resonant mirror type is often used as a scanning device for this horizontal scanning direction. With the resonant mirror type scanning device, scanning is in a sine wave form, and part of this sine wave is used as a scanning range. For example, when the scanning range is set to about 80% of the sine wave, the speed of scanning angle in an end of the scanning range is about 60% of the speed in the center. Therefore, even for the same target, the frequency in the end is 60% compared to the frequency in the center.

From the above, with the scanning angle or the scanning speed being measured in advance, a frequency gain may be changed together with a display position based on this information. The change of the frequency gain may be modified digitally by using a table for position and speed.

On the other hand, recently, micro-mirror devices made by micro-machine technology are emerging. In the micro-mirror devices a moment of inertia is low, and thus it is becoming increasingly possible to even out the scanning speed on a sample surface by effectively varying the amplitude in one scanning. Use of such a micro-mirror device evens out the scanning speed, and when an image is formed, evening out of obtainment timing of data enables to obtain data at even intervals and also the frequency need not be changed, simplifying the operation. Note that besides them, such devices which can even out the speed include ones using a rotating polygon mirror or an acoustic optical device, and ones using an optical crystal.

Embodiment 2

This is an embodiment in the case where the reflective optical system described in Embodiment 1 is replaced with a transmissive optical system.

Figure 7:
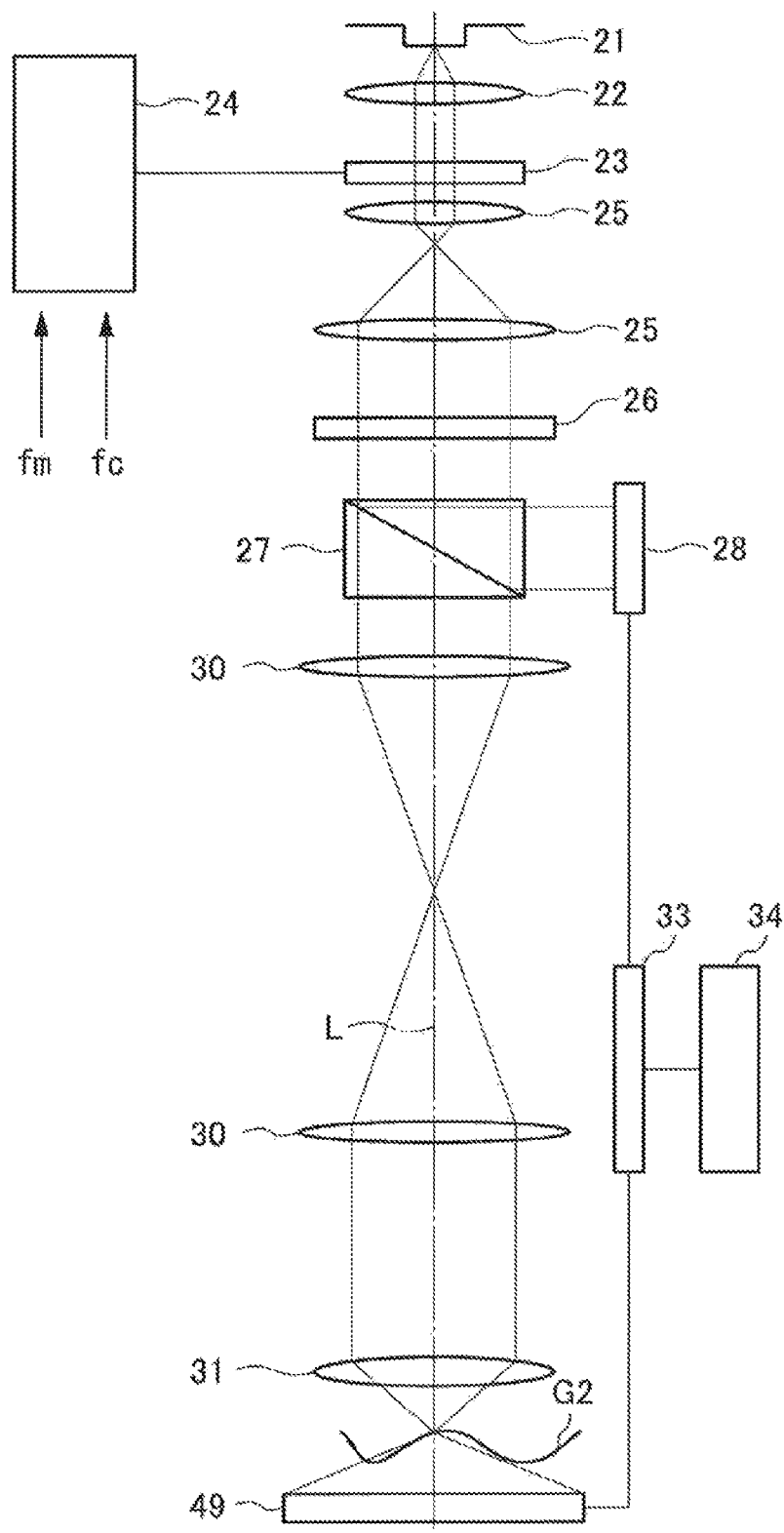
FIG. 7 is a block diagram of an optical system illustrating Embodiment 2 related to the spatial frequency reproducing apparatus of the present invention.

FIG. 7 is a block diagram illustrating a spatial frequency reproducing apparatus using a transmission type optical system according to this embodiment. The major part of the optical system is the same as in Embodiment 1 and hence is omitted from description. In this embodiment, as illustrated in FIG. 7, the lights gathered at the objective lens 31 transmit an object under measurement G2. Accordingly, it is characterized in that a photo detector 49 is disposed on the side opposite to the objective lens 31 across the object under measurement G2. That is, in the case of this embodiment, the photo detector 49, which is divided in the form that a dark line extends in a perpendicular direction to the separation direction of two beams, is disposed on an extended line of the optical axis L of the objective lens 31.

From the above, according to this embodiment, as compared to the reflection type optical system, the photo detector 49 can be disposed closely to the object under measurement G2, and thus it is possible to set the spatial frequency which can be obtained to a very high frequency. Therefore, by converting signal gains of electric high-frequency signals which can be obtained with adjacent photo detectors by frequency similarly to Embodiment 2, the MTF curve can be flattened and used for measurement, or emphasizing of high-frequency can be performed to emphasize a refractive index change or a shape change of a cell or the like.

In particular, by transmission, a state change of living cells can be observed in real time non-invasively without dyeing, and hence it can serve a large role for examination of properness of IPS or ES cells, examination of the presence of cancer cells, and the like. This is a quite different characteristic from a measuring device which has a high magnification but is only able to perform observation of a living organism in a dead state, such as an electron microscope. In this manner, particularly for transmission, this embodiment has a large characteristic that the photo detectors can be disposed adjacently. This means that since the photo detectors are equivalent to a kind of lens as described above, spatial frequency information which are not possible with an objective lens can be obtained.

Embodiment 3

This embodiment is characterized in that as a member for applying modulation, a spatial modulator is used as a substitute for the acoustic optical device 23.

Figure 8A:
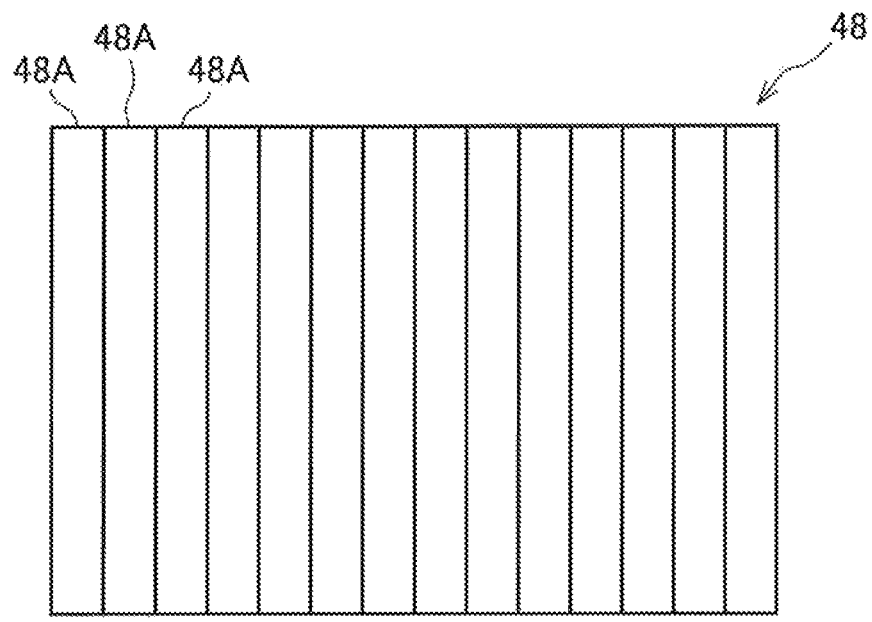
FIGS. 8A and 8B are diagrams illustrating a spatial modulator applied to Embodiment 3 related to the spatial frequency reproducing apparatus of the present invention, where

FIG. 8 are conceptual diagrams illustrating a spatial modulator of this embodiment. In order to allow driving magnetic garnet films 48A constituting a spatial modulator 48 as illustrated in FIG. 8A by a voltage or current pixel by pixel, electrodes (not illustrated) are added, and this spatial modulator 48 is disposed at the position of the acoustic optical device 23 in FIG. 1. Then, by applying a voltage or current to each pixel of the magnetic garnet films 48A, the polarized surface of each pixel rotates by a magneto-optic effect, where the degree of this rotation of polarized surface is determined by the magnitude of the voltage or current to be applied. As the spatial modulator 48 having such a structure, there is one whose number of pixels is 128×128 and which has a response speed of 15 ns.

Figure 8B:
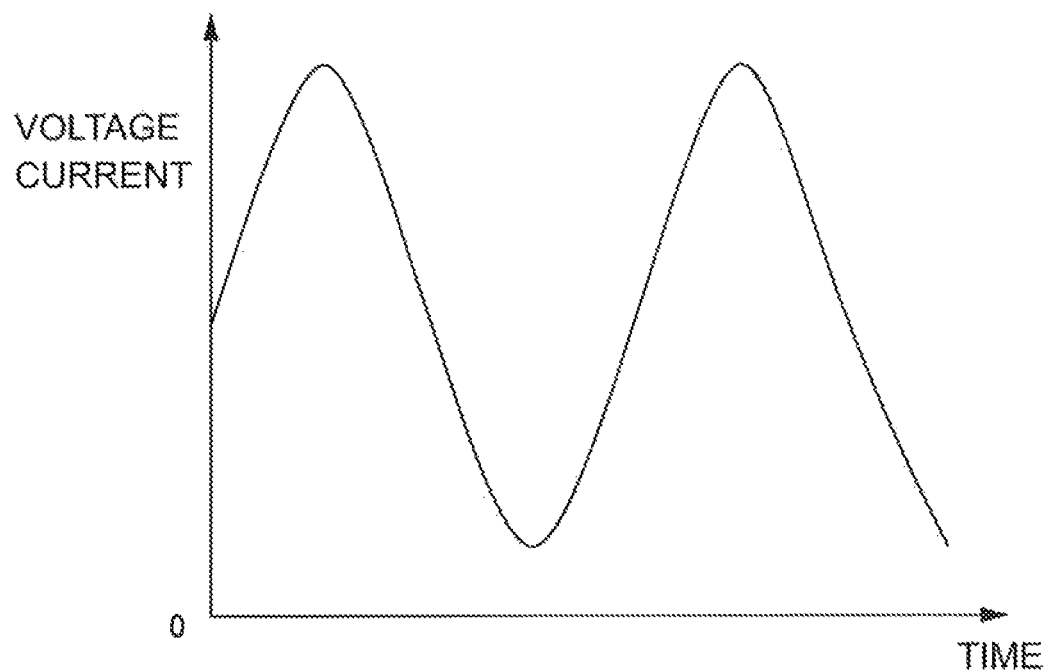

Moreover, the voltage or current is applied to each pixel in the shape illustrated in FIG. 8B in a direction perpendicular to the scanning direction of this spatial modulator 48 so that the intensity or phase of a light which passed through the polarized beam splitter 27 of FIG. 1 becomes a sine grating pattern in a strip form. At that time, by causing a single vibration at a frequency $fm=\pm 2\pi v/d$ which is displaced in phase in each pixel, this grating can be moved at a velocity v.

Specifically, when the pitch of this grating in a sine wave form is d, and a moving speed thereof is v, the following equation holds.

$$A \cos\{2\pi/d(x-vt)\}=A/2(\exp j\{2\pi/d(x-vt)\}+\exp j\{-2\pi/d(x-vt)\})$$

Accordingly, the positive and negative first order diffracted lights have a modulation frequency fm=±2πv/d. Note that in the case of intensity, a zero order direct current component is generated, but it does not affect the beat signal since it is a direct current component.

Here, the positive and negative first order diffracted lights are to the extent that the beams are overlapped in a desired degree by the pitch of the sine grating and the magnification of the pupil transmission magnifying lens system, similarly to Embodiment 2. Further, effects similar to those of Embodiment 2 can be obtained by determining the velocity v so that the modulation frequency fm becomes about 8 MHz. The response speed of the spatial modulator 48 is set to 15 ns, but the spatial modulator in the current situation is digital and binary.

However, it is possible to perform analog modulation, and the response speed at that time is to the extent that there is a possibility of deterioration by about one order of magnitude. By using it in combination with the pupil transmission magnifying lens system, it is possible to sufficiently obtain a modulation frequency equal to or more than 8 MHz. In this case, as compared to Embodiment 2, the pupil transmission magnifying lens system becomes simple. This is because, while the modulation frequency is determined by the response speed of the device, the degree of separation of the beams can be made small when the pitch of the grating is made as large as possible.

Therefore, the smallest degree of separation is determined by the size of the device, and thus high-speed scanning is possible by appropriately selecting the size. Note that also the driving circuit and the like can be simplified by making the pixels themselves of the above-described spatial modulator 48 in a strip form as illustrated in FIG. 8.

Note that when elements which cause a Raman-Nath diffraction are used also in the acoustic optical device 23, by denoting the modulation frequency by fin, the positive and negative first order diffracted lights can be made to have the modulation frequency fin from the following equation.

$$A \cos(2\pi fmt)=A/2(\exp(j2\pi fmt)+\exp(-j2\pi fmt))$$

In this case, similar effects can be achieved by a simpler modulation signal than that of modulation like the DSB modulation.

Note that electrical gain change such as flattening the MTF curve by making the gains of obtained frequencies of the photo detectors variable is also effective in this embodiment.

Hereinafter, Embodiment 4 to Embodiment 9 related to the spatial frequency reproducing apparatus according to the present invention will be described in detail based on the drawings.

Also in the following embodiments, effects such as detecting a difference signal between corresponding photo detectors, detecting a summation signal and making its frequency variable for flattening the MTF curve to accurately obtain measurement values, emphasizing minute information included in a sample, and the like can be expected, which is the same as in the above-described embodiments and hence details thereof are omitted. Further, the following embodiments are also similar in that the summation signal has a prominent meaning in the intensity information as described above, and the difference signal has a prominent meaning in the path difference information.

Moreover, in the following embodiments, large characteristics are in common, and thus these characteristics will be simply described here together. Specifically, the method exceeds the original resolution of the lens particularly in a super-resolution area, and thus when the MTF curve is not flat in a wide range, information far from reality will be obtained.

This is an intrinsic problem in conventional optical technology such as imaging optical systems. However, the present method enables to flatten the MTF curve at least up to a spatial frequency which brings about super resolution as described above. This is a large characteristic which cannot be seen in conventional optical microscopes, and is a quite large characteristic together with the following means for improving resolution.

Embodiment 4

Embodiment 4 of the spatial frequency reproducing apparatus according to the present invention will be described below with reference to FIG. 9.

Figure 9:
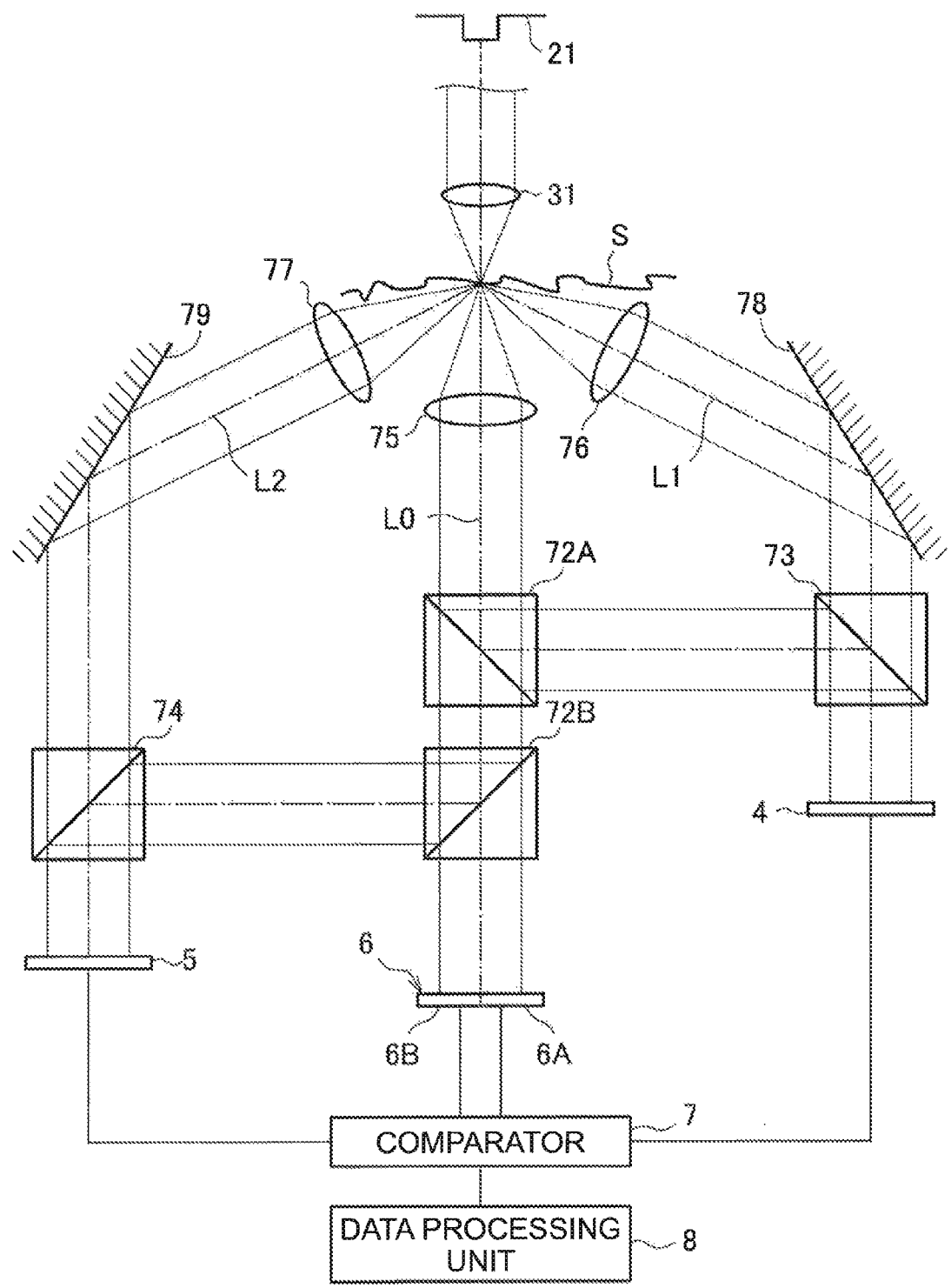
FIG. 9 is a schematic diagram representing an optical system illustrating Embodiment 4 related to a spatial frequency reproducing apparatus of the present invention.

FIG. 9 is a schematic diagram illustrating a structure of the spatial frequency reproducing apparatus of this embodiment. As illustrated in FIG. 9, a laser light source 21 which emits a light is disposed to oppose an objective lens 31 via a not-illustrated optical apparatus, and the light emitted by this laser light source 21 is converged and irradiated to a sample S as an object under measurement which is a transmissive object. On an optical axis L0 which is an irradiation optical axis of the convergent irradiation of this laser light source 21, a lens 75 as a first lens which is a convex lens is positioned, and a luminous flux which is transmitted through the sample S as the object under measurement and emitted therefrom is converted by the lens 75 into a parallel luminous flux.

On the optical axis L0 below this lens 75, two first beam splitters 72A, 72B which divide the parallel luminous flux emitted from the lens 75 to the right and the left, respectively, are disposed sequentially, and a first photo detector 6 receiving this light is located below them. However, this first photo detector 6 is constituted of two divided photo detectors 6A, 6B located with the optical axis L0 being interposed therebetween. Then, the divided photo detector 6A on the right side receives a portion on the right side of the optical axis L0 in the transmitted light from the lens 75, and the divided photo detector 6B on the left side receives a portion on the left side of the optical axis L0 in the transmitted light from the lens 75.

On the other hand, on an optical axis L1 which is a tilted optical axis having a tilt on the right side of FIG. 9 with respect to the optical axis L0, a lens 76 as a second lens which is a convex lens is located, and this lens 76 converts the luminous flux emitted from the sample S into a parallel luminous flux. On this optical axis L1, a reflecting mirror 78 for reflecting the parallel luminous flux is disposed, and further below this reflecting mirror 78, a second beam splitter 73 is located. Accordingly, the reflecting mirror 78 disposed between the lens 76 and the second beam splitter 73 reflects the emitted lights from the lens 76 toward the second beam splitter 73 side. Further, below the second beam splitter 73, a second photo detector group 4 constituted of a plurality of divided photo detectors is located.

Moreover, the first beam splitter 72A on the upper side out of the two first beam splitters 72A, 72B sends the divided luminous flux toward the second beam splitter 73 side. Accordingly, the second beam splitter 73 makes the luminous flux emitted from the lens 75 and the luminous flux emitted from the lens 76 interfere with each other, and these luminous fluxes are received by the second photo detector group 4.

On the other hand, a lens 77, a reflecting mirror 79, a second beam splitter 74, and a second photo detector group 5 which have the same structures as described above are disposed on the left side of FIG. 9 symmetrically with respect to the optical axis L0. Thus, the two first beam splitters 72A, 72B and the right and left second beam splitters 73, 74 make the luminous flux emitted from the lens 75 and the luminous fluxes emitted from the lenses 76, 77 interfere with each other.

Moreover, the above-described divided photo detectors 6A, 6B and the photo detector groups 4, 5 are connected to a comparator 7 for comparing signals from the photo detectors 6A, 6B and the photo detector groups 4, 5. Then, this comparator 7 is connected to a data processing unit 8 which finally processes data to obtain the profile of the sample S, and the like. Accordingly, the comparator 7 and the data processing unit 8 constitute an output summation/difference detection unit detecting an output summation or output difference between the divided photo detectors 6A, 6B of the first photo detector 6 located with the optical axis L0 being interposed therebetween and an output summation or output difference between the pair of second photo detector groups 4, 5.

From the above, the lights converged at the objective lens 31 illustrated in FIG. 9 forms a spot on the sample S as the object under measurement. This spot ideally has the diameter of the diffraction limit, and spatial frequency information of a pattern of the sample S inside this spot diameter is diffracted as a transmitted light. Here, when the spatial frequency of a light not incident on the lens 75 within the first order diffracted light of the spatial frequency which the sample S has is considered, the zero order diffracted light which is transmitted through the sample S and the light of a spatial frequency component lower than the aforementioned spatial frequency are incident on the lens 75. From this fact, with the lens 75 alone, the pattern of the sample S can be reproduced up to the cut-off frequency which the lens 75 has.

However, the spatial frequency of a light not incident on the lens 75 is cut, and this results in a defect of image information. Accordingly, the lens 76 and the lens 77 are disposed to have a certain tilt at positions symmetrical to each other with respect to the optical axis L0 of the zero order diffracted light, as illustrated in FIG. 9. Here, the tilt angles of the optical axes L1, L2 of the lens 76 and the lens 77 relative to the optical axis L0 of the zero order diffracted light are set to be comparable to the spatial frequency at which the contrast of the sample S becomes maximum. Of course, since there are various spatial frequencies contained in the sample S, the tilt angles may be set to an angle comparable to a spatial frequency desired to be obtained.

Thus, the luminous flux on the optical axis L1 of the lens 76 is returned by the reflecting mirror 78 and is combined by the beam splitter 73 with the luminous flux on the optical axis L0 of the zero order diffracted light separated by the beam splitter 72A. The combined light itself is guided to the photo detector group 4. Therefore, the zero order diffracted light and the first order diffracted light emitted from the lens 76 are made to interfere, and the photo detector group 4 receives these lights. This is because, at that time, the luminous flux having the highest contrast becomes the luminous flux of the spatial frequency matching the optical axis L1 of the lens 76.

When a similar optical system is considered, which is located in a direction opposite to the above-described optical system with respect to the optical axis L0 of the zero order diffracted light, the luminous flux on the optical axis L2 which is the tilted optical axis of the lens 77 is returned by the reflecting mirror 79. The luminous flux on the optical axis L2 of this lens 77 is combined by the beam splitter 74 with the luminous flux on the optical axis L0 of the zero order diffracted light passed through the beam splitter 72A and returned by the beam splitter 72B. The combined lights themselves are guided to the photo detector group 5. Therefore, the zero order diffracted light and the negative first order diffracted light emitted from the lens 77 are made to interfere, and the photo detector group 5 receives these lights.

Here, the photo detector group 4 is constituted of a plurality of divided photo detectors, and each divided photo detector obtains interference fringe intensity resulting from sampling, at appropriate pitches, interference fringes of interference of the zero order diffracted light and the first order diffracted light. Specifically, this is because when the optical axis L0 of the zero order diffracted light and the optical axis L1 of the first order diffracted light do not have a tilt, they result in even interference intensity in a luminous flux, but when they have a tilt of some degree, they result in interference fringes at even pitches. The pitches of the interference fringes are due to the emission angle of the first order diffracted light, and thus reflecting the spatial frequency which is incident on the lens 76.

Further, the photo detector group 5 is also constituted of a plurality of divided photo detectors, and each divided photo detector obtains interference fringe intensity resulting from sampling, at appropriate pitches, interference fringes of interference of the zero order diffracted light and the negative first order diffracted light, and operates in the same manner as above.

Therefore, the photo detector groups 4, 5 are disposed in the form that they are each constituted of a plurality of divided photo detectors, and information reflected by the spatial frequency can be obtained. By obtaining an output difference between the divided photo detectors which obtain substantially corresponding spatial frequencies in the photo detector groups 4, 5, higher spatial frequency information can be obtained.

The above is effective particularly in an optical system of the DPC method and an optical system combining the DPC method and the heterodyne method, which is proposed by the present inventors. For simplicity, it is described with the transmissive optical system above, but disposing this spatial frequency reproducing apparatus in a direction reflecting from a sample surface provides similar effects.

The point that the substantial spatial frequency which can be obtained by the above optical system can be increased is clarified quantitatively below. However, for simplicity of explanation, the sample S is assumed to be in the form of a sine wave with a height h and a pitch d. Specifically, an optical phase θ is represented by the following equation.

$$\theta = 2\pi h/\lambda \sin(2\pi x/d + \theta 0) \quad \text{Equation (9)}$$

The amplitude E of a light deflected from the sample S is given as a convolution of Fourier transform of Equation (9) and the aperture of the lens on a plane separated by the focal length f. However, the Bessel function which is Fourier transform of the phase of Equation (9) takes up to the positive and negative first order. Here, $E_0$ and $E_1$ which are complex amplitude distributions of the zero order diffracted light and the first order diffracted light, respectively, passing through the lens 75 and the lens 76 on which they are incident are represented by Equations (10) and (11), respectively.

$$E_0 = \int J_0\left(2\pi\frac{h}{\lambda}\right)\delta(X)rect\left(\frac{x-X}{2a}\right)dX = J_0\left(2\pi\frac{h}{\lambda}\right)rect\left(\frac{x}{2a}\right) \quad \text{Equation (10)}$$

-continued $$E_1 = \int J_1\left(2\pi\frac{h}{\lambda}\right)(j\sin\theta_0 - \cos\theta_0)\delta\left(X - \frac{\lambda f}{d}\right)rect\left(\frac{x-X}{2a}\right)dX \quad \text{Equation (11)}$$

$$= J_1\left(2\pi\frac{h}{\lambda}\right)(j\sin\theta_0 - \cos\theta_0)rect\left(\frac{x - \frac{\lambda f}{d}}{2a}\right)$$

Similarly, when $E_{-1}$ is a complex amplitude distribution which is an amplitude distribution of the negative first order diffracted light passing through the lens 77 on which it is incident, it is as following Equation (12).

$$E_{-1} = \int J_1\left(2\pi\frac{h}{\lambda}\right)(j\sin\theta_0 + \quad \text{Equation (12)}$$

$$\cos\theta_0)\delta\left(X + \frac{\lambda f}{d}\right)rect\left(\frac{x-X}{2a}\right)dX$$

$$= J_1\left(2\pi\frac{h}{\lambda}\right)(j\sin\theta_0 + \cos\theta_0)rect\left(\frac{x + \frac{\lambda f}{d}}{2a}\right)$$

From Equation (10) representing the complex amplitude distribution of the zero order diffracted light and Equation (11) representing the complex amplitude distribution of the first order diffracted light, the intensity $I_1$ on the photo detector group 4 is as the following equation, which is a result of combining the luminous flux of the lens 75 and the luminous flux of the lens 76 by the beam splitters 72A, 73 and making them interfere with each other on the photo detector group 4.

$$I_1 = \left(J_0\left(2\pi\frac{h}{\lambda}\right) - J_1\left(2\pi\frac{h}{\lambda}\right)\exp(-j\theta_0)\right)^2$$

Similarly, from Equation (10) representing the complex amplitude distribution of the zero order diffracted light and Equation (12) representing the complex amplitude distribution of the negative first order diffracted light, the intensity $I_2$ on the photo detector group 5 is as the following equation, which is a result of combining the luminous flux of the lens 75 and the luminous flux of the lens 77 by the beam splitters 74, 72B and making them interfere with each other on the photo detector group 5.

$$I_2 = \left(J_0\left(2\pi\frac{h}{\lambda}\right) + J_1\left(2\pi\frac{h}{\lambda}\right)\exp(j\theta_0)\right)^2$$

However, for simplicity, the intensity $I_1$ and the intensity $I_2$ are ones such that there is substantially no optical path difference between the zero order diffracted light and the positive and negative first order diffracted lights. When the difference output of the photo detector group 4 and the photo detector group 5 is represented in this manner, it is as following equation.

$$\Delta I = I_1 - I_2 \propto -4J_0\left(2\pi\frac{h}{\lambda}\right)J_1\left(2\pi\frac{h}{\lambda}\right)\cos\theta_0$$

Here, the reason for using the photo detector groups each constituted of an appropriate number of divided photo detectors instead of using a sole photo detector is that they enables an analysis also considering the distribution of the spatial frequency component included in the sample S from the amount of received light because the photo detector and the spatial frequency are in a correspondence.

If the zero order diffracted light and the first order diffracted light are not made to interfere, the intensity of the positive and negative first order diffracted lights is as the following equation, and when the difference output is obtained, it becomes 0.

$$I = E_1^2$$

$$= E_{-1}^2 \propto \left(J_1\left(2\pi\frac{h}{\lambda}\right)\right)^2$$

Further, if an output of summation is obtained, the phase information θ0 is completely lost. The result is only information about whether the spatial frequency exists or not in the sample S, and information desired to be known such as profile information cannot be obtained.

The optical system of the DPC method and the optical system combining the DPC method and the heterodyne method, to which it is effective to specifically apply the above-described optical system, will be described below. Here, FIG. 10 illustrates a block diagram of a transmissive optical system in the DPC method, and FIG. 11 illustrates a block diagram of a reflective optical system in the DPC method.

Figure 10:
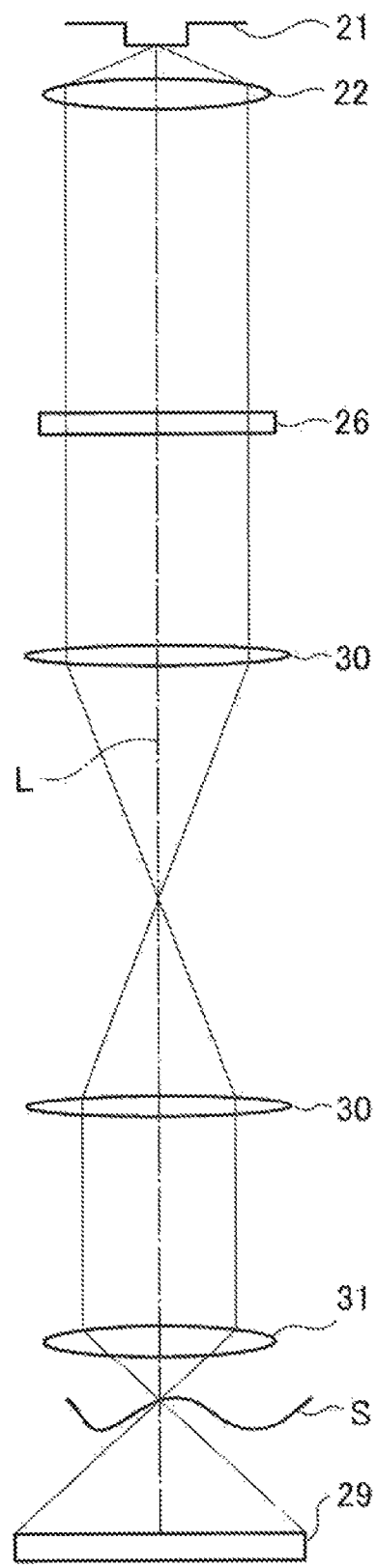
FIG. 10 is a block diagram representing a transmissive optical system in a DPC method.
Figure 11:
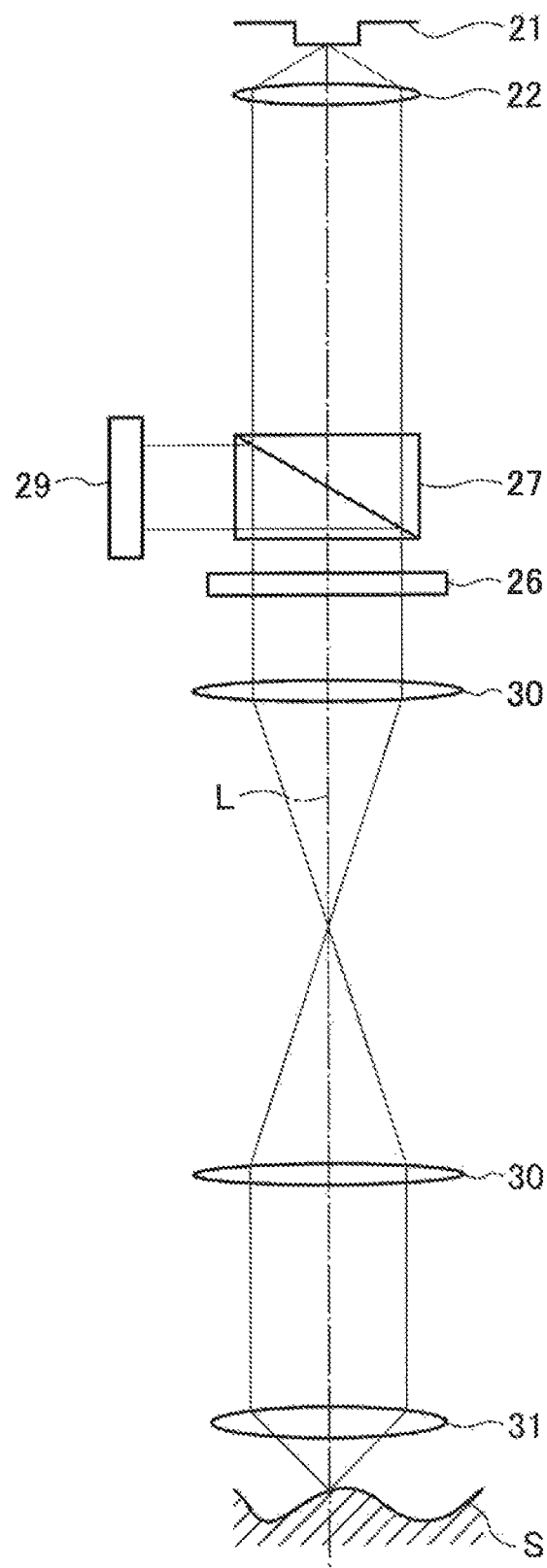
FIG. 11 is a block diagram representing a reflective optical system in the DPC method.

First, as illustrated in FIG. 10, the luminous flux from the laser light source 21 is converted into a parallel luminous flux by the collimator lens 22 and is made to be incident on the two-dimensional scanning device 26. This two-dimensional scanning device 26 is a device which scans a light on a surface and is constituted of a MEMS, a galvano mirror, a resonant mirror, or the like.

This parallel luminous flux passes through the pupil transmission lens system 30 for transmitting the pupil position of the two-dimensional scanning device 26 to the pupil position of the objective lens 31 and is incident on the objective lens 31, and thereafter is converged on the sample S. The light converged on the sample S becomes a transmitted light and is incident on the photo detector 29. This photo detector 29 is a photo detector disposed at a position substantially in a far field from the sample S, and divided at least in two symmetrically with respect to the optical axis L.

As a result, the parallel luminous flux on the optical axis L is separated into the zero order diffracted light and the positive and negative first order diffracted lights by a refractive index distribution as well as convexes and concaves of the sample S, and these separated lights are received by the photo detector 29 while interfering with each other. Accompanying this, information of the refractive index distribution and the convexes and concaves of the sample S are converted in the not-illustrated photoelectric conversion unit in the photo detector 29 based on interference information of the zero order diffracted light and the positive and negative first order diffracted lights. At that time, the aforementioned information of the sample S is reflected on the difference output between the two photo detectors of the photo detector 29, which are symmetrical with respect to the optical axis L.

On the other hand, FIG. 11 is a block diagram of the reflective optical system, which is different from the transmissive optical system of FIG. 10 in that a beam splitter 27 is disposed between the collimator lens 22 and the two-dimensional scanning device 26. It is also different in that part of the luminous flux is taken out by the beam splitter 27, and this luminous flux is received by the photo detector 29 constituted of photo detectors divided at least in two, so as to detect an output difference between them. At that time, the reflected parallel light from the sample S is substantially far field information.

The above-described structures illustrated in FIG. 1 and FIG. 7 representing the embodiments related to the spatial frequency reproducing apparatus are also the optical system combining the DPC method and the heterodyne method, which is proposed by the present inventors. Here, FIG. 1 is also a block diagram of the reflective optical system combining the DPC method and the heterodyne method, and FIG. 7 is also a block diagram of the transmissive optical system combining the DPC method and the heterodyne method.

For this reason, a detailed explanation of the optical systems combining the DPC method and the heterodyne method is omitted. However, these optical systems differ from the optical systems illustrated in FIG. 10 and FIG. 11 in that, as illustrated in FIG. 1 and FIG. 7, two quite close luminous fluxes are generated by the acoustic optical device 23 and are irradiated to the sample S which is the object under measurement.

Further, by using the optical system illustrated in FIG. 9 for the photo detector part of the optical systems as above, it is possible to largely improve information with a higher spatial frequency, that is, a lateral resolution. Moreover, it is also possible to be a spatial frequency reproducing apparatus for a parallel luminous flux system by making the luminous flux irradiated to the sample S be a parallel luminous flux, omitting the lenses 75, 76, 77 illustrated in FIG. 9, and structuring the other optical system to be the same as the above embodiment.

Note that this embodiment is of the case where the sample S has a refractive index and phase difference information as path difference information, and hence a description related to the difference signal between photo detectors has been given proactively. On the other hand, for intensity information, also in this embodiment, as described in Embodiment 1, super resolution can be achieved by obtaining a summation signal of corresponding photo detectors with each other or a summation signal of all the photo detectors.

Photo detector systems of the following embodiments may be applied to the photo detector part of the optical system of the DPC method and the photo detector part of the optical system combining the DPC method and the heterodyne method, and thus the explanation of optical systems other than the photo detector systems will be omitted in the following embodiments.

Embodiment 5

In this embodiment, a lens is installed to be tilted with respect to the optical axis L0 of the zero order diffracted light. Thus, it is possible to take in not only part of the zero order diffracted light but also part of the first order diffracted light having a higher spatial frequency compared to the case of using the same lens, realizing interference of these zero order diffracted light and first order diffracted light.

Figure 12:
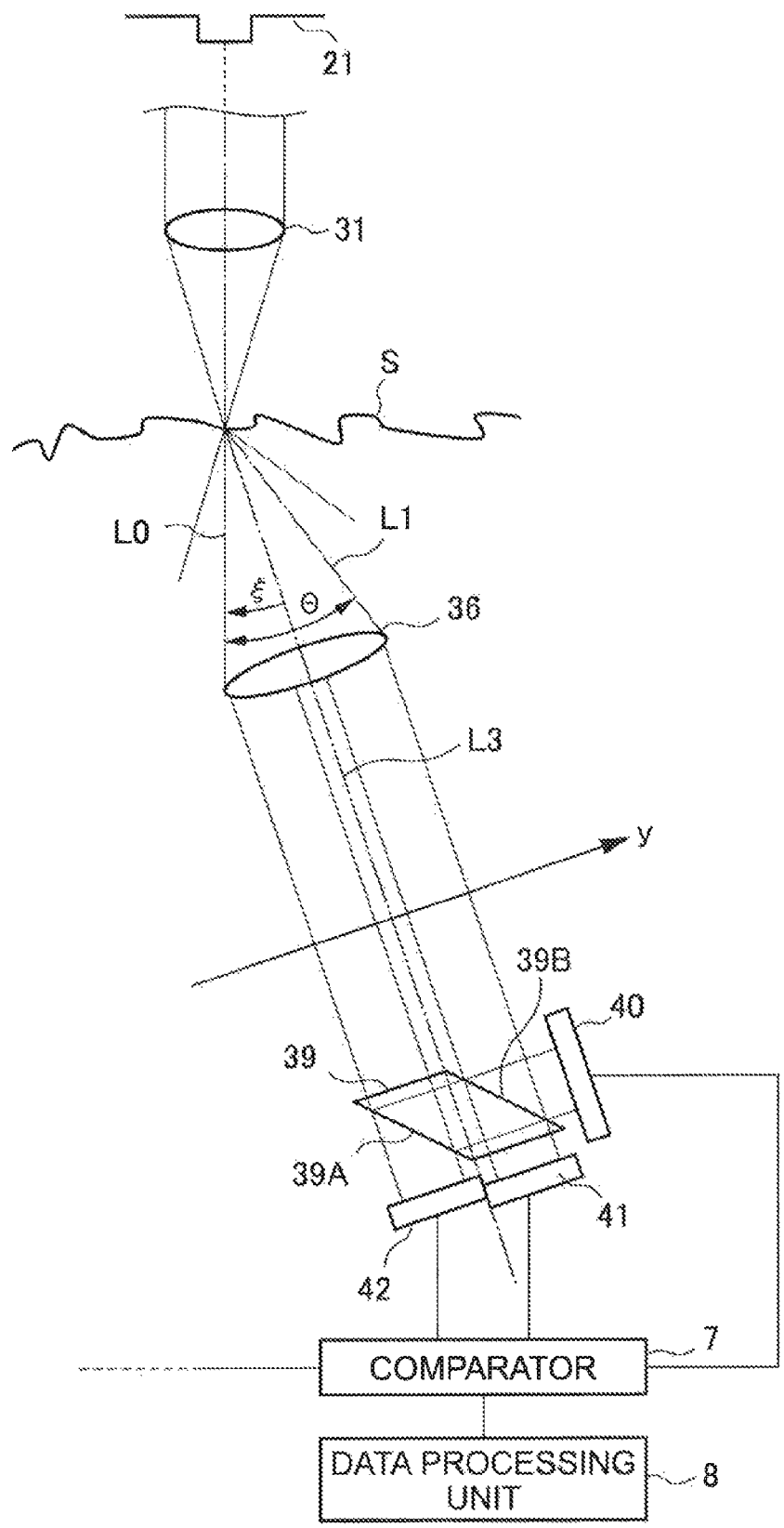
FIG. 12 is a schematic diagram representing an optical system illustrating Embodiment 5 related to the spatial frequency reproducing apparatus of the present invention.

As illustrated in FIG. 12, this embodiment is the same as in FIG. 9 up to that the parallel light is incident on the objective lens 31 and is converged on the sample S. However, in this embodiment, part of the zero order diffracted light and part of the first order diffracted light which are transmitted through the sample S are taken into a lens 36 in a state of being tilted by an optical axis L3 having an intermediate tilt angle between the zero order diffracted light and the first order diffracted light. Then, by shifting and overlapping the luminous fluxes of the partial first order diffracted light and the partial zero order diffracted light with each other by a rhomboid prism 39 or the like, their luminous fluxes are made to interfere with each other.

Further, one face of the rhomboid prism 39 is a translucent mirror 39A, the opposite face of this translucent mirror 39A is a translucent mirror 39B, and photo detectors 40, 41, 42 are disposed to receive lights which passed through the respective faces. Here, the photo detector 40 and the photo detector 41 each reflect a result of interference between the part of the zero order diffracted light and the part of the first order diffracted light. The photo detector 42 reflects a result of interference between the first order diffracted light of a low spatial frequency diffracted in an area including the part of the zero order diffracted light of the lens 36 and the part of the zero order diffracted light.

The results of interference of the zero order diffracted light and the first order diffracted light will be described with the following equations.

First, an optical system similar to the optical system illustrated in FIG. 12 is disposed also for the negative first order diffracted light to be symmetrical to the optical axis L0 of the zero order diffracted light, which is not illustrated in FIG. 12. When the difference output of these corresponding photo detectors is obtained, the following can be considered. For simplicity of explanation, when the sample S is assumed to be in the form of a sine wave with a height h and a pitch d, an optical phase θ is represented by the following equation.

$$\theta = 2\pi h/\lambda \sin(2\pi x/d + \theta 0) \quad \text{Equation (9)}$$

The amplitude E of a light deflected from the sample S is given as a convolution of Fourier transform of Equation (9) and the aperture of the lens on a plane separated by the focal length f.

However, the Bessel function which is Fourier transform of the phase of Equation (9) takes up to the positive and negative first order.

Further, as illustrated in FIG. 12, the optical axis L3 is tilted by an angle ξ substantially corresponding to $\sin^{-1}(NA)$ of the lens 36. At that time, a direction perpendicular to the optical axis L3 is y axis, and the center position of the first order diffracted light corresponding to the spatial frequency 1/d of Equation (1) is Y1.

At that time, when the optical axis L3 is tilted by the angle with reference to above Equation (2), the center of the zero order diffracted light of Equation (2) is displaced by a, and the center axis of the first order diffracted light becomes y1. Thus, a complex amplitude distribution $E_1$ is given by following Equation (13).

$$E_1 = \quad \text{Equation (13)}$$
$$J_0\left(2\pi\frac{h}{\lambda}\right)rect\left(\frac{y-a}{2a}\right) - J_1\left(2\pi\frac{h}{\lambda}\right)\left(rect\left(\frac{y-y1}{2a}\right)eyp(-j\theta_0)\right)$$

Similarly, for the negative first order diffracted light in the optical system symmetrical to the first order diffracted light with respect to the optical axis L0 of the zero order diffracted light, it is as following Equation (14).

$$E_{-1} = \quad \text{Equation (14)}$$
$$J_0\left(2\pi\frac{h}{\lambda}\right)rect\left(\frac{y+a}{2a}\right) + J_1\left(2\pi\frac{h}{\lambda}\right)\left(rect\left(\frac{y-y1}{2a}\right)eyp(j\theta_0)\right)$$

Here, y1 is f tan(Θ−ξ).
Since
tan(Θ)=λ/d, and
tan(ξ)=a/f=NA,
y1 is as the following equation.

$$y1 = f \frac{\frac{\lambda}{d} - \frac{a}{f}}{1 + \frac{\lambda a}{df}}$$

In the optical system of FIG. 12, the optical axis L3 of the lens 36 is substantially shifted and overlapped on the boundary between the zero order diffracted light and the first order diffracted light, and thus Equation (13) becomes following Equation (13)'.

$$E_1 = J_0\left(2\pi\frac{h}{\lambda}\right)rect\left(\frac{y}{2a}\right) - J_1\left(2\pi\frac{h}{\lambda}\right)\left(rect\left(\frac{y-y1}{2a}\right)eyp(-j\theta_0)\right) \quad \text{Equation (13)'}$$

Here, 0≤y≤a.
Equation (13)' is $$E_1 = J_0\left(2\pi\frac{h}{\lambda}\right) - J_1\left(2\pi\frac{h}{\lambda}\right)eyp(-j\theta_0)$$

Here, y1−a≤y≤a.
Thus, the complex amplitude distribution $E_1$ is largest when y1=a, and is zero when y1=2a.
y1=2a means that information up to the spatial frequency equivalent to 3a is obtained when seen from the zero order diffracted light. Therefore, as compared to when the same lens of NA is used, a spatial frequency up to 1.5 times can be obtained. By this amount, the optical resolution is substantially improved.
On the other hand, for the negative first order diffracted light in the optical system symmetrical to the first order diffracted light with respect to the optical axis L0 of the zero order diffracted light, when a direction perpendicular to the optical axis L2 of the negative first order diffracted light is likewise y' axis, it is as following Equation (14)'.

$$E_{-1} = J_0\left(2\pi\frac{h}{\lambda}\right)rect\left(\frac{y'}{2a}\right) + J_1\left(2\pi\frac{h}{\lambda}\right)\left(rect\left(\frac{y-y1}{2a}\right)eyp(j\theta_0)\right) \quad \text{Equation (14)'}$$

Here, −a≤y≤0.
Equation (14)' is $$E_{-1} = J_0\left(2\pi\frac{h}{\lambda}\right) + J_1\left(2\pi\frac{h}{\lambda}\right)eyp(j\theta_0)$$

Here, −a≤y'≤y1+a.
Thus, the complex amplitude distribution $E_{-1}$ is largest when y1=−a, and is zero when y1=−2a.
y1=−2a means that information up to the spatial frequency equivalent to −3a is obtained when seen from the zero order diffracted light. Therefore, as compared to when the same lens of NA is used, a spatial frequency up to 1.5 times can be obtained. It is similar to the first order diffracted light in that, by this amount, the optical resolution is substantially improved.

For the information obtained in this manner, a difference output ΔI between a summation output of the photo detector 40 and the photo detector 41 and the photo detector of the negative first order diffracted light equivalent thereto is obtained by the following equation.

$$\Delta I = E_1^2 - E_{-1}^2 \propto -4J_0\left(2\pi\frac{h}{\lambda}\right)J_1\left(2\pi\frac{h}{\lambda}\right)\cos\theta_0$$

This is substantially the same equation as that in Embodiment 4. However, the optical system is simpler compared to Embodiment 4 and is constituted of a simple element like the rhomboid prism, and shaping the lens integrally, or the like enables to make a stable optical system. Note that similar effects can be provided by the rhomboid prism substantially constituted of two half mirrors. Further, it is needless to say that a higher spatial frequency can be reproduced by making the tilt of the optical axis L3 of the lens 36 larger than the above-described angle.

Note that this embodiment is of the case where the sample S has a refractive index and phase difference information as path difference information, and hence a description related to the difference signal between photo detectors has been given proactively. On the other hand, for intensity information, also in this embodiment, as described in Embodiment 1, super resolution can be achieved by obtaining a summation signal of corresponding photo detectors with each other or a summation signal of all the photo detectors.

Embodiment 6

Embodiment 6 of a spatial frequency reproducing apparatus according to the present invention will be described below with reference to FIG. 13.

Figure 13:
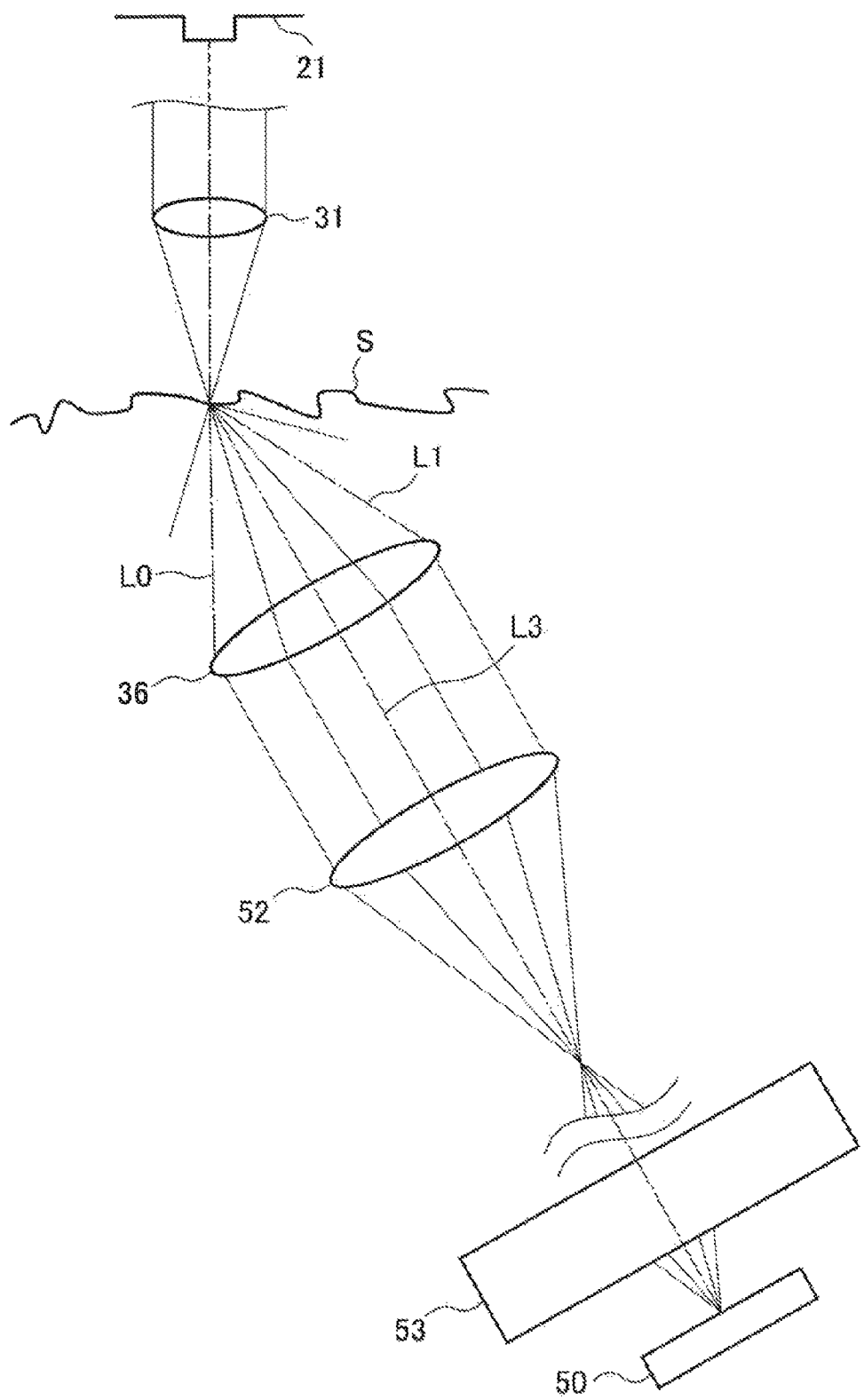
FIG. 13 is a schematic diagram representing an optical system illustrating Embodiment 6 related to the spatial frequency reproducing apparatus of the present invention.

FIG. 13 is a schematic diagram illustrating a structure of the spatial frequency reproducing apparatus of this embodiment. As illustrated in FIG. 13, in this embodiment, a lens 36 is installed to be tilted with respect to the optical axis L0 of the zero order diffracted light. Because of this, not only part of the zero order diffracted light but also part of the first order diffracted light having a higher spatial frequency compared to the case of using the same lens are taken in, realizing interference in an imaging optical system. Note that, although not illustrated, an identical optical system is disposed at a symmetrical position with respect to the axis L0 in this embodiment.

This embodiment is the same as the Embodiment 6 up to that the lens 36 is tilted and part of the zero order diffracted light and part of the first order diffracted light are obtained. In this embodiment, the diffracted lights which are converted into a parallel luminous flux by the lens 36 are gathered in the lens 52. The diffracted lights are overlapped with each other by this lens 52 in the vicinity of a focal point and substantially interfere. However, it is not interfere of the zero order diffracted light and the positive and negative first order diffracted lights, and thus it is different from imaging of the sample S itself.

Moreover, the pitches of interference fringes can be widened by elongating the effective focal length of the lens 52. If the focal lengths of the lens 36 and the lens 52 are the same, the pitches are naturally the same, and become the spatial frequency of the sample S. On the other hand, interference made by the other optical system of the negative first order diffracted light results in interference fringes with shifted pitches. However, when the photo detectors are large with respect to the pitches of the interference fringes, positioning of the elements receiving the positive and negative first order diffracted lights is difficult.

Accordingly, when the interference fringes themselves are enlarged by a magnifying optical system 53 and are made substantially equal to the size of a photo detector 50, inverse phases naturally occurs in the positive and negative first order diffracted lights, and thus the darkness and brightness reverse in the form that the zero order diffracted light becomes a bias. In this manner, information can be obtained quite easily up to an area where the spatial frequency is high. In the case of this embodiment, since the lens 52 is used, a wavefront aberration is tolerated to the extent that the phase difference between the zero order diffracted light and the first order diffracted light which are incident on this lens 52 is reflected as it is. Therefore, it is not necessary to use an expensive lens.

Here, a method of specifically adjusting photo detectors will be described briefly.

When information extracted from the sample S is phase information, the interference is performed through two systems, one between the first order diffracted light and the zero order diffracted light and one between the negative first order diffracted light and the zero order diffracted light, and the photo detectors are adjusted so that when one photo detector has the maximum amount of light, the other photo detector has almost zero amount. When information extracted from the sample S is intensity information, the interference is performed through two systems, one between the first order diffracted light and the zero order diffracted light and one between the negative first order diffracted light and the zero order diffracted light, and the photo detectors are adjusted so that when one photo detector has the maximum amount of light, the other photo detector also has the maximum amount.

Note that in this embodiment, even lenses having focal lengths which are different in some degree can be used as they are because they are to the extent that the pitches of interference fringes change in some degree if there is no large change in amount of light to be received in the photo detectors for them and the wavefront aberration in the lens surface is not large. Further, the limit of the spatial frequency which can be obtained is about 1.5 times because the principle is substantially the same as in FIG. 12. This optical system is constituted by using only the lens system and thus is very simple and strong against disturbances. Further, it is needless to say that a higher spatial frequency can be reproduced by making the tilt of the optical axis L3 of the lens 36 larger than the above-described angle.

Embodiment 7

Embodiment 7 of a spatial frequency reproducing apparatus according to the present invention will be described below with reference to FIG. 14.

Figure 14:
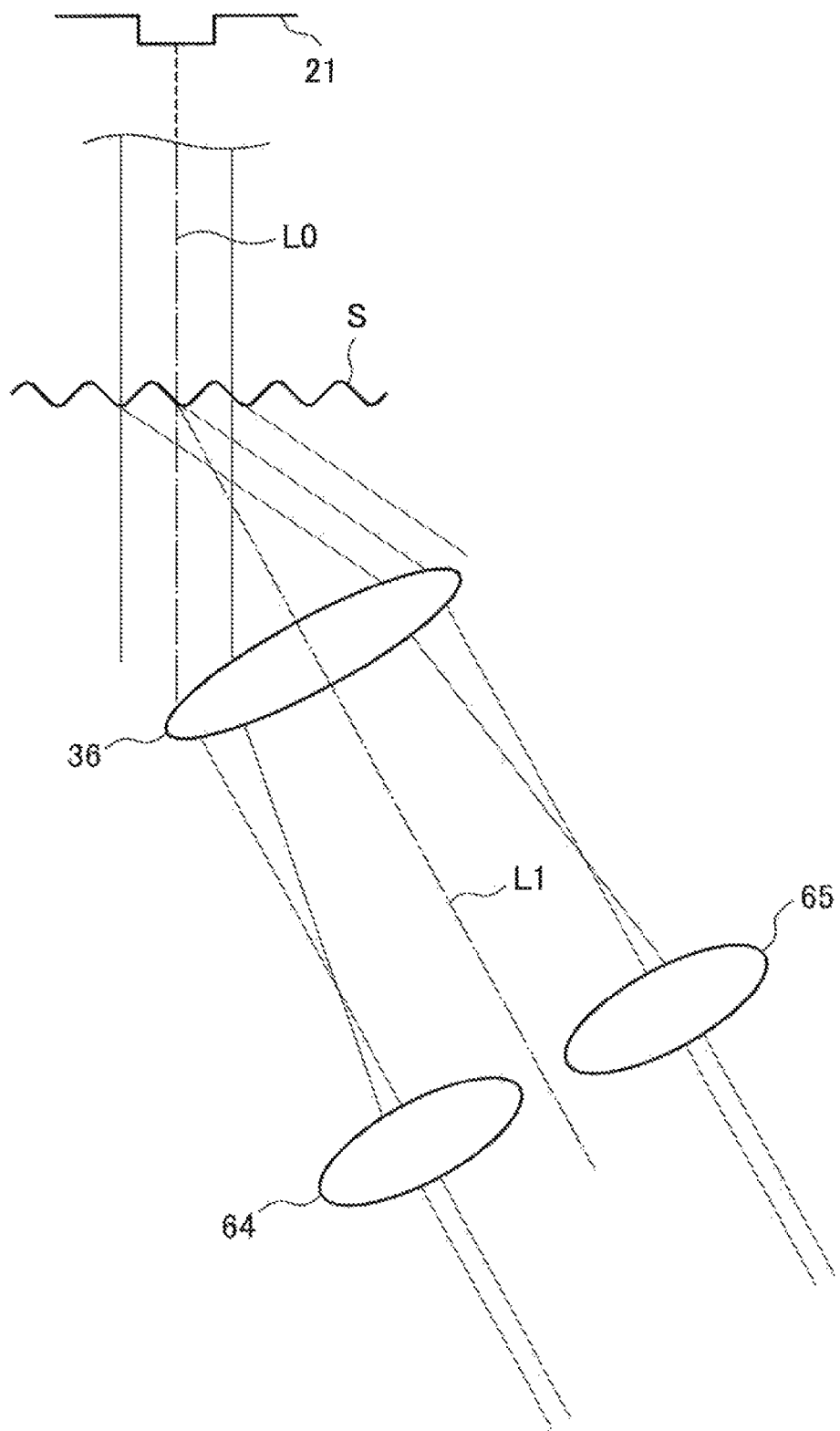
FIG. 14 is a schematic diagram representing an optical system illustrating Embodiment 7 related to the spatial frequency reproducing apparatus of the present invention.

FIG. 14 is a schematic diagram illustrating a structure of the spatial frequency reproducing apparatus of this embodiment.

As illustrated in FIG. 14, in this embodiment, a converged light is not incident on the sample S, but a parallel luminous flux having a relatively large diameter is incident thereon. In this case, a lens 36 is installed to be tilted with respect to the optical axis L0 of the zero order diffracted light. Because of this, not only part of the zero order diffracted light but also part of the first order diffracted light having a higher spatial frequency compared to the case of using the same lens can be taken in. Note that, although not illustrated, an identical optical system is disposed at a symmetrical position with respect to the axis L0 in this embodiment.

However, this embodiment is the same as the Embodiment 6 up to that the lens 36 is tilted and part of the zero order diffracted light and part of the first order diffracted light are obtained. In this embodiment, the zero order diffracted light and the first order diffracted light are both a condensed luminous flux. Separate lenses 64, 65 having focal points at respective focal positions of the lens 36 are disposed, and the condensed luminous flux is converted into a parallel luminous flux by these lenses 64, 65. After the conversion into a parallel luminous flux in this manner, the part of the zero order diffracted light and the part of the first order diffracted light are made to interfere with each other by using the optical systems illustrated in FIG. 12 and FIG. 13.

In this case, the diameter of the luminous flux to be incident on the sample S is large, and thus information in the plane is averaged. Accordingly, by providing a not-illustrated limit aperture for the incident parallel luminous flux, the information is construed as the information of this portion, or it becomes possible to detect an irregular pattern in a regular pattern. Specifically, since the direction of a regular first order diffracted light is known in advance from the design, the direction of the first order diffracted light can be suppressed by masking the focal point of the lens 36.

On the other hand, the other components will be incident on the lenses 64, 65, and thus information from a defect portion can be detected. For example, an application to defect inspection on a semiconductor wafer, inspection of unevenness in a nano-structure, or the like is possible. Note that the limit of the spatial frequency which can be obtained is about 1.5 times because the principle is substantially the same as in FIG. 12.

Embodiment 8

Embodiment 8 of a spatial frequency reproducing apparatus according to the present invention will be described below with reference to FIG. 15.

Figure 15:
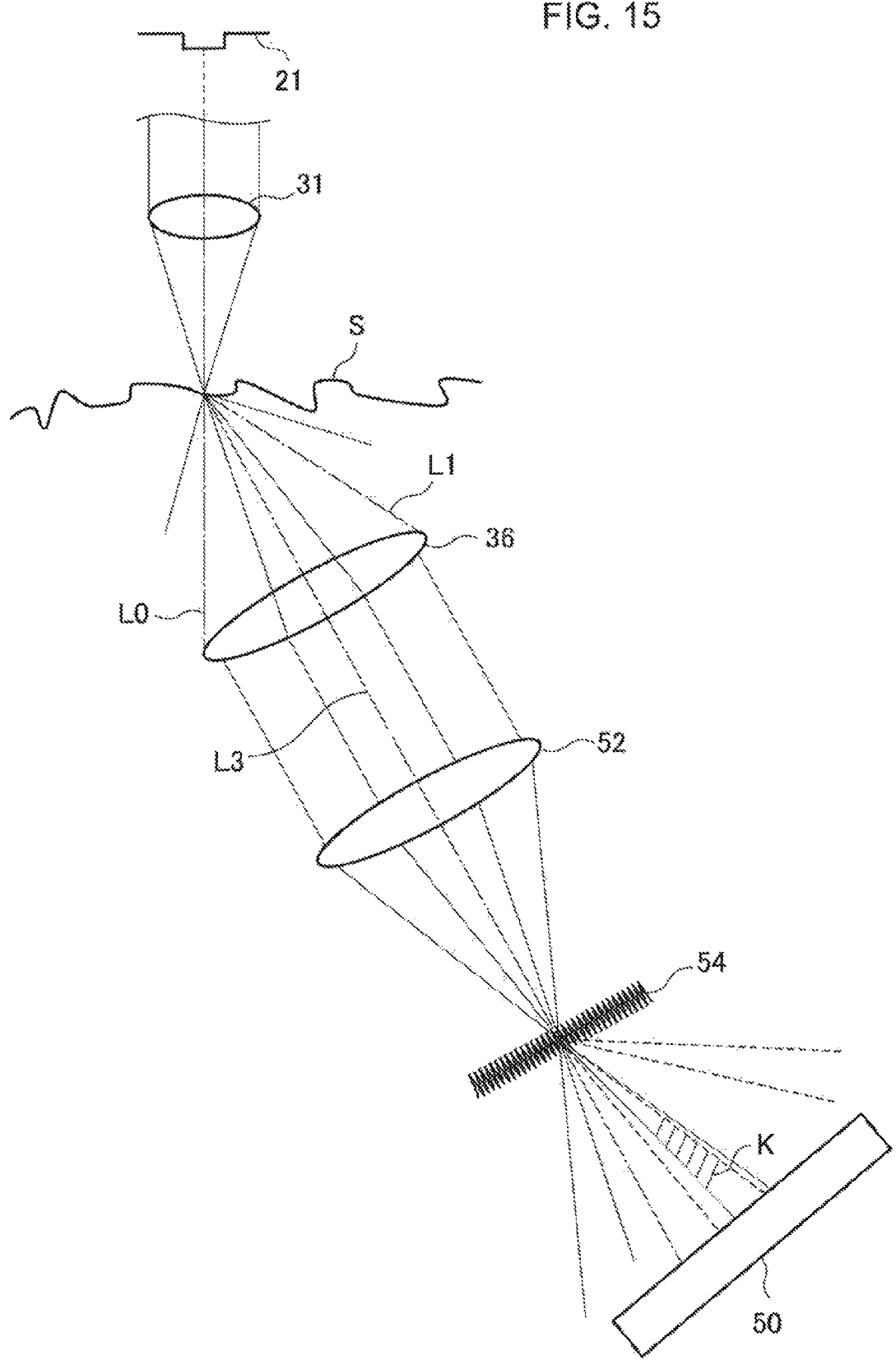
FIG. 15 is a schematic diagram representing an optical system illustrating Embodiment 8 related to the spatial frequency reproducing apparatus of the present invention.

FIG. 15 is a schematic diagram illustrating a structure of the spatial frequency reproducing apparatus of this embodiment. This embodiment is employed for an optical system similar to FIG. 13. This embodiment has a structure in which, as illustrated in FIG. 15, a grating 54 as a diffraction grating is disposed at a focal point of the lens 52 instead of the magnifying optical system 53 being deleted. Note that, although not illustrated, an identical optical system is disposed at a symmetrical position with respect to the optical axis L0 in this embodiment.

As a result, the zero order diffracted light and the first order diffracted light which are diffracted by the sample S are further diffracted by the grating 54, and the zero order diffracted light and the first order diffracted light substantially interfere with each other. In FIG. 15, the hatched part is an interference part K where the zero order diffracted light and the first order diffracted light overlap, and a similar interference part K exists also on the opposite side for the optical axis L3.

Here, when the grating 54 is constituted to have a sine wave form, diffracted waves by the grating 54 do not have a phase difference in the zero order diffracted light and the positive and negative first order diffracted lights. In this case, the phase difference in portions symmetrical to the optical axis L3 is the same, and thus the overlapped portions are in the same phase. Therefore, in this embodiment, the photo detector 50 may obtain the light amounts of the portions including the interference parts K of at least two areas outputted from the grating 54.

However, although the interference parts K are symmetrical and in the same phase with respect to the optical axis L0, for the negative first order diffracted light diffracted by the sample S, the phase of the interference part K reverses by 180 degrees. On the other hand, the intensity of part other than the interference part K is the same in the direction of the positive and negative first order diffracted lights which are diffracted by the sample S, and thus when a differential output of the intensity of the positive and negative first order diffracted lights is taken, information of only the interference part K remains.

On the other hand, when the grating 54 is constituted of a substantial sine wave shape which generates a phase difference, there occurs a phase difference of 180° between the zero order diffracted light and the positive and negative first order diffracted lights by the grating 54. In this case, as described above, the photo detector 50 may obtain the light amount of the portion including the interference part K of at least one area outputted from the grating 54, as described above. However, the point different from the above is that the phase difference which the grating 54 has is reflected here, and thus the position with respect to the beams of the grating 54 is also reflected. Therefore, position adjustment with respect to the beams of the grating 54 is necessary.

Note that the position adjustment is very easy. For the sample S prepared in advance, which has a phase grating having a certain spatial frequency, the adjustment may be performed so that the intensity modulation of the photo detector 50 on the both sides observed by scanning becomes maximum, and the phase difference becomes 180° on the both sides. The point that information of only the interference part K remains when the differential output of the intensity of the positive and negative first order diffracted lights is taken is the same as above.

Further, this embodiment is of the case where the sample S has a refractive index and phase difference information as path difference information, and hence a description related to the difference signal between photo detectors has been given proactively. On the other hand, for intensity information, also in this embodiment, as described in Embodiment 1, super resolution can be achieved by obtaining a summation signal of corresponding photo detectors with each other or a summation signal of all the photo detectors.

Embodiment 9

Embodiment 9 of a spatial frequency reproducing apparatus according to the present invention will be described below with reference to FIG. 16.

Figure 16:
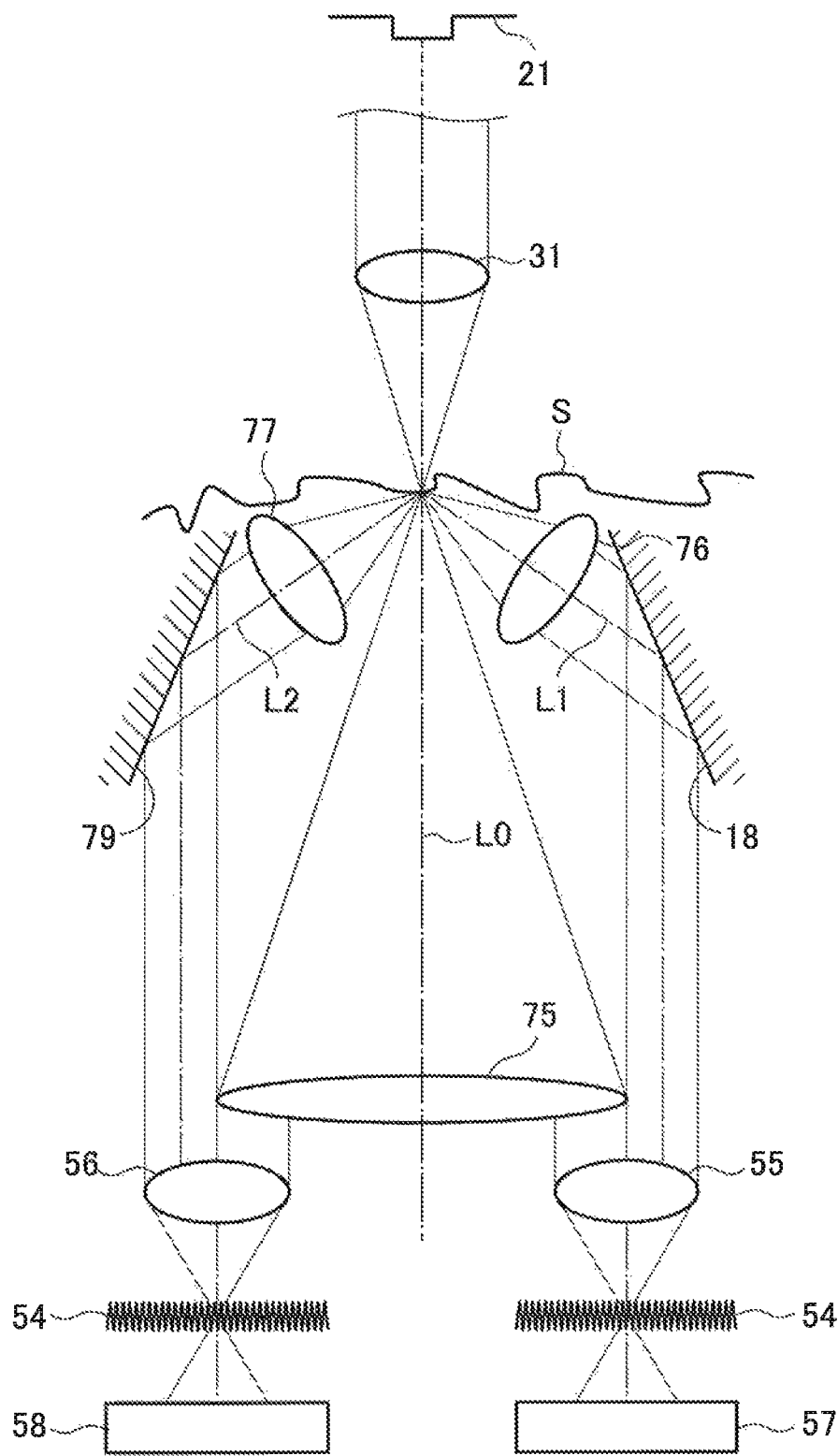
FIG. 16 is a schematic diagram representing an optical system illustrating Embodiment 9 related to the spatial frequency reproducing apparatus of the present invention.

FIG. 16 is a schematic diagram illustrating a structure of the spatial frequency reproducing apparatus of this embodiment.

In this embodiment, a grating 54 similar to that in FIG. 15 is employed for another optical system. This embodiment has, as illustrated in FIG. 16, a structure similar to Embodiment 4 having the reflecting mirrors 78, 79 except having the lenses 75, 76, 77. However, in this structure, a lens 55 is disposed below the reflecting mirror 78 and the grating 54 is disposed at a focal position of the lens 55 between the lens 55 and a photo detector 57 instead of the beam splitters 72A, 72B, 73, 74, and so on being deleted.

Moreover, the lens 75 is of a large size, and part of the luminous flux transmitted through this lens 75 is incident on the lens 55 and operates similarly to that in Embodiment 4.

Further, in this structure, a lens 56 is disposed below the reflecting mirror 79, and similarly to the above, a grating 54 is disposed at a focal position of the lens 56 between the lens 56 and a photo detector 58. Accordingly, the apparatus operates similarly to the above also by the lens 56, the grating 54, the photo detector 58, and so on.

Note that although the photo detector 28 is used in Embodiment 1 to Embodiment 3, it is conceivable that this photo detector 28 is omitted, the object under measurement G1, G2 is not present or the objective lens 31 is largely defocused to perform two-dimensional scanning, and phase information is stored in the memory of the data processing unit 34 together with two-dimensional scanning information. This phase information is a phase displacement which an optical system and an electric system have, and thus by taking this information as reference values, phase information of the case where the object under measurement G1, G2 is present can be corrected to thereby obtain true phase information. In this manner, the photo detector 28 is no longer necessary, and correction values can be obtained before observing the object under measurement G1, G2, thereby allowing measurement with high accuracy.

By obtaining correction values before observing the object under measurement G1, G2 in this manner, particularly in Embodiment 2, an enormous effect can be provided for applications such as monitoring in the case where cells or the like are flown in a micro-channel, categorizing the cells after judgment of cell shape is performed, and the like.

Specifically, since the micro-channel is an element in which cells or the like are flown in one direction, one-dimensional scanning device which scans in a direction perpendicular to the direction of the channel may be prepared instead of the two-dimensional scanning device 26 of the Embodiments 1, 2. In this manner, as the reference phase, only phases related to a very few points only in the one-dimensional scanning direction may be stored in the memory, and also the optical system becomes simple. Note that the point that similar effects can be obtained when intensity information is obtained is the same as described above, and thus is omitted.

Embodiment 10

Hereinafter, Embodiment 10 of an optical distance measuring apparatus according to the present invention will be described below with reference to FIG. 17. This FIG. 17 is a schematic diagram illustrating a structure of the optical distance measuring apparatus of this embodiment.

For the simplicity of explanation, the description below will be given with respect to a phase obtaining method by one beam using a DPC-like method which does not modulate. However, a similar explanation can be given with respect to a heterodyne method which creates very close two beams via an acoustic optical device creating a heterodyne signal or a one-dimensional or two-dimensional scanning system.

Figure 17:
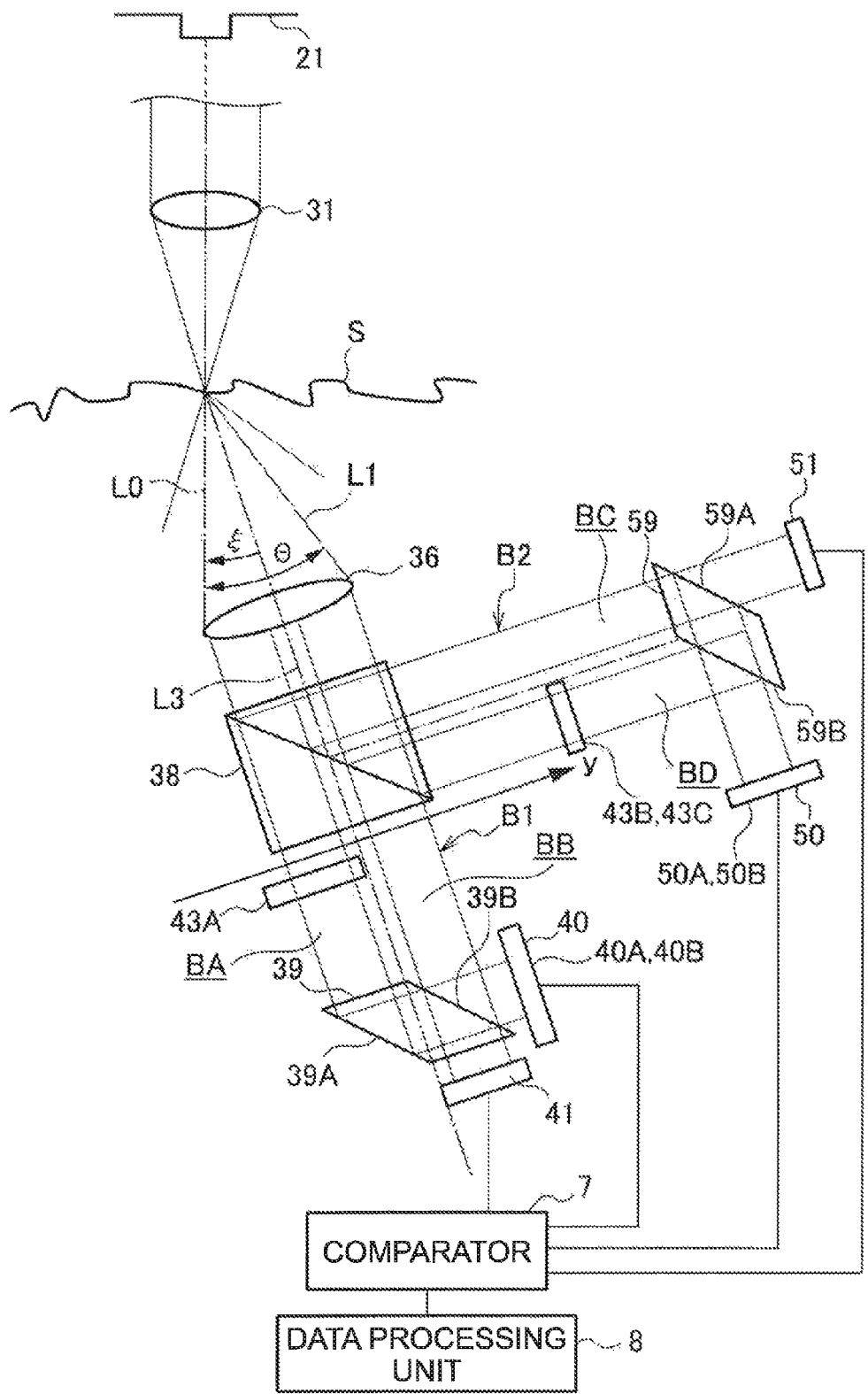
FIG. 17 is a block diagram of an optical system illustrating Embodiment 10 related to an optical distance measuring apparatus of the present invention.

As illustrated in FIG. 17, a laser light source 21 which is a light source irradiating a light and is a semiconductor laser is disposed opposing an objective lens 31 via a not-illustrated optical device. The light emitted from this laser light source 21 becomes a parallel light by a not-illustrated collimator lens and is then incident on the objective lens 31. The light transmitted through the objective lens 31 is then converged and irradiated on a sample S as an object under measurement which is a transmissive object.

In this embodiment, a lens 36 for gathering a luminous flux transmitted and diffracted through the sample S into a parallel luminous flux is installed to be tilted with respect to the optical axis L0 of the zero order diffracted light as illustrated in FIG. 17. Thus, it is possible to take in not only part of the zero order diffracted light but also part of the first order diffracted light having a higher spatial frequency compared to the case of using the same lens. Specifically, in this embodiment, the light irradiated on the sample S is diffracted as it transmits through the sample S and becomes a zero order diffracted light and a first order diffracted light. Moreover, the part of the zero order diffracted light and the part of the first order diffracted light are incident on the lens 36 in a state of being tilted by an optical axis L3 having an intermediate tilt angle between the zero order diffracted light and the first order diffracted light. This lens 36 is substantially a Fourier transform lens, and a Fourier transform pattern of the sample S is transmitted by this lens 36.

On the optical axis L3 below this lens 36, a beam splitter 38 is disposed, which is a separating element for dividing the parallel luminous flux emitted from the lens 36 rightward. Then, a beam which is a luminous flux is branched by this beam splitter 38 into two optical paths, optical path B1 through which the luminous flux is transmitted straight and optical path B2 through which the beam is transmitted by being bent at right angles.

On the optical path B1 along the optical axis L3, a rhomboid prism 39 is disposed. One face of this rhomboid prism 39 is a translucent mirror 39A, and the opposite face of the translucent mirror 39A is a translucent mirror 39B. Photo detectors 40, 41 are disposed at positions receiving lights which passed through or reflected on the respective faces of the rhomboid prism 39. On the other hand, a rhomboid prism 59 similar to the rhomboid prism 39 is disposed on the optical path B2 orthogonal to the optical axis L3. One face of this rhomboid prism 59 is a translucent mirror 59A, and the opposite face of the translucent mirror 59A is a translucent mirror 59B. Photo detectors 50, 51 are disposed likewise at positions receiving lights which passed through or reflected on the respective faces of the rhomboid prism 59.

The cross section of the luminous flux of each optical path B1, B2 is circular, and the luminous flux of the optical path B1 is divided into semicircular beams BA, BB, which are divided into halves in a direction perpendicular to the plane of FIG. 17. Similarly, the beam of the optical path B2 is divided into semicircular beams BC, BD, which are divided into halves in the direction perpendicular to the plane of FIG. 17.

Figure 18:
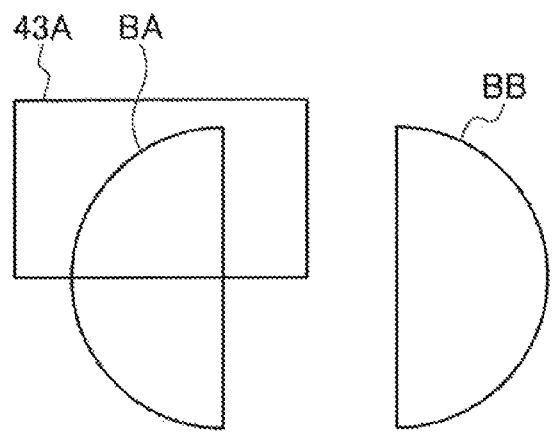
FIG. 18 is a diagram illustrating the relation between a luminous flux of one optical path branched in Embodiment 10 and a delay element 43A, and illustrating semicircular beams BA, BB forming a luminous flux by separating them from each other.
Figure 19:
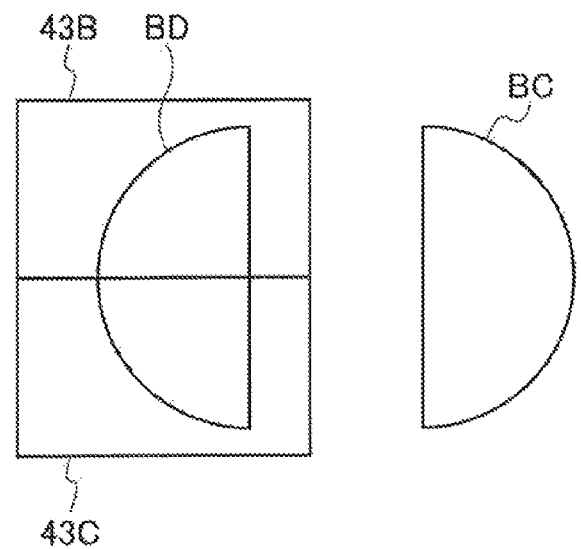
FIG. 19 is a diagram illustrating the relation between a luminous flux of another optical path branched in Embodiment 10 and delay elements 43B, 43C, and illustrating semicircular beams BC, BD forming a luminous flux by separating them from each other.

Here, the semicircular beams BA, BC are a light of a right half area in a traveling direction of the zero order diffracted light in FIG. 17 but include a first order diffracted light with a low frequency. This area will be hereinafter called a zero order diffracted light area. Further, the semicircular beams BB, BD are a light of an area including the first order diffracted light. This area will be hereinafter called a first order diffracted light area. FIG. 18 and FIG. 19 are diagrams illustrating the respective relations between a luminous flux and a delay element of the optical paths B1, B2 branched into two. FIG. 18 illustrates the semicircular beams BA, BB separated from each other, and FIG. 19 illustrates the semicircular beams BC, BD separated from each other.

Figure 20:
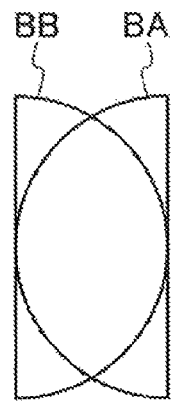
FIG. 20 is a diagram illustrating a state that the semicircular beam BA and the semicircular beam BB illustrated in FIG. 18 are shifted in parallel and combined.

An upper half of the semicircular beam BA (which may be a lower half of BA) of the optical path B1 in FIG. 18 generates a light delayed in phase by $\pi/2$ by a delay element 43A, which is a ¼ wavelength plate and is also a first delay element. Then, the semicircular beam BA and the semicircular beam BB are shifted in parallel by the translucent mirror 39A and the translucent mirror 39B of the rhomboid prism 39 and are combined as illustrated in FIG. 20. On the other hand, an upper half of the semicircular beam BD of the optical path B2 in FIG. 19 generates a light delayed in phase by $\pi/2$ by a delay element 43B, which is a ¼ wavelength plate and is also a second delay element. Further, a lower half of the semicircular beam BD in FIG. 19 generates a light delayed in phase by $\pi$ by a delay element 43C, which is a ½ wavelength plate and is also a second delay element. Then, the semicircular beam BC and the semicircular beam BD are shifted in parallel by the translucent mirror 59A and the translucent mirror 59B of the identical rhomboid prism 59 and are combined likewise.

As described above, the semicircular beam BA in which the delay element 43A is located is the light of the zero order diffracted light area, and the semicircular beam BD in which the delay element 43B is located is the light of the first order diffracted light area. However, the positional relation between the delay elements 43A, 43B which generate the phase difference of $\pi/2$ may be arranged in any form as long as they are in diffracted light areas different from each other. Further, the delay element 43C may be located in a lower half of the semicircular beam BC.

Here, the semicircular beams BA, BB of the optical path B1 combined by the rhomboid prism 39 are sent to the photo detector 40, which is a first photo detector. Further, the semicircular beams BC, BD combined by the rhomboid prism 59 are sent to the photo detector 50, which is a second photo detector. Note that this photo detector 50 is a photo detector corresponding to the photo detector 40 in the other optical path B2 branched by the beam splitter 38. On the other hand, the photo detector 40 is formed of divided photo detectors 40A, 40B which are divided in two in the plane perpendicular direction with the plane of FIG. 17 being a boundary. Specifically, an upper portion of the photo detector 40 is a divided photo detector 40A and a lower portion is a divided photo detector 40B. Similarly, an upper portion of the photo detector 50 is a divided photo detector 50A and a lower portion is a divided photo detector 50B.

Thus, the luminous flux received by the photo detector 40 is one combining the semicircular beam BA of the zero order diffracted light area and the semicircular beam BB of the first order diffracted light area. Accompanying this, an upper half of a luminous flux resulted from making the light delayed in phase by $\frac{1}{2}\pi$ of the zero order diffracted light area and the light of the first order diffracted light area interfere with each other is received by the divided photo detector 40A of the upper portion of the photo detector 40. On the other hand, a lower half of a luminous flux resulted from making the light of the zero order diffracted light area and the light of the first order diffracted light area interfere with each other without giving a phase delay is received by the divided photo detector 40B of the lower portion of the photo detector 40.

Similarly, the luminous flux received by the photo detector 50 is one combining the semicircular beam BC of the zero order diffracted light area and the semicircular beam BD of the first order diffracted light area. Accompanying this, an upper half of a luminous flux resulted from making the light delayed in phase by $\frac{1}{2}\pi$ of the first order diffracted light area and the light of the zero order diffracted light area interfere with each other is received by the divided photo detector 50A of the upper portion of the photo detector 50. On the other hand, a lower half of a luminous flux resulted from making the light delayed in phase by $\pi$ of the first order diffracted light area and the light of the zero order diffracted light area interfere with each other is received by the divided photo detector 50B of the lower portion of the photo detector 50.

Thus, with reference to the light of the zero order diffracted light area, the light of the first order diffracted light area is received with $\frac{1}{2}\pi$ advance in the divided photo detector 40A, the light of the first order diffracted light area is received in phase in the divided photo detector 40B, the light of the first order diffracted light area is received with $\frac{1}{2}\pi$ delay in the divided photo detector 50A, and the light of the first order diffracted light area is received with t delay in the divided photo detector 50B.

Moreover, the above-described divided photo detectors 40A, 40B and the divided photo detectors 50A, 50B are connected to a comparator 7 for comparing signals from the divided photo detectors 40A, 40B and the divided photo detectors 50A, 50B. Then, this comparator 7 is connected to a data processing unit 8 which finally processes data to obtain the profile of the sample S, and the like. Accordingly, the comparator 7 and the data processing unit 8 constitute an output summation/difference detection unit detecting an output summation or output difference between the divided photo detectors 40A, 40B of the photo detector 40 and an output summation or output difference between the divided photo detectors 50A, 50B of the photo detector 50.

Next, what kind of information such interference lights provide will be described.

For simplicity of explanation, when the sample S is assumed to be in the form of a sine wave with a height h and a pitch d, an optical phase θ is represented by the following equation.

$$\theta = 2\pi(h/\lambda)\sin(2\pi x/d - \theta_0) \quad \text{Equation (15)}$$

The amplitude E of a light deflected from the sample S is given as a convolution of Fourier transform of Equation (15) and the aperture of the objective lens 31 on a plane separated by the focal length f, and thus is represented as follows. However, the Bessel function which is Fourier transform of the phase of Equation (15) takes up to the positive and negative first order.

$$E = \int \left\{ J_0\left(2\pi\frac{h}{\lambda}\right)\delta(X) + J_1\left(2\pi\frac{h}{\lambda}\right)\left(e^{-j\theta_0}\delta\left(X - \frac{\lambda f}{d}\right) - e^{j\theta_0}\delta\left(X + \frac{\lambda f}{d}\right)\right)\right\} rect\left(\frac{x-X}{2a}\right) dX$$

$$= J_0\left(2\pi\frac{h}{\lambda}\right) rect\left(\frac{x}{2a}\right) + J_1\left(2\pi\frac{h}{\lambda}\right)\left(e^{-j\theta_0} rect\left(\frac{x - \frac{\lambda f}{d}}{2a}\right) - e^{j\theta_0} rect\left(\frac{x + \frac{\lambda f}{d}}{2a}\right)\right)$$

Equation (16)

The light having the amplitude E of this Equation (16) is gathered in the lens 36. At this time, the lens 36 is disposed to be tilted so that the optical axis L3 of the lens 36 illustrated in FIG. 17 is located at a position of emission angle ξ, which is an angle within an emission range of the zero order diffracted light corresponding to the aperture of the objective lens 31.

For the simplicity of explanation below, the tilt angle of the optical axis L3 is made to match the emission angle t, but when a zero order diffracted light J0 is incident, the tilt angle may be larger or smaller than this angle. When the tilt angle of the optical axis L3 varies thus, the zero order diffracted light area changes accompanying this as will be described below. Accordingly, an interference region of the zero order diffracted light J0 and a first order diffracted light J1 changes, but this does not intrinsically affect the discussion of the quantification.

Figure 21A:
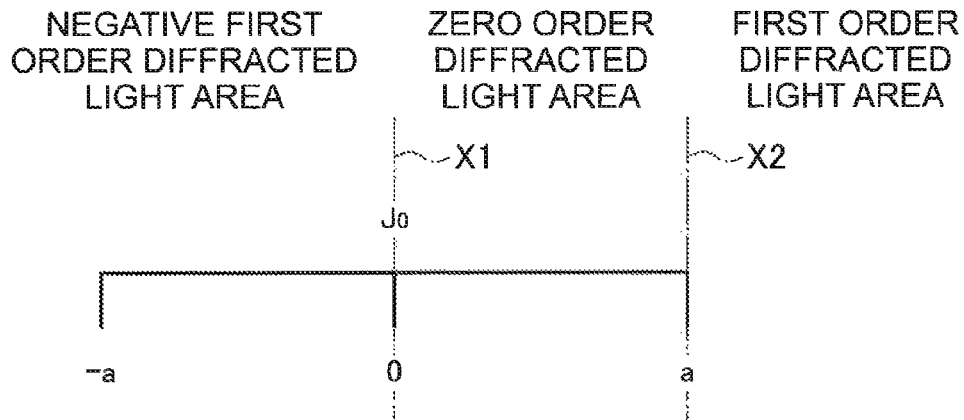
FIGS. 21A to 21C are schematic diagrams illustrating a zero order diffracted light area and a positive and negative first order diffracted light areas when a phase pitch d is $0<\lambda f/d<a/2$ in Embodiment 1, where
Figure 21B:
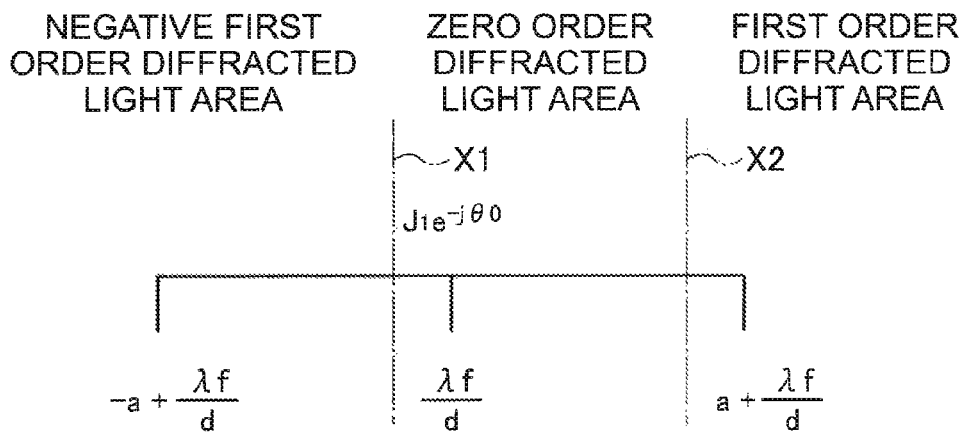
Figure 21C:
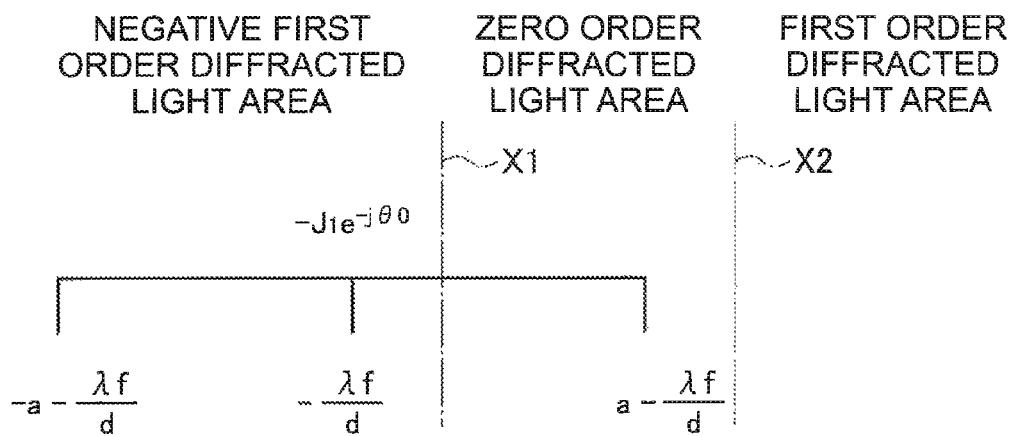

Hereinafter, for the simplicity of description similarly, the NA of the lens 36 is made to match the NA of the objective lens 31. However, the radius of the objective lens is a and a focal length is f. FIGS. 21A to 21C are schematic diagrams illustrating the zero order diffracted light area and the positive and negative first order diffracted light areas when the phase pitch d is $0 < \lambda f/d < a/2$, and illustrate respective regions of the zero order diffracted light and the positive and negative first order diffracted lights.

The light of the zero order diffracted light area incident on the lens 36 is a region between a dot and dash line X1 and a dot and dash line X2, and likewise the first order diffracted light area is a region on the right side of the dot and dash line X2. As illustrated in FIG. 17, the luminous fluxes are shifted in parallel and overlapped by the rhomboid prism 39. At this time, a substantial optical path difference occurs between the light of the zero order diffracted light area reflected by the translucent mirror 39A of the rhomboid prism 39 and the light of the first order diffracted light area reflected by the translucent mirror 39B. However, the optical path difference is constant when the rhomboid prism 39 is formed of a stable substance having a small thermal expansion such as a glass, and this optical path difference is θ1.

Figure 22A:
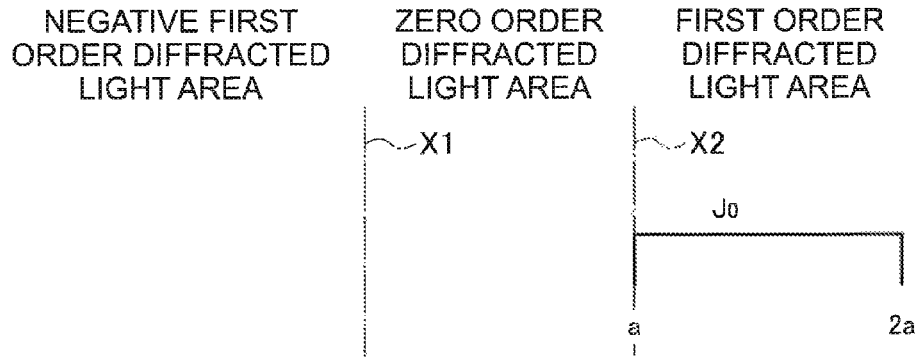
FIGS. 22A to 22D are diagrams illustrating how diffracted lights in Embodiment 1 are overlapped, where
Figure 22B:
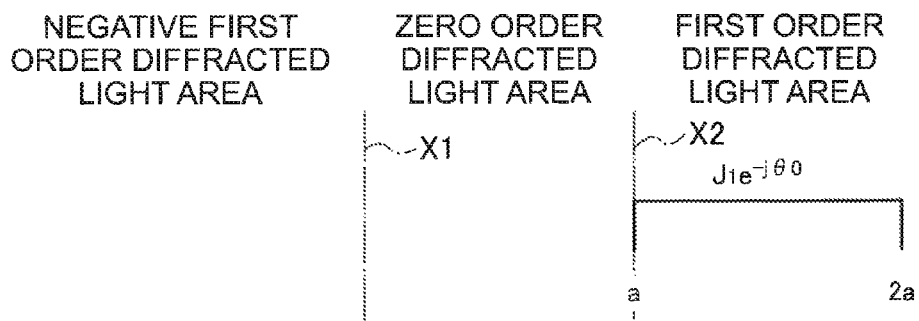
Figure 22C:
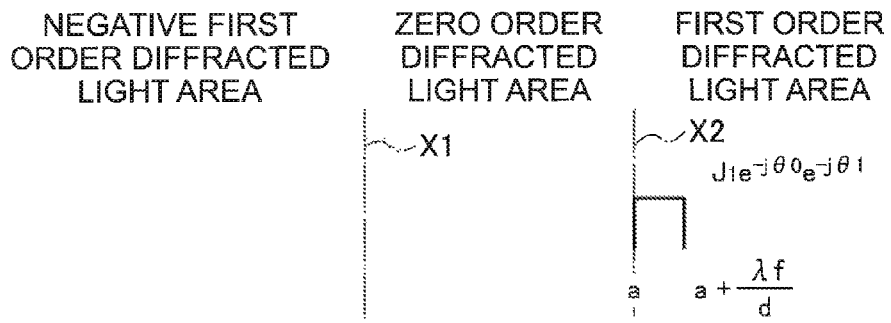
Figure 22D:
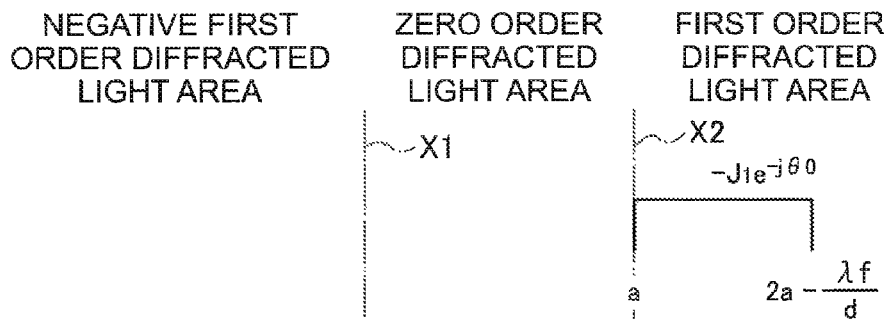

Therefore, the semicircular beam BA of the zero order diffracted light area is shifted in parallel by the rhomboid prism 39 and overlapped with the semicircular beam BB of the first order diffracted light area, and consequently, the diffracted lights are overlapped as illustrated in FIGS. 22A to 22D. Specifically, the zero order diffracted light area from 0 to a is shifted entirely by a, and thus the zero order diffracted light J0 illustrated in FIG. 21A becomes as illustrated in FIG. 22A. Similarly, the negative first order diffracted light −J1 illustrated in FIG. 21C is subjected to a similar shift, and becomes as illustrated in FIG. 22D.

The first order diffracted light J1 illustrated in FIG. 21B is located across both the zero order diffracted light area and the first order diffracted light area, and are divided respectively in a portion where it is shifted and a portion where it is not shifted, and an optical path difference θ1 in the first order diffracted light area is added. How it is added is illustrated in FIGS. 22B, 22C. Specifically, the portion of the zero order diffracted light area of FIG. 21B is shifted by a, but the portion of the first order diffracted light area remains the same.

Considering the overlapped portion of the portions, the amplitude distribution E is obtained by the following equation.

$$E = \frac{\lambda f}{d}(\alpha J0 + \alpha J1 e^{j\theta_0}) + \left(a - 2\frac{\lambda f}{d}\right)(\alpha J0 + \alpha J1 e^{j\theta_0} - \alpha J1 e^{-j\theta_0}) + \frac{\lambda f}{d}(\alpha J0 + \alpha J1 e^{j\theta_0} + \beta J1 e^{j\theta_0}e^{j\theta_1} - \alpha J1 e^{-j\theta_0})$$

Equation (17)

Here, α and β of above Equation (17) are a variable reflecting the phase of each delay element. Specifically, in the divided photo detector 40A receiving lights in which the semicircular beam BA of the zero order diffracted light area is delayed by the delay element 43A and the semicircular beam BB of the first order diffracted light area remains as it is, α=j and β=1. In the divided photo detector 40B receiving lights in which the semicircular beam BA of the zero order diffracted light area and the semicircular beam BB of the first order diffracted light area both remain the same, α=1 and β=1.

Further, in the divided photo detector 50a receiving lights in which the semicircular beam BD of the first order diffracted light area is delayed by the delay element 43B and the semicircular beam BC of the zero order diffracted light area remains the same, α=1 and β=j. In the divided photo detector 50B receiving lights in which the semicircular beam BD of the first order diffracted light area is delayed by the delay element 43C and the semicircular beam BC of the zero order diffracted light area remains the same, α=1 and β=−1.

The photo detectors 40, 50 receive intensity information of interfering lights, and thus intensity of Equation (17) may be calculated for them. When the intensity is I, the intensity I is obtained by the following equation in the divided photo detector 40B and the divided photo detector 50B (double sign in same order).

$$I = \frac{\lambda f}{d}(J0^2 + J1^2 + 2J0J1\cos\theta 0) +$$

$$\left(a - 2\frac{\lambda f}{d}\right)(J0^2 + 4J1^2\sin^2\theta 0) + \frac{\lambda f}{d}(J0^2 + J1^2 +$$

$$4J1^2\sin^2\theta 0 \pm 2J0J1\cos(\theta 0 + \theta 1) \pm 4J1^2\sin\theta 0\sin(\theta 0 + \theta 1))$$

When intensity is likewise I, the intensity I is obtained by the following equation in the divided photo detector 40A and the divided photo detector 50A (double sign in same order).

$$I = \frac{\lambda f}{d}(J0^2 + J1^2 + 2J0J1\cos\theta 0) +$$

$$\left(a - 2\frac{\lambda f}{d}\right)(J0^2 + 4J1^2\sin^2\theta 0) + \frac{\lambda f}{d}(J0^2 + J1^2 +$$

$$4J1^2\sin^2\theta 0 \pm 2J0J1\sin(\theta 0 + \theta 1) \mp 4J1^2\sin\theta 0\cos(\theta 0 + \theta 1))$$

Therefore, an output difference ΔIb between the divided photo detector 40B and the divided photo detector 50B and an output difference ΔIa between the divided photo detector 40A and the divided photo detector 50A are as follows.

$$\Delta Ib = 4\frac{\lambda f}{d}(J0J1\cos(\theta 0 + \theta 1) + 2J1^2\sin\theta 0\sin(\theta 0 + \theta 1)) \quad \text{Equation (18)}$$

$$\Delta Ia = 4\frac{\lambda f}{d}(J0J1\sin(\theta 0 + \theta 1) - 2J1^2\sin\theta 0\cos(\theta 0 + \theta 1)) \quad \text{Equation (19)}$$

In general, J0>J1 when the phase change is small, and thus $2J1^2 \sin\theta 0 \cos(\theta 0+\theta 1)$ of Equation (18) and Equation (19) can each be ignored as in following Equation (18)' and Equation (19)'.

$$\Delta Ib = 4\frac{\lambda f}{d}(J0J1\cos(\theta 0 + \theta 1)) \quad \text{Equation (18)}'$$

$$\Delta Ia = 4\frac{\lambda f}{d}(J0J1\sin(\theta 0 + \theta 1)) \quad \text{Equation (19)}'$$

By obtaining the ratio between Equation (18)' and Equation (19)', a phase θ can be measured by tan θ=tan(θ0+θ1). This phase θ includes the phase difference which the delay elements have, but since it is an amount determined at a time this embodiment is structured as described above, it is equivalent to determining where the origin of measurement should be set and can be ignored. Moreover, when the actual amplitude distribution is Eo and the phase is Θ, the following equation holds.

$$Eoe^{j\theta} = J0 + J1e^{j\theta_0}$$

$$= (J0 + J1\cos\theta 0) + jJ1\sin\theta 0$$

This equation further leads to:

$$\tan\Theta = \frac{J1\sin\theta 0}{J0 + J1\cos\theta 0}$$

$$= \frac{\gamma\sin\theta 0}{1 + \gamma\cos\theta 0}$$

Here, γ=J1/J0
The right side of the following equation is assumed as ε.

$$\varepsilon = \left(4\frac{\lambda f}{d}(J0J1\cos(\theta 0 + \theta 1)) + 4\frac{\lambda f}{d}(J0J1\sin(\theta 0 + \theta 1))\right) /$$

$$(\cos(\theta 0 + \theta 1) + \sin(\theta 0 + \theta 1))$$

$$= 4\frac{\lambda f}{d}J0J1$$

When the pitch d of the sample S and the radius a of the objective lens which is an irradiation beam radius are correlated by the above idea, the following relation is obtained. However, J0>J1 should hold as described above.

$$0 \le \frac{\lambda f}{d} \le a: \Delta Ib = 4\frac{\lambda f}{d}(J0J1\cos(\theta 0 + \theta 1)),$$

$$\Delta Ia = 4\frac{\lambda f}{d}(J0J1\sin(\theta 0 + \theta 1))$$

$$a < \frac{\lambda f}{d} \le 2a: \Delta Ib = 4a(J0J1\cos(\theta 0 + \theta 1)),$$

$$\Delta Ia = 4(J0J1\sin(\theta 0 + \theta 1))$$

$$2a < \frac{\lambda f}{d} \le 3a: \Delta Ib = \left(3a - \frac{\lambda f}{d}\right)(4J0J1\cos(\theta 0 + \theta 1)),$$

$$\Delta Ia = \left(3a - \frac{\lambda f}{d}\right)(4J0J1\sin(\theta 0 + \theta 1))$$

Figure 23:
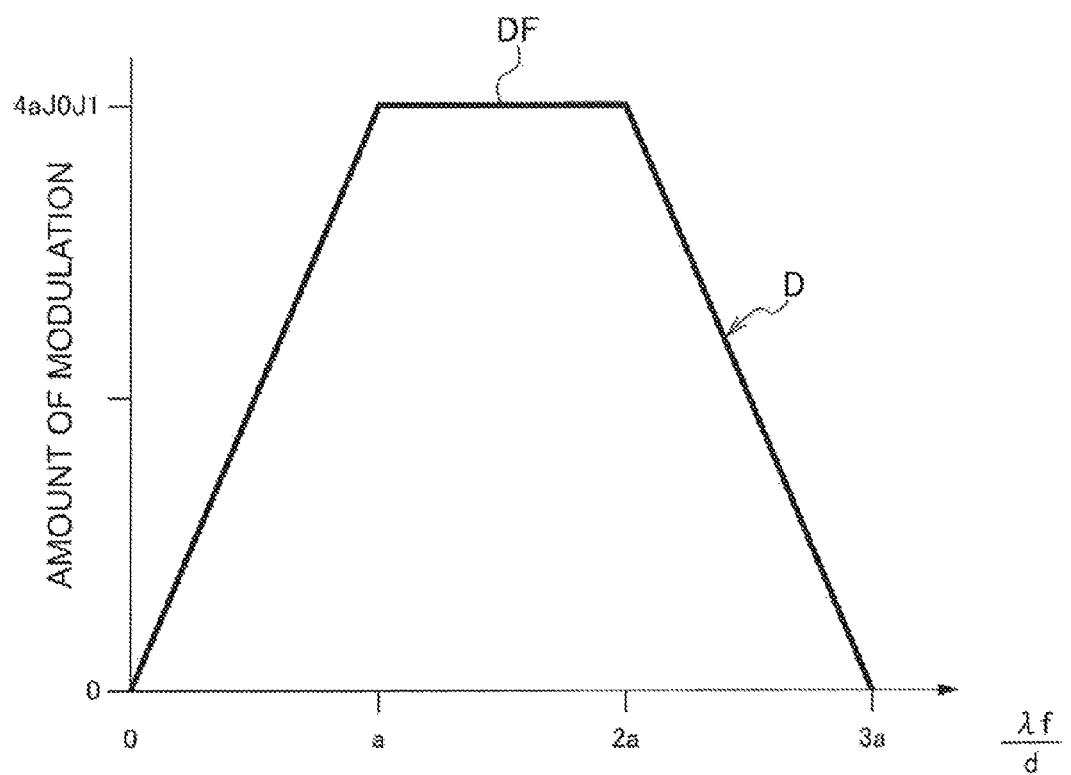
FIG. 23 is a diagram illustrating a graph representing a characteristic curve of this embodiment.

When a horizontal axis represents λf/d and a vertical axis represents an amount of modulation, a characteristic curve D of this embodiment corresponding to the MTF curve as illustrated in FIG. 23 can be obtained. Then, while the frequency of cut off of the objective lens becomes 2a on the general MTF curve, it can be seen from this characteristic curve D that it is possible to obtain up to the frequency of 3a higher than this frequency in this embodiment.

Further, although it has been intrinsically difficult to distinguish a first order diffracted light component included in the zero order diffracted light area from the zero order diffracted light, this embodiment makes it possible to calculate and distinguish the first order diffracted light in the zero order diffracted light area. Specifically, while the spatial frequency is converted into an electrical modulation signal by scanning a laser light as in the optical systems illustrated in FIG. 1 and FIG. 7, information of this spatial frequency can be converted into an electrical frequency by heterodyne detection or by analyzing the modulation frequency itself.

Therefore, the intrinsic magnitude of the first order diffracted light can be extracted automatically accompanying detection of the degrees of modulation of the series of spatial frequencies by an electrical frequency filter. In FIG. 23, regarding portions of the range of 0 to a, 2a to 3a changing linearly along the horizontal axis, constant gain can be provided by changing the gain like a hyperbolic curve with respect to a variation of frequency. On the other hand, when constant gain is made in a flat portion DF from a to 2a where the amount of modulation is constant, the range of 0 to 3a can be modified to a constant degree of modulation which does not effectively have frequency dependence, that is, which does not depend on the spatial frequency.

By modifying the spatial frequency dependence of ε as described above, the amount of drop of the spatial frequency by a conventional lens can be modified. Accompanying this, the amount of the first order diffracted light substantially included in the zero order diffracted light area can be estimated. As a result, γ=J1/J0 can be evaluated correctly. Further, according to this embodiment, the information of obtained spatial frequency can be increased. That is, it is possible to obtain up to a spatial frequency which cannot be attained by a conventional lens. Thus, phase information can be calculated correctly, and effective super resolution can be realized with respect to phase information of a transparent object such as a cell.

Note that the tilt of the optical axis L3 may be given in any way as long as the zero order diffracted light is substantially incident as the light of the zero order diffracted light area which is incident on the lens 36 as described above. For example, when it is set so that the zero order diffracted light is incident slightly, the interference range with the first order diffracted light widens effectively, and thus the spatial frequency can be made larger than those described above. In this case, the flat portion DF on the characteristic curve D of FIG. 23 becomes effectively large, and thus the characteristic can be made flat in almost the entire range where the spatial frequency can be obtained excluding a low frequency portion and a high frequency portion of the spatial frequency. Therefore, it becomes unnecessary to use the frequency filter as described above.

However, in this case, the degree of interference with the zero order diffracted light decreases, and thus it becomes necessary to increase the gain of the photo detectors, which leads to deterioration of SN ratio. Conversely, when the zero order diffracted light area is enlarged, the region of the spatial frequency to be obtained and the flat portion of the spatial frequency decrease, and thus applying the frequency filter allows obtaining good characteristics. In this case, the SN ratio of the obtained signal also becomes good. On the other hand, the influence by the objective lens 31 is small and the resolution is determined by the lens 36, and thus according to this embodiment, an optical system having a wide visual field range and a high lateral resolution can also be realized. This is one of prominent features that cannot be seen in ordinary imaging optical systems. Note that the role of the photo detector 41 in FIG. 17 is the same as the photo detector 40, and is used for effective use of light.

Figure 24:
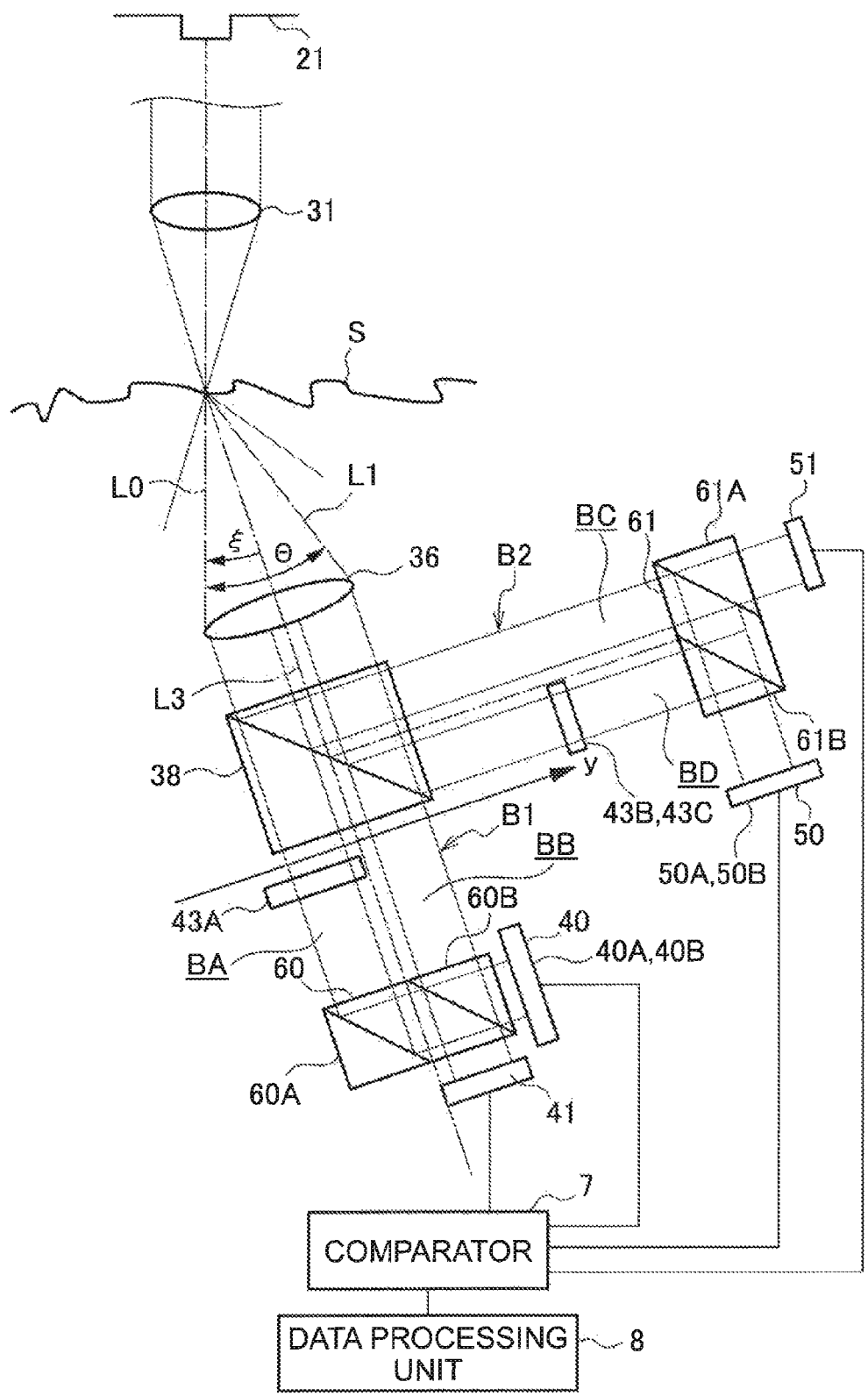
FIG. 24 is a block diagram of an optical system illustrating a modification example of Embodiment 10 related to the optical distance measuring apparatus of the present invention.

Now, one illustrated in FIG. 24 is conceivable as a modification example of this embodiment, and this modification example will be described below. In this modification example, instead of the rhomboid prisms 39, 59, a beam splitter 60 in the form of two juxtaposed cube-type beam splitters 60A, 60B is employed. Thus, the two beam splitters 60A, 60B respectively form, for example, the functions of the translucent mirror 39A and the translucent mirror 39B of the prism 39 illustrated in FIG. 17. Likewise, a beam splitter 61 in the form of two juxtaposed cube-type beam splitters 61A, 61B forms the functions of the translucent mirror 59A and the translucent mirror 59B of the rhomboid prism 59. Therefore, this modification example also exhibits the same operation and effect as the above-described embodiment.

Embodiment 11

Next, Embodiment 11 of an optical distance measuring apparatus according to the present invention will be described below with reference to FIG. 25. In this embodiment, an optical system which quantifies phase information with one lens 36 will be described based on FIG. 25.

Figure 25:
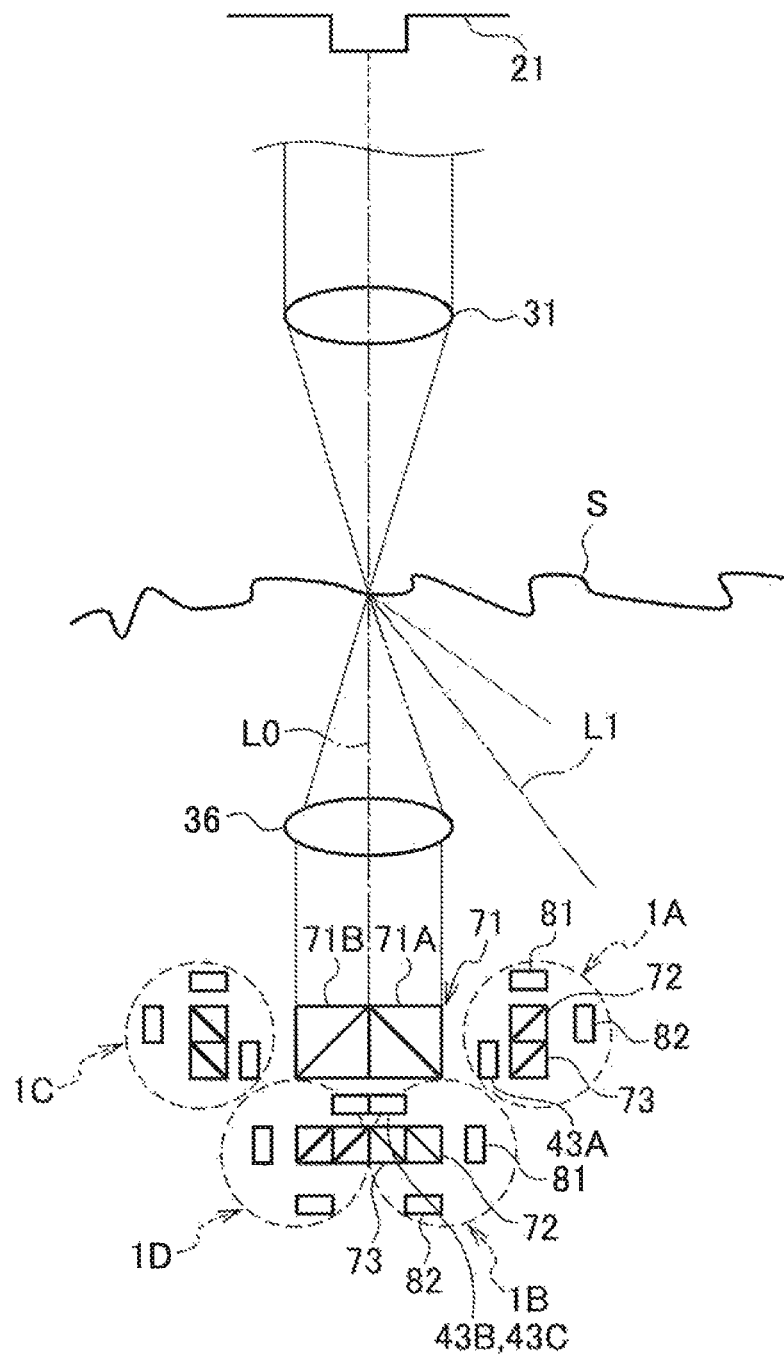
FIG. 25 is a block diagram of an optical system illustrating Embodiment 11 related to the optical distance measuring apparatus of the present invention.

As illustrated in FIG. 25, also in this embodiment, a laser light source 21 is disposed opposing an objective lens 31 via a not-illustrated optical device, and a laser light transmitted through the objective lens 31 is then converged and irradiated on a sample S which is a transmissive object. The laser light irradiated on the sample S is gathered by the lens 36 located on the optical axis L0 and becomes a parallel luminous flux.

At a position immediately below the lens 36 on the optical axis L0 of the laser light, a beam splitter 71 is disposed. This beam splitter 71 has a structure formed of two beam splitters 71A, 71B, which are juxtaposed in a crosswise direction of FIG. 25, for separating a luminous flux in reverse directions from each other. Therefore, by this beam splitter 71, the luminous flux is separated into four paths in total which are in two directions in reverse directions from each other with the optical axis L0 being a boundary and two transmission directions.

On the right side with the optical axis L0 being a boundary illustrated in FIG. 25, an optical system combining a block 1A and a block 1B is disposed. Each block 1A, 1B is constituted of beam splitters 72, 73, photo detectors 81, 82, delay elements 43A, 43B, 43C, and so on. The block 1A and the block 1B include a zero order diffracted light area and a first order diffracted light area, and the combination of the blocks 1A, 1B is substantially the same as the optical system after separation by the beam splitter 38 illustrated in FIG. 17.

On the other hand, the block 1C and the block 1D include the zero order diffracted light area and a negative first order diffracted light area, are disposed in a symmetrical form of the block 1A and the block 1B, and have the same structure as the blocks 1A, 1B. Thus, the combination of the blocks 1C, 1D is an optical system including the negative first order diffracted light which is not illustrated in the embodiment illustrated in FIG. 17, but functions substantially similarly to the embodiment of FIG. 17.

Thus, each block 1A to 1D exhibits the same operation as the embodiment illustrated in FIG. 17. According to this embodiment, information of quite high spatial frequency as in Embodiment 10 illustrated in FIG. 17 cannot be obtained, but quantification of phase information can be achieved with a quite simple structure. Therefore, this embodiment has characteristics in which the flat portion DF of the characteristic curve D illustrated in FIG. 23 does not exist. However, the above-described frequency filter by electrical frequency conversion of the spatial frequency accompanying scanning of laser light operates quite effectively, and dropped information by MTF which the lens 36 intrinsically has can be reproduced.

Thus, in this embodiment, it is possible to obtain measurement values which correctly reflect phase information of the sample S which the lens 36 intrinsically has. Moreover, each block 1A to 1D has the beam splitters 72, 73, the photo detectors 81, 82, the delay elements 43A, 43B, 43C, and so on. Further, although not illustrated, the photo detectors 81, 82 of the blocks 1A to 1D are connected to the above-described comparator 7, and this comparator 7 is connected to the data processing unit 8. Thus, this embodiment can also obtain the same operation and effect as the Embodiment 10 illustrated in FIG. 17. Further, it is conceivable that the optical systems of the blocks 1A to 1D are each disposed in plural directions such as a direction perpendicular to the plane of FIG. 25 while shifting the beam splitters 71A, 71B by an appropriate amount. By disposing plural blocks 1A to 1D in this manner, measurement values related to each of plural directions when seeing the sample S from the objective lens 31 side can also be obtained.

Embodiment 12

Embodiment 12 of an optical distance measuring apparatus according to the present invention will be described below with reference to FIG. 26.

Figure 26:
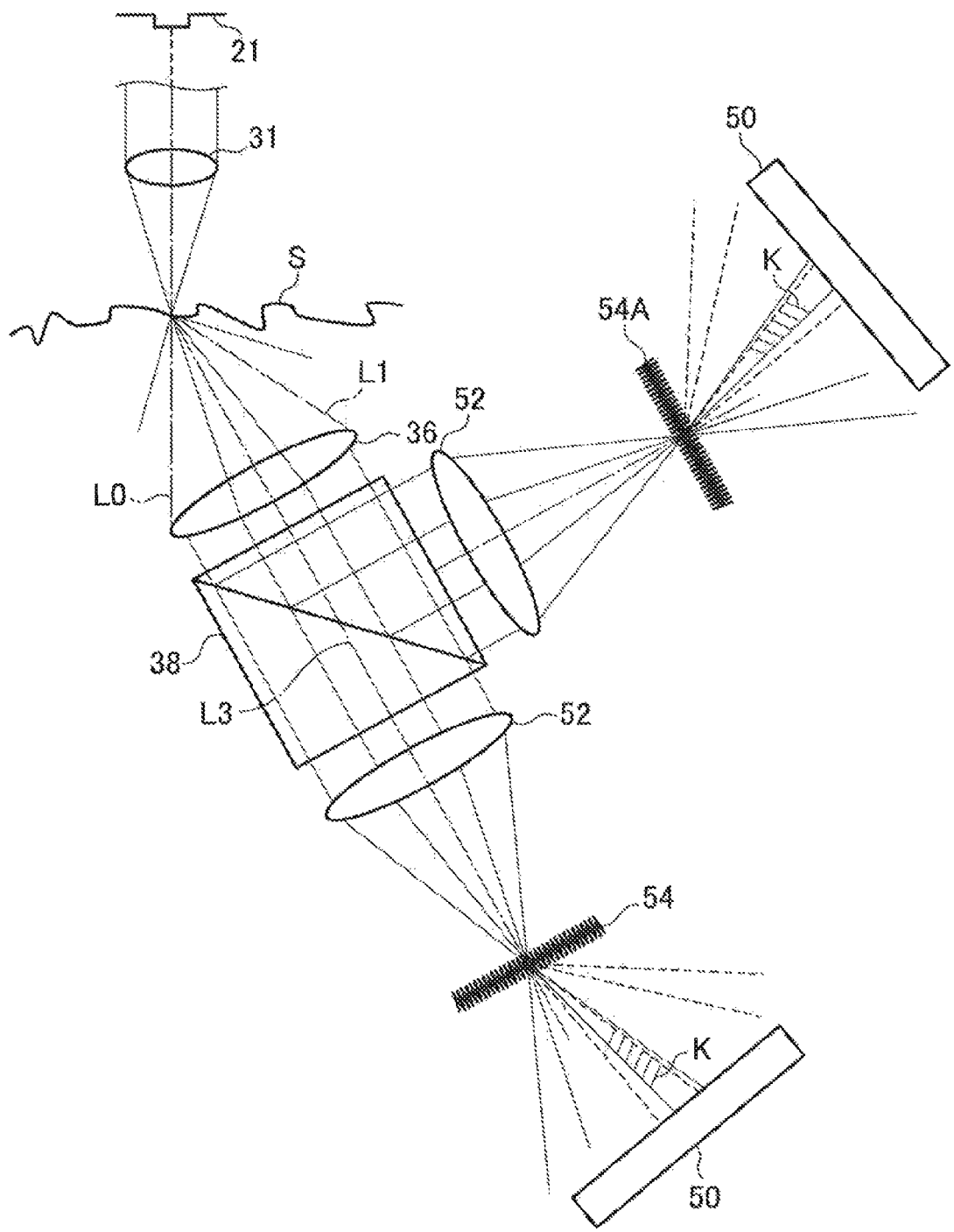
FIG. 26 is a block diagram of an optical system illustrating Embodiment 12 related to the optical distance measuring apparatus of the present invention.

FIG. 26 is a schematic diagram illustrating a structure of the optical distance measuring apparatus of this embodiment. This embodiment has a structure in which, as illustrated in FIG. 26, a diffraction grating 54 as a grating formed in a sine wave shape is disposed at a focal point of a lens 52 as means for giving a phase difference of $\pm\pi/2$ and $\pi$ between the zero order diffracted light and the first order diffracted light.

Specifically, in this embodiment, as illustrated in FIG. 26, the lens 36 is disposed on the tilted optical axis L3, and a luminous flux including a zero order diffracted light and a first order diffracted light is a parallel luminous flux. A beam splitter 38 identical to that of FIG. 17 is disposed below this lens 36, and this parallel luminous flux is branched by this beam splitter 38. Moreover, a luminous flux, which is one of the branched parallel luminous fluxes, including the zero order diffracted light and the first order diffracted light, is narrowed down by a lens 52 located below the beam splitter 38, and the diffraction grating 54 is disposed in the vicinity of a focal plane thereof. However, this diffraction grating 54 is a phase type grating which is a sinusoidal phase diffraction grating.

Then, the zero order diffracted light and the first order diffracted light which are diffracted by the sample S and included in the zero order diffracted light area are made to interfere with each other by this diffraction grating 54, and the first order diffracted light and the zero order diffracted light which are diffracted by the sample S and included in the first order diffracted light area are made to interfere with each other by this diffraction grating 54. Thus, the zero order diffracted light and the first order diffracted light which are diffracted by the sample S are made to effectively interfere with each other. Note that in FIG. 26, a hatched part is an interference part K where the zero order diffracted light and the first order diffracted light overlap, and a similar interference part K exists also on the opposite side for the optical axis L3. Moreover, the interfered luminous flux is received by a photo detector 50, this photo detector 50 is connected to the above-described comparator 7 which is not illustrated, and this comparator 7 is connected to the data processing unit 8.

On the other hand, in a direction orthogonal to the optical axis L3 at the position of the beam splitter 38, a lens 52, a diffraction grating 54A, and a photo detector 50 which are identical are disposed similarly and operate similarly to the above. However, this diffraction grating 54A is an intensity type grating which is a sinusoidal amplitude diffraction grating.

Here, values of amplitude E of the sinusoidal amplitude diffraction grating and amplitude E of the sinusoidal phase diffraction grating are obtained by the following equation. However, the phase is represented by $\theta$ in the following equation.

In the sinusoidal amplitude diffraction grating, the amplitude E is as follows.

$$E = E_0 \sin(2\pi x/d - \theta)$$

In the sinusoidal phase diffraction grating, the amplitude E is as follows.

$$E = E_0 e^{j\sin\left(\frac{2\pi}{d}x - \theta\right)}$$
$$= J0(E_0) + J1(E_0)\left(e^{j\left(\frac{2\pi}{d}x - \theta\right)} - e^{-j\left(\frac{2\pi}{d}x - \theta\right)}\right)$$

Thus, in this embodiment, as illustrated in FIG. 26, the parallel light including the zero order diffracted light and the first order diffracted light is narrowed down by the lenses 52, and the diffraction gratings 54, 54A are disposed in the vicinities of the focal planes thereof. At that time, a phase displacement of $\pm\pi/2$ is generated in the aforementioned sinusoidal amplitude diffraction grating, and a phase displacement of 0 or $\pi$ which is a phase displacement of the same or reverse phase is generated in the sinusoidal phase diffraction grating. Thus, by applying a combination of them to the relation of the delay elements illustrated in FIG. 17, an optical system similar to Embodiment 10 illustrated in FIG. 17 can be formed.

Further, when the pitch of the diffraction gratings 54, 54A is about the same size as the beam diameter narrowed down by the lens 52, they become sensitive to the phase $\theta$ of the above equation. Therefore, by relatively adjusting the focal position of the beam and the position of the diffraction gratings 54, 54A, the phase $\theta$ is determined. For example, when the phase $\theta=0$ in the sinusoidal amplitude diffraction grating, a phase difference of $\pm\pi/2$ occurs between the zero order diffracted light and the positive and negative first order diffracted lights, and when the phase $\theta=-\pi/2$, a reverse phase occurs between the zero order diffracted light and the positive and negative first order diffracted lights. As a result, similarly to Embodiment 10 illustrated in FIG. 17, a phase difference of $\pm\pi/2$ or $\pi$ occurs between the zero order diffracted light and the first order diffracted light.

Here, a modification example of this embodiment will be described based on FIG. 26. For example, the diffraction grating 54 to which one branched luminous flux is irradiated is a phase-type grating, and regarding this one luminous flux, the diffraction grating 54 is adjusted in position and disposed so that the zero order diffracted light and the positive and negative first order diffracted lights are in phase or in reverse phases with the optical axis L3 being the center. Besides this, the diffraction grating 54A to which the other branched luminous flux is irradiated is an intensity-type grating, and regarding this other luminous flux, this diffraction grating 54A is disposed by shifting by $\pm\frac{1}{4}$ pitch. As a result, in this modification example, a phase difference of $\pi/4$ or $3\pi/4$ occurs between the zero order diffracted light and the first order diffracted light.

Embodiment 13

Embodiment 13 of an optical distance measuring apparatus according to this embodiment will be described below with reference to FIG. 27.

Figure 27:
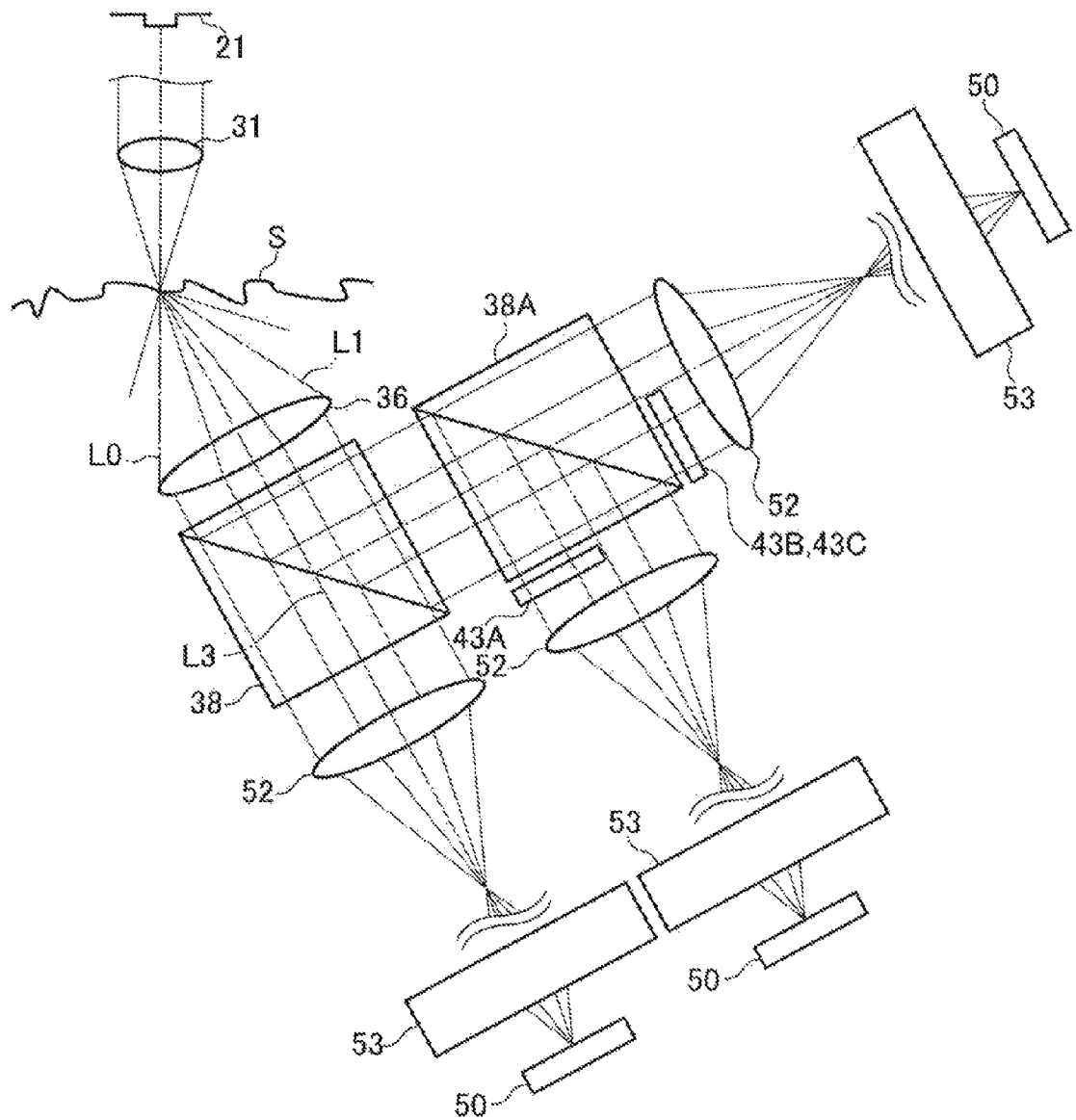
FIG. 27 is a block diagram of an optical system illustrating Embodiment 13 related to the optical distance measuring apparatus of the present invention.

FIG. 27 is a schematic diagram illustrating a structure of the optical distance measuring apparatus of this embodiment. As illustrated in FIG. 27, in this embodiment, the lens 36 is installed to be tilted with respect to the optical axis L0 of the zero order diffracted light. Because of this, not only part of the zero order diffracted light but also part of the first order diffracted light having a higher spatial frequency compared to the case of using the same lens are taken in, realizing interference in an imaging optical system. Note that, although not illustrated, an identical optical system is disposed at a symmetrical position with respect to the axis L0 in this embodiment.

This embodiment is the same as the embodiments of FIG. 17 and FIG. 26 up to that the lens 36 is tilted and part of the zero order diffracted light and part of the first order diffracted light are obtained. In this embodiment, the diffracted lights which are converted into a parallel luminous flux by the lens 36 are gathered in the lens 52. The diffracted lights are overlapped with each other by this lens 52 in the vicinity of a focal point and substantially interfere. However, it is not interfere of the zero order diffracted light and the positive and negative first order diffracted lights, and thus it is different from imaging of the sample S itself.

On the other hand, also in this embodiment, a beam splitter 38 is disposed between the lens 36 and the lens 52 similarly to Embodiment 12 of FIG. 26. However, in this embodiment, a beam splitter 38A is further disposed, and a parallel luminous flux branched by the beam splitter 38 is further branched by this beam splitter 38A.

On a lower side of this beam splitter 38A in FIG. 27, not only a delay element 43A is disposed, but also a lens 52, a magnifying optical system 53, and a photo detector 50 are disposed similarly. Further, on a right side of the beam splitter 38A in FIG. 27, not only delay elements 43B, 43C are disposed, but also a lens 52, a magnifying optical system 53, and a photo detector 50 are disposed similarly. Note that these magnifying optical systems 53 have a function to elongate the effective focal length of the lens 52 to magnify interference fringes themselves, and the like. That is, by elongating the effective focal length of the lens 52, the pitches of the interference fringes can be widened.

According to this embodiment, the lens 52, the magnifying optical system 53, and the photo detector 50 along the optical axis L3 are included. Accompanying this, when the interference fringes themselves are magnified by the magnifying optical system 53 to make them have substantially the same size as the photo detector 50, a reverse phase naturally occurs in the first order diffracted light, and thus brightness and darkness are inverted in a form that the zero order diffracted light becomes a bias. In this manner, information can be obtained very easily up to a region where the spatial frequency is high. In the case of this embodiment, since the lens 52 is used, a wavefront aberration is tolerated to the degree that the phase difference between the zero order diffracted light and the first order diffracted light to be incident on the lens 52 is reflected as it is. Therefore, this eliminates necessity to use an expensive lens.

Moreover, according to this embodiment, the beam splitters 38, 38A, the delay elements 43A, 43B, 43C, the lens 52, the magnifying optical system 53, and the photo detector 50 are disposed, these beam splitters 38, 38A branch the luminous flux, and finally the two photo detectors 50 each receive the luminous flux. Further, although not illustrated, the two photo detectors 50 are connected to the above-described comparator 7, and this comparator 7 is connected to the data processing unit 8. Thus, this embodiment can also obtain the same operation and effect as the Embodiment 10 illustrated in FIG. 17.

Embodiment 14

Embodiment 14 of an optical distance measuring apparatus according to the present invention will be described below with reference to FIG. 28.

Figure 28:
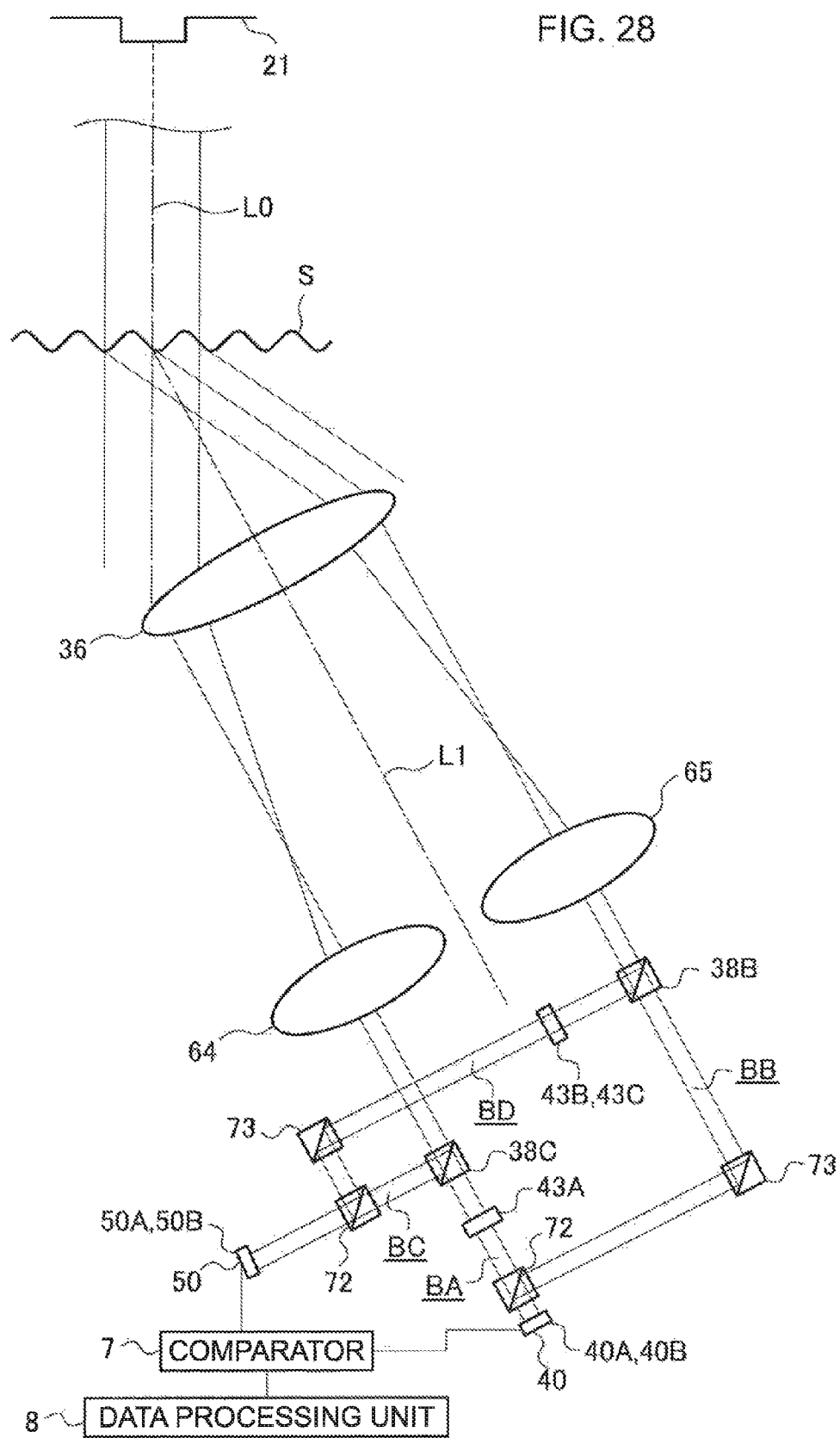
FIG. 28 is a block diagram of an optical system illustrating Embodiment 14 related to the optical distance measuring apparatus of the present invention.
Figure 29:
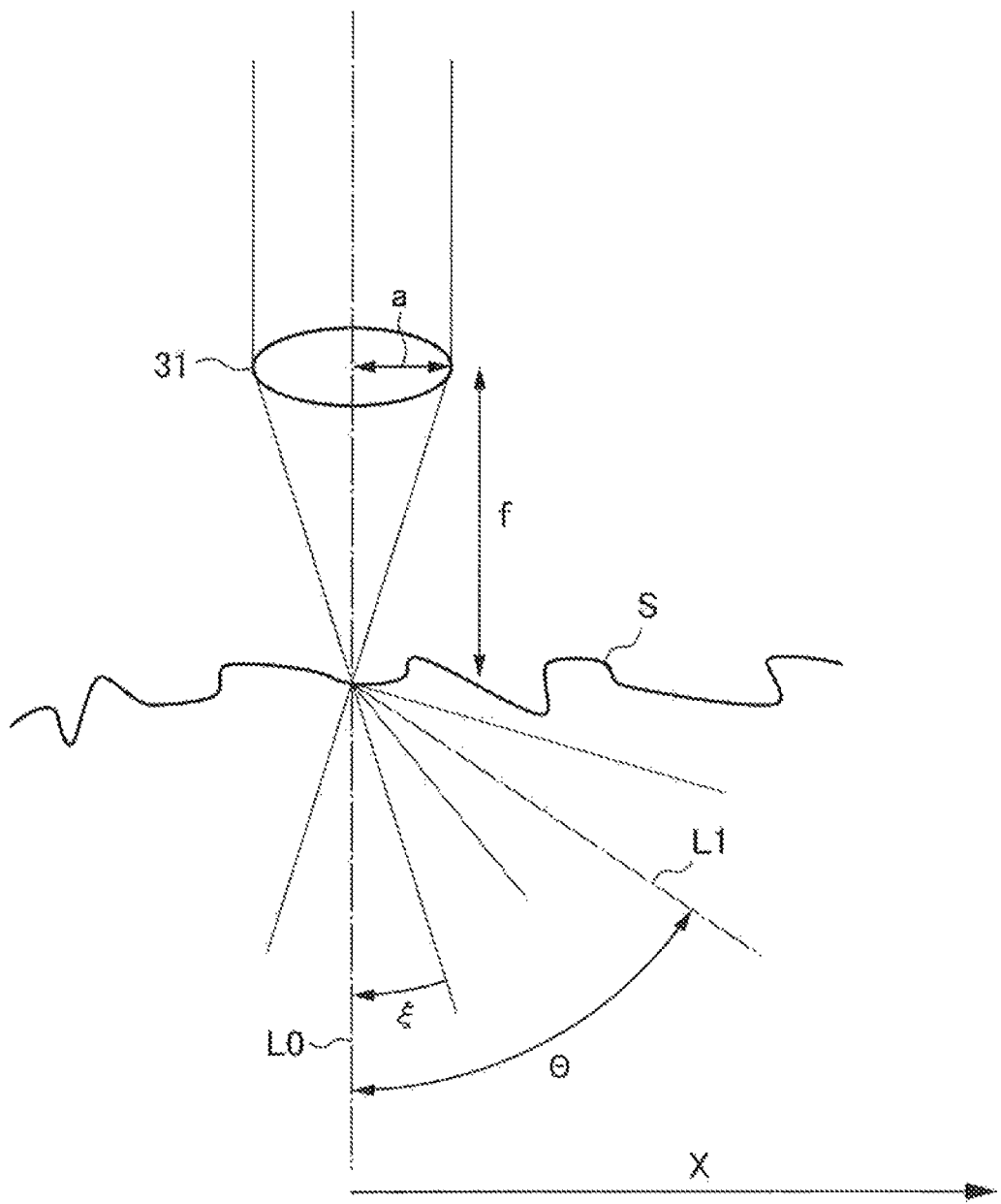
FIG. 29 is a principle diagram explaining the principle of an ordinary imaging optical system.

FIG. 28 is a schematic diagram illustrating a structure of the optical distance measuring apparatus of this embodiment.

As illustrated in FIG. 28, in this embodiment, a converged light is not incident on the sample S, but a parallel luminous flux having a relatively large diameter is incident thereon. In this case, a lens 36 is installed to be tilted with respect to the optical axis L0 of the zero order diffracted light. Because of this, not only part of the zero order diffracted light but also part of the first order diffracted light having a higher spatial frequency compared to the case of using the same lens can be taken in. Note that, although not illustrated, an identical optical system is disposed at a symmetrical position with respect to the axis L0 in this embodiment.

In this embodiment, the zero order diffracted light and the first order diffracted light are both a condensed luminous flux. Separate lenses 64, 65 having focal points at respective focal positions of the lens 36 are disposed, and the condensed luminous flux is converted into a parallel luminous flux by these lenses 64, 65. After the conversion into a parallel luminous flux in this manner, the part of the zero order diffracted light and the part of the first order diffracted light are made to interfere with each other by using the optical systems illustrated in FIG. 17. That is, according to this embodiment, as illustrated in FIG. 28, the beam splitters 38B, 38C, the beam splitters 72, 73, the delay elements 43A, 43B, 43C, the photo detectors 40, 50, the comparator 7, the data processing unit 8, and so on are included. Thus, this embodiment can also obtain the same operation and effect as the Embodiment 10 illustrated in FIG. 17.

In the case of this embodiment, the diameter of the luminous flux to be incident on the sample S is large, and thus information in the plane is averaged. Accordingly, by providing a not-illustrated limit aperture for the incident parallel luminous flux, the information is construed as the information of this portion, or it becomes possible to detect an irregular pattern in a regular pattern. Specifically, since the direction of a regular first order diffracted light is known in advance from the design, the direction of the first order diffracted light can be suppressed by masking the focal point of the lens 36.

On the other hand, the other components will be incident on the lenses 64, 65, and thus information from a defect portion can be detected. For example, applications to defect inspection on a semiconductor wafer, inspection of unevenness in a nano-structure, and the like are possible.

In the foregoing, the embodiments according to the present invention have been described. However, the invention is not limited to the above-described embodiments, and various modifications can be made to implement the invention within the range not departing from the spirit of the present invention. As an example, it is needless to mention that the present invention can be applied by, for example, providing appropriate delay elements in FIG. 9.

The spatial frequency reproducing apparatus and the optical distance measuring apparatus of the present invention are not only capable of measuring the distance to a sample and the shape of a sample, but are applicable to various types of optical apparatuses, such as microscopes, and measurement apparatuses using electromagnetic waves having wave motion, and are capable of improving the resolutions of these optical apparatuses and measurement apparatuses using electromagnetic waves having wave motion.

What is claimed is:

1. A spatial frequency reproducing apparatus, comprising:
a light source emitting a coherent light;
a first means for modulating the light emitted from the light source into two lights which have frequencies different from each other and are irradiated separately adjacent to each other;
a second means for one-dimensionally or two-dimensionally scanning the two lights;
a third means for irradiating an object under measurement with the two lights which are scanned;
a fourth means for receiving and converting into an electrical signal at least two or more divided lights from the object under measurement with a boundary line being interposed therebetween in a direction substantially perpendicular to the direction in which the two lights are separated;
a fifth means for amplifying respective electrical signals photoelectrically converted by the fourth means with respect to respective areas with the boundary line being interposed therebetween while varying a degree of amplification according to frequencies of the electrical signals and generating a difference signal or a summation signal of the amplified signals; and
a sixth means for obtaining a phase difference or an intensity difference of the difference signal or the summation signal to obtain a measurement value.

2. The spatial frequency reproducing apparatus according to claim 1, wherein the first means is constituted of an acoustic optical device or a spatial modulator, and two modulation signals are applied to the acoustic optical device or the spatial modulator,
the second means is constituted of two one-dimensional scanning elements combined for two-dimensional scanning or a two-dimensional scanning element, and
the third means irradiates the object under measurement with parallel lights, convergent lights, or divergent lights.

3. The spatial frequency reproducing apparatus according to claim 1, wherein the sixth means uses heterodyne detection based on a difference between two modulated frequencies.

4. A spatial frequency reproducing apparatus, comprising:
a light source irradiating a light, which is irradiated convergently or irradiated in parallel, to an object under measurement;
a first light processing member located on an irradiation optical axis of the convergent irradiation or the parallel irradiation and receiving and processing a luminous flux emitted from the object under measurement;
a first photo detector having at least two divided photo detectors which receive lights of respective side portions with the irradiation optical axis being interposed therebetween within a transmitted light from the first light processing member;
a pair of second light processing members each located on a tilted optical axis having a tilt with respect to the irradiation optical axis on one of light receiving sides of the divided photo detectors of the first photo detector, and receiving and processing a luminous flux emitted from the object under measurement and making the luminous flux and a luminous flux emitted from the first light processing member interfere with each other;
a pair of second photo detectors receiving the luminous fluxes made to interfere by the pair of second light processing members; and
an output summation/difference detection unit amplifying respective electrical signals photoelectrically converted by the two divided photo detectors while varying a degree of amplification according to frequencies of the electrical signals and amplifying respective electrical signals photoelectrically converted by the pair of second photo detectors while varying a degree of amplification according to frequencies of the electrical signals, and detecting an output summation or an output difference between outputs of the amplified electrical signals of the two divided photo detectors and an output summation or an output difference between outputs of the amplified electrical signals of the pair of second photo detectors.

5. The spatial frequency reproducing apparatus according to claim 4, wherein the light irradiated from the light source to the object under measurement is irradiated convergently,
the first light processing member is constituted of a first lens converting the luminous flux emitted from the object under measurement into a parallel luminous flux, and
the second light processing members are constituted of a pair of second lenses each converting the luminous flux emitted from the object under measurement into a parallel luminous flux and optical elements each making the luminous flux irradiated from the first lens and the luminous flux irradiated from one of the second lenses interfere with each other.

6. The spatial frequency reproducing apparatus according to claim 4, wherein the light irradiated from the light source to the object under measurement is irradiated in parallel,
the first light processing member is constituted of a first beam splitter splitting the luminous flux emitted from the object under measurement, and
the second light processing members are constituted of a pair of second beam splitters each making the luminous flux emitted from the object under measurement and one of the luminous fluxes split by the first beam splitter interfere with each other.

7. The spatial frequency reproducing apparatus according to claim 5, wherein a reflecting mirror reflecting an irradiated light from the second lenses to the optical element is disposed between the second lenses and the optical element, and
the optical element includes:
a first beam splitter splitting the parallel luminous flux emitted from the first lens; and
a second beam splitter combining the luminous flux reflected from the reflecting mirror and the luminous fluxes split by the first beam splitter.

8. The spatial frequency reproducing apparatus according to claim 4, wherein the pair of second photo detectors is constituted of a plurality of divided photo detectors and disposed at positions symmetrical to each other with respect to the irradiation optical axis.

9. A spatial frequency reproducing apparatus, comprising:
a light source irradiating a light, which is irradiated convergently or irradiated in parallel, to an object under measurement;
a first optical element located on a tilted optical axis having a tilt with respect to an irradiation optical axis of the convergent irradiation or the parallel irradiation and making two luminous fluxes interfere with each other;
a plurality of first photo detectors each detecting the luminous fluxes made to interfere by the first optical element;
a second optical element located on a tilted optical axis having a tilt reverse to that of the first optical element with respect to an irradiation optical axis of the convergent irradiation or the parallel irradiation and making two luminous fluxes interfere with each other;

a plurality of second photo detectors each detecting the luminous fluxes made to interfere by the second optical element; and an output summation/difference detection unit amplifying respective electrical signals photoelectrically converted by the plurality of first photo detectors while varying a degree of amplification according to frequencies of the electrical signals and amplifying respective electrical signals photoelectrically converted by the plurality of second photo detectors while varying a degree of amplification according to frequencies of the electrical signals, and detecting an output value of a summation or a difference between an arbitrary light receiving output of the plurality of first photo detectors and an arbitrary light receiving output of the plurality of second photo detectors.

10. The spatial frequency reproducing apparatus according to claim 9, wherein the light irradiated from the light source to the object under measurement is irradiated convergently, the apparatus comprises a lens located on the tilted optical axis having a tilt with respect to an irradiation optical axis of the convergent irradiation and converting a luminous flux emitted from the object under measurement into a parallel luminous flux, the first optical element makes a first luminous flux passing through a portion of the lens close to the irradiation optical axis of a luminous flux incident on the lens and a second luminous flux passing through one half surface of the lens which is far from the irradiation optical axis interfere with each other, and the second optical element is disposed in an opposite direction of the first optical element with respect to the tilted optical axis, and makes the first luminous flux and the second luminous flux interfere with each other.

11. The spatial frequency reproducing apparatus according to claim 9, wherein the light irradiated from the light source to the object under measurement is irradiated in parallel, and the first and second optical elements each have:

a first lens located on the tilted optical axis and converging a luminous flux emitted from the object under measurement;

a second lens converting a first luminous flux of one half surface of the first lens close to the irradiation optical axis of a luminous flux emitted from the first lens into a parallel luminous flux;

a third lens converting a second luminous flux of the other half surface of the first lens far from the irradiation optical axis into a parallel luminous flux; and an optical element making luminous fluxes emitted from the second lens and the third lens interfere with each other.

12. The spatial frequency reproducing apparatus according to claim 9, wherein the first and second optical elements include:

a first prism reversing the first luminous flux; and a second prism shifting and overlapping a luminous flux from the first prism and the second luminous flux.

13. The spatial frequency reproducing apparatus according to claim 9, wherein the first and second optical elements include:

a mirror reflecting the second luminous flux; and a beam splitter combining the first luminous flux and the luminous flux reflected by the mirror.

14. The spatial frequency reproducing apparatus according to claim 9, wherein the first and second optical elements are constituted of a convergent lens or a convergent lens and a magnifying optical system.

15. The spatial frequency reproducing apparatus according to claim 9, wherein the first and second optical elements are constituted of a convergent lens and a grating disposed near a focal point of the convergent lens.

* * * * *